United States Patent
Pratt et al.

(10) Patent No.: US 11,876,821 B1
(45) Date of Patent: Jan. 16, 2024

(54) COMBINED REAL-TIME AND BATCH THREAT DETECTION

(71) Applicant: Splunk Inc., San Francisco, CA (US)

(72) Inventors: Robert Winslow Pratt, Woodside, CA (US); Ravi Prasad Bulusu, San Jose, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

(21) Appl. No.: 18/167,040

(22) Filed: Feb. 9, 2023

Related U.S. Application Data

(63) Continuation of application No. 17/236,890, filed on Apr. 21, 2021, now Pat. No. 11,606,379, which is a continuation of application No. 16/886,542, filed on May 28, 2020, now Pat. No. 11,019,088, which is a continuation of application No. 15/276,647, filed on Sep. 26, 2016, now Pat. No. 10,673,880.

(51) Int. Cl.
| | |
|---|---|
| *H04L 29/06* | (2006.01) |
| *H04L 29/08* | (2006.01) |
| *H04L 9/14* | (2006.01) |
| *H04L 9/40* | (2022.01) |
| *G06N 20/00* | (2019.01) |

(52) U.S. Cl.
CPC ......... *H04L 63/1425* (2013.01); *G06N 20/00* (2019.01); *H04L 63/1416* (2013.01); *H04L 63/1433* (2013.01); *H04L 63/20* (2013.01); *H04L 2463/121* (2013.01)

(58) Field of Classification Search
CPC ............. H04L 63/1425; H04L 63/1416; H04L 63/1433; H04L 63/20

USPC .......................................................... 726/1
See application file for complete search history.

(56) References Cited

U.S. PATENT DOCUMENTS

| | | | | |
|---|---|---|---|---|
| 9,516,053 | B1 * | 12/2016 | Muddu | ................ G06F 3/0484 |
| 10,673,880 | B1 * | 6/2020 | Pratt | ................. H04L 63/1433 |
| 2010/0017870 | A1 | 1/2010 | Kargupta | |
| 2010/0174671 | A1 * | 7/2010 | Brooks | ................. G06Q 30/02 |
| | | | | 706/12 |
| 2010/0223213 | A1 * | 9/2010 | Su | ....................... G06F 9/5066 |
| | | | | 712/30 |
| 2010/0257217 | A1 * | 10/2010 | Warren | ................. G06F 16/16 |
| | | | | 707/822 |
| 2012/0240185 | A1 | 9/2012 | Kapoor et al. | |

(Continued)

*Primary Examiner* — Haresh N Patel
(74) *Attorney, Agent, or Firm* — Perkins Coie LLP

(57) ABSTRACT

First event data, indicative of a first activity on a computer network and second event data indicative of a second activity on the computer network, is received. A first machine learning anomaly detection model is applied to the first event data, by a real-time analysis engine operated by the threat indicator detection system in real time, to detect first anomaly data. A second machine learning anomaly detection model is applied to the first anomaly data and the second event data, by a batch analysis engine operated by the threat indicator detection system in a batch mode, to detect second anomaly data. A third anomaly is detected using an anomaly detection rule. The threat indictor system processes the first anomaly data, the second anomaly data, and the third anomaly data using a threat indicator model to identify a threat indicator associated with a potential security threat to the computer network.

20 Claims, 32 Drawing Sheets

(56) References Cited

U.S. PATENT DOCUMENTS

| | | | |
|---|---|---|---|
| 2012/0290510 A1* | 11/2012 | Faddoul | G06N 20/20 |
| | | | 706/12 |
| 2012/0304007 A1 | 11/2012 | Hanks et al. | |
| 2014/0101762 A1* | 4/2014 | Harlacher | G06F 3/0656 |
| | | | 726/23 |
| 2015/0310195 A1* | 10/2015 | Bailor | G06F 21/45 |
| | | | 726/6 |
| 2016/0043827 A1 | 2/2016 | Filson et al. | |
| 2016/0182559 A1 | 6/2016 | Francy et al. | |
| 2016/0226895 A1 | 8/2016 | Huang et al. | |
| 2016/0294773 A1 | 10/2016 | Yu et al. | |
| 2017/0118240 A1 | 4/2017 | Devi Reddy et al. | |
| 2018/0005134 A1* | 1/2018 | Kish | G06N 3/084 |
| 2018/0013776 A1 | 1/2018 | Gay et al. | |
| 2018/0027006 A1* | 1/2018 | Zimmermann | G06F 21/6218 |
| | | | 726/11 |
| 2018/0083995 A1 | 3/2018 | Sheth et al. | |
| 2020/0296124 A1 | 9/2020 | Pratt et al. | |

\* cited by examiner

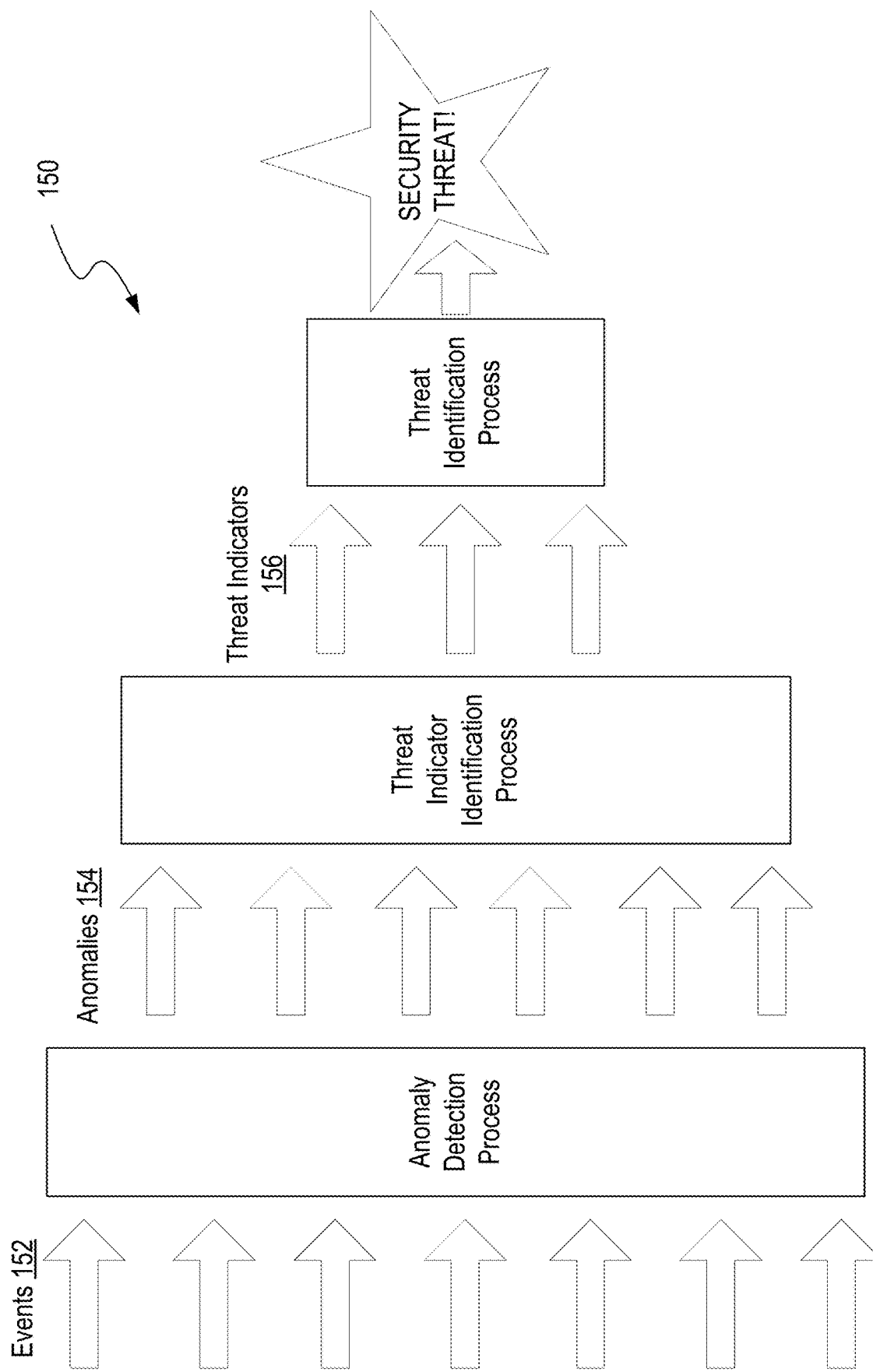

[03/Jul/2014:17:37:03 -0700] "psibbal" 10.33.240.240 74.125.239.107 106 200 TCP_HIT "GET http://sample.site.com/code.snapengage.com/js/9f484480-eb32-4b7a-a2c8-84ac93a4210f.js HTTP/1.1" "Internet Services" "Minimal Risk" "text/javascript" 142360 508 "Mozilla/5.0 (Windows NT 6.3; WOW64) AppleWebKit/537.36 (KHTML, like Gecko) Chrome/35.0.1916.153 Safari/537.36" "http://www.averesystems.com/products/flashcloud" "-" "" "0" "" "-") ~1200

COMBINED REAL-TIME AND BATCH THREAT DETECTION

CROSS-REFERENCE TO RELATED APPLICATION

This application is a continuation of U.S. patent application Ser. No. 17/236,890, filed on Apr. 21, 2021, titled "IDENTIFYING THREAT INDICATORS BY PROCESSING MULTIPLE ANOMALIES," which issued as U.S. Pat. No. 11,606,379, which is a continuation of U.S. patent application Ser. No. 16/886,542, filed on May 28, 2020, titled "IDENTIFYING THREAT INDICATORS BY PROCESSING MULTIPLE ANOMALIES," which issued as U.S. Pat. No. 11,019,088, which in turn is a continuation of U.S. patent application Ser. No. 15/276,647 filed on Sep. 26, 2016, titled "ANOMALY DETECTION TO IDENTIFY SECURITY THREATS," which issued as U.S. Pat. No. 10,673,880, each of which are incorporated by reference herein in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

At least one embodiment of the present disclosure pertains to distributed data processing systems, and more particularly, to intelligence generation and activity discovery from events in a distributed data processing system.

BACKGROUND

Activity detection, both friendly and malicious, has long been a priority for computer network administrators. In various public and private computer networks, users employ devices such as desktop computers, laptop computers, tablets, smart phones, browsers, etc. to interact with others through computers and servers that are coupled to the network. Digital data, typically in the form of data packets, are passed along the network by interconnected network devices.

Malicious activity on a network can harm to software hardware, or users that make up or use the network. Malicious activities may include unauthorized access or subsequent unpermitted use of network resources and data. To protect the network, network administrators seek to detect such activities, for example, by searching for patterns of behavior that are abnormal or otherwise vary from an expected use pattern of particular entities, such as an organization, a group of uses, individual users, IP addresses, nodes or groups of nodes in the network, and the like. To combat such activities, network administrators can employ hardware appliances that monitor network traffic or software products, such as anti-virus or anti-malware software to detect and eliminate certain malicious activity.

BRIEF DESCRIPTION OF THE DRAWINGS

Certain embodiments of the present disclosure are illustrated, by way of examples, in the figures of the accompanying drawings, in which like references indicate similar elements.

FIG. 1A is flow diagram illustrating at a high level, a processing hierarchy of detecting anomalies, identifying threat indicators, and identifying threats.

DETAILED DESCRIPTION

Figure 1B:
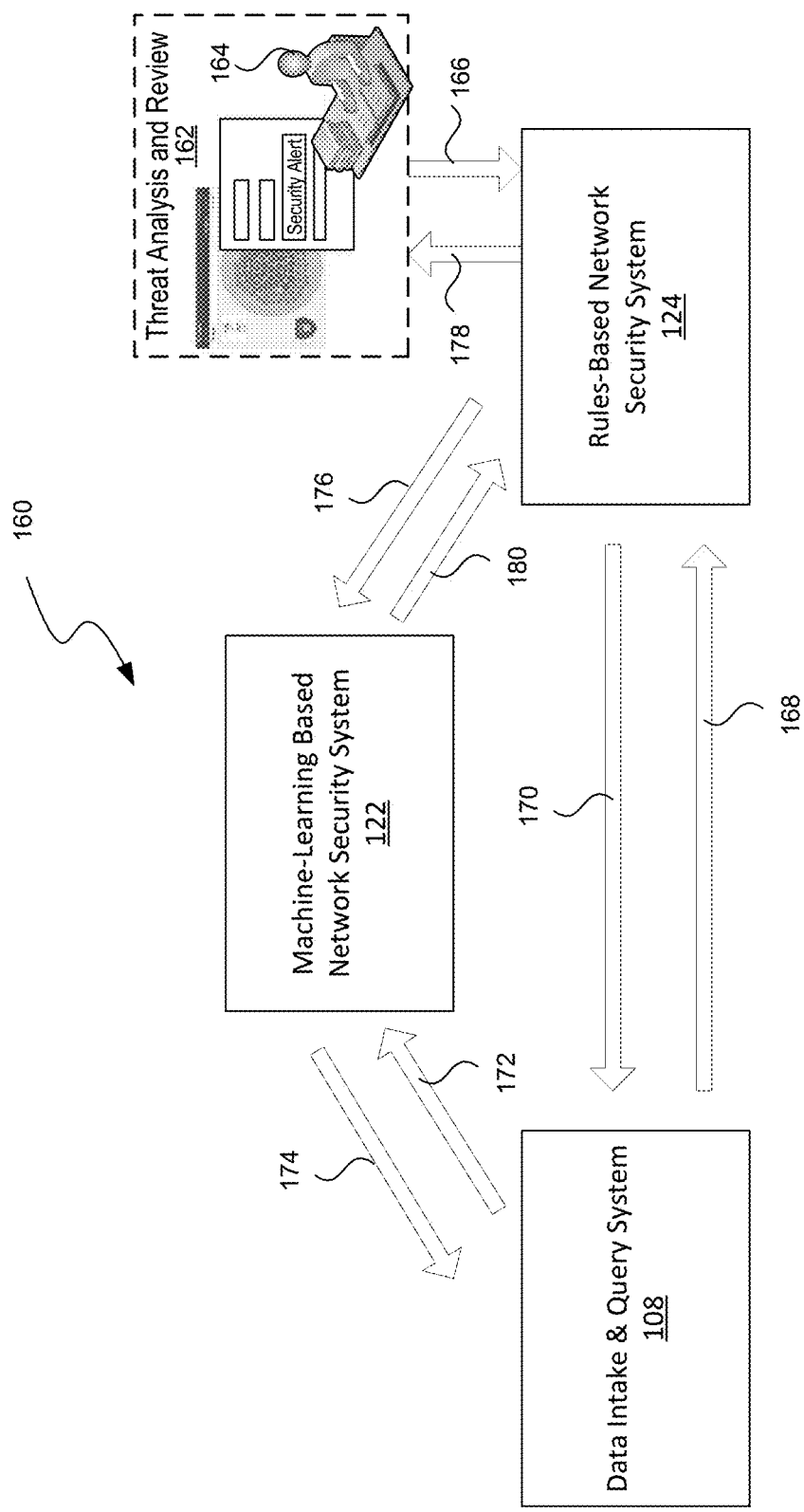
FIG. 1B is an architecture flow diagram that illustrates, at a high level, an example process for using rule-based anomalies output from a rule-based network security system to improve machine learning based threat detection at a machine learning based network security system.

In this description, references to "an embodiment," "one embodiment" or the like, mean that the particular feature, function, structure or characteristic being described is included in at least one embodiment of the present disclosure. Occurrences of such phrases in this specification do not necessarily all refer to the same embodiment. On the other hand, the embodiments referred to also are not necessarily mutually exclusive.

General Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, California. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.).. The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources.

Overview of Anomaly Detection to Identify Network Security Threats

Described herein are techniques for processing data for network security purposes. Note, however, that the techniques introduced here are not limited to security applications, security information and event management (SIEM) applications, or to any other particular kind of application. For example, at least some of the techniques introduced here can be implemented in automated machine-data based fraud detection systems. Additionally, the techniques introduced here are not limited to use with security-related anomaly and threat detection; rather, the techniques can be used with any rules-based or behavioral analysis (e.g., fraud detection or environmental monitoring) systems that process data.

Various types of networks and enterprises can be susceptible to attacks by users with trusted access. Such attacks often go undetected by existing security products and systems. Indeed, traditional security products often suffer from various limitations, including the inability to detect unknown threats and insider threats, as well as the inability to scale or process huge amount of data. Whether access is obtained by using compromised accounts/systems or by leveraging existing privileges to conduct malicious activities, attackers often do not need to employ additional malware which might otherwise present an easily detected presence in the target system or network. Accordingly, attacks which rely on the use of seemingly valid access are difficult to detect, identify, and correct or remediate in a timely manner.

The patterns of these malicious activities vary dynamically, and attackers can almost always find ways to evade traditional security technologies, such as rules-driven malware detection, malicious file signature comparison, and sandboxing. Human analysis of data still provides valuable insight in certain situations. However, as the amount of the data increases, using human analysis alone to perform threat detection becomes time intensive and prohibitively expensive. Similarly, using machine-learning based behavioral analysis techniques alone may in certain situations fail to identify threats that a human would otherwise recognize or anticipate.

Machine-learning based network security systems can perform user behavioral analytics (UBA), or more generally user/entity behavioral analytics (UEBA), to detect security related anomalies and threats, regardless of whether such anomalies and threats are previously known or unknown. Machine-learning based techniques are useful for detecting certain anomalous or threatening activity. However, by using a rules-based network security system, network security administrators can apply their specific knowledge and experience in computer network security to specify rules to detect anomalies that may not otherwise be detected using a machine-learning based techniques. For example, a network administrator knowing or assuming that certain activity is indicative of a network security threat may define a rule to detect that activity and identify it as anomalous.

Introduced here, therefore, are data processing systems that employ a variety of techniques and mechanisms for anomalous activity detection in an information technology environment in ways that are more insightful and scalable than the conventional techniques. Specifically, data processing systems described herein combine rules-based analysis techniques with machine-learning based analysis techniques to identify security threats to an information technology environment. As will be described in more detail below, described techniques can be "big data" driven and employ both machine learning and rules-based mechanisms to perform security analytics. More specifically, techniques are described for analyzing anomalies detected using machine-learning based models or anomalies detected using user-specified rules to improve the detection of security threats to an information technology environment.

Moreover, the techniques described herein can increase a security operations center's (SOC) efficiency by presenting information that is relevant to a an information technology environment's security while filtering out the information that is not relevant. All generated security-related information can then be sent to a security information and event management (SIEM) application, such as the Splunk® App for Enterprise Security, to further scope, disrupt, contain or recover from an attack.

The network security systems described herein can be deployed at any of various locations in a network environment. In the case of a private network (e.g., a corporate intranet), at least parts of the various described systems can be implemented at a strategic location (e.g., a router or a gateway coupled to an administrator's computer console) that can monitor or control the network traffic within the private intranet. In the case of cloud-based application where an organization may rely on Internet-based computer servers for data storage and data processing, at least parts of the various described systems can be implemented at, for example, the cloud-based servers. Additionally or alternatively, the various described systems can be implemented in a private network but nonetheless receive/monitor events that occur on the cloud-based servers. In some embodiments, the various described systems can monitor a hybrid of both intranet and cloud-based network traffic.

In this description, an "anomaly" is defined as a detected or identified variation from an expected pattern of activity on the part of an entity associated with an information technology environment, which may or may not constitute a threat. This entity activity that departs form expected patterns of activity can be referred to as "anomalous activity." For example, an anomaly may include an event or set of events of possible concern that may be actionable or warrant further investigation. Examples of anomalies include alarms, blacklisted applications/domains/IP addresses, domain name anomalies, excessive uploads or downloads, website attacks, land speed violations, machine generated beacons, login errors, multiple outgoing connections, unusual activity time/sequence/file access/network activity, etc.

An anomaly or a set of anomalies can be evaluated and may result in a determination of a threat indicator or a threat. A threat is an interpretation of one or more anomalies or threat indicators. Threat indicators and threats are escalations of events of concern. Examples of threats include data exfiltration (e.g., by compromised account, by malware, or by a suspicious user or device), public-facing website attack, suspicious behavior by an insider, and breach of a rule (e.g. access by a blacklisted user or an unauthorized file transfer). Like an anomaly, a threat can be associated with one or more entities, including users, devices, and applications.

FIG. 1A is flow diagram of an example processing hierarchy 150 that illustrates a process of escalation from detecting anomalies to identifying threats. Reducing false positives in identifying security threats to a network is one goal of such a process. To this end, the flow diagram illustrates an overall process 150 by which large amounts of incoming events 152 are processed to detect anomalies 154. As mentioned, in some cases, anomalies 154 can be detected by processing received events 152 using both machine-learning based anomaly detection models as well as user-specified anomaly detection rules. The resulting anomalies 154 shown in FIG. 1A comprising a plurality of anomalies across an information technology environment can be processed together or separately to identify threat indicators 156 associated with a potential security threat to the information technology environment. In some embodiments, the identification of threat indicators can be conceptualized as an intermediate step between detecting anomalies and identifying security threats to the information technology environment. As shown, the threat indicators 156 comprising a plurality of threat indicators identified across an information technology environment can be processed to identify a security threat to an information technology environment. As an example of scale, hundreds of millions of events including data from various data sources may be analyzed to yield 100 anomalies, which may be analyzed to yield 10 threat indicators associated with potential security threats, which may again be analyzed to yield one or two actual security threats.

FIG. 1B is an architecture flow diagram that illustrates, at a high level, the process 160 for using rules based anomalies output from a rules-based network security system to improve machine learning based threat detection at a machine learning based network security system. As shown in FIG. 1B, at step 166 a user 164 (e.g. a network administrator) provides input that defines a rule for detecting anomalies based on received data (e.g. machine data). For example, user input specifying an anomaly detection rule may be input via graphical user interface (GUI) 162 associated with a rules-based network security system 124. As used herein, the term "rules-based network security system" refers to a system that uses rules-based anomaly detection. Note, however that this does not meant that the system cannot use other methods of anomaly detection. In some embodiments, graphical user interface 162 is displayed via an application for network security analysis and review. An example of such an application is the SPLUNK® App for Enterprise Security.

A rules-based network security system 124 can process received data with the user-specified rule to detect anomalous activity and output anomaly data based on that activity.

An example system that utilized rules based anomaly detection is SPLUNK® ENTERPRISE SECURITY. Similarly, a machine-learning based network security system 122 may process received event data with one or more machine-learning anomaly detection models to detect anomalous activity and generate and output anomaly data based on that activity. As used herein, the term "machine-learning based network security system" refers to a system that uses machine-learning based anomaly detection (also referred to as user or user/entity behavioral analysis). Note, however that this does not mean that such a system cannot use other methods of anomaly detection. An example system that utilizes machine-learning based anomaly detection is SPLUNK® UBA. Note, although example network security systems 122 and 124 are shown as discrete systems in FIG. 1B for illustrative purposes, it shall be appreciated that their respective functionalities may be combined into fewer or more systems than shown. For example, all of systems 108, 122, and 124 may be implemented at a single computing device or distributed across multiple network-connected computing devices. Similarly, the respective functionalities of systems 108, 122, 124, may be implemented as one or more services by one or more service providers. For example, in some embodiments, services associated with systems 108, 122, and 124 may be offered by a single service provider as part of an integrated network security platform.

As will be described in greater detail later, a data intake and query system 108 may receive data (e.g. machine data) from a number of data sources, index the data, and store the data as events for access via search queries. An example system that utilizes a data intake a query system is the SPLUNK® ENTERPRISE system. In the case of both network security systems 122 and 124, data may be received at steps 168 and 172 (respectively) in response to queries 170 and 174 (respectively) for processing using rules and machine-learning based models (respectively). In an embodiment, network security systems 122 and 124 may connect to the data intake and query system 108 via a REST™ API. Data retrieval from a data intake and query system 108 is not necessary in all embodiments. For example, in some embodiments, data is received via a data intake and preparation process similar to as later described with respect to FIG. 10.

Processing of data (at both systems 122 and 124) may be performed in real time as data is received or in batch mode using stored data. In some embodiments, anomalies and threats detected using a real-time processing path may be employed to automatically trigger an action, such as stopping the intrusion, shutting down network access, locking out users, preventing information theft or information transfer, shutting down software or hardware processes, and the like. In certain embodiments, the discovered anomalies and threats may be presented (e.g. via GUI 162) to a network operator (e.g., a network security administrator or analyst) for decision. As an alternative or in addition to automatically taking action based on the discovered anomalies and threats, the decisions by the user (e.g., that the anomalies and threats are correctly diagnosed, or that the discovered anomalies and threats are false positives) can then be provided as feedback data in order to update and improve the models or as additional specified rule. In the batch processing path, historical data and third-party data can be processed with the incoming real-time event data, to uncover, for example, more subtle anomalies and threats than the real-time processing path can uncover because of the time constraints often placed on real-time processing path to make it as timely and responsive as possible. Batch processing may occur synchronously with real-time processing or in accordance with a predefined schedule. As in the real-time data path, anomalies, threat indicators and threats discovered by the batch analyzer may be actionable automatically or may be presented to a human operator for decision on whether to take action. The action taken by the operator to validate or invalidate the conclusions reached by the batch analyzer may serve as a source of feedback to the security platform to improve its evaluation of subsequently processed data.

Process 160 continues at step 176 with the machine-learning based network security system 122 acquiring anomaly data indicative of anomalous activity from the rules-based network security system 124. As will be described, the machine learning based network security system 122 can process machine-learning detected anomalies with rules detected anomalies acquired from system 124 to identify threats or threat indicators. In addition to outputting anomalies for acquisition by system 122, at step 178 the rules-based network security system 124 may output anomalies for display to a user 164, for example, via GUI 162.

Process 160 continues at step 180 with outputting identified threats and threat indicators to rules-based network security system 124, including optionally displaying such information via a UI. For example, in some embodiments, identified threat indicators are output for display via GUI 162 that may be associated with the rules based network security system 124.

As will be described in greater detail, machine-learning based network security system 122 may also process events to resolve the identity of entities associated with the events. Specifically, by using complex behavioral analysis, system 122 can gain the knowledge by observing the system environment (e.g., based on authentication logs), thereby building the intelligence to make an educated identity resolution determination. That is, system 122 can include functionality to develop entity identity intelligence relevant to the system's environment without any explicit entity identity information.

At step 180, machine-learning based network security system 122 may output identity resolution data to rules-based network security system 124. As a result, system 124 may determine, by using the received entity resolution data, the identity of certain entities associated with events without performing the identity resolution process. For example, based on behavioral analysis, system 122 can determine that there is a high probability that a particular use is associated with devices 1, 2, and 3. System 122 outputs this identity resolution information as a conclusion to rules-based network security system 124. The identity resolution information can be used with new incoming data at system 124 to, for example, associate certain users with other entities (e.g., devices, accounts, addresses, applications etc.) referenced in the event data. The events or anomalies output for display via GUI 162 can also be annotated based on the identity resolution data. The identity resolution data can provide the user 164 with additional information on which to base network security decisions and to develop additional anomaly detection rules.

Note, the above described process of outputting anomalies from a rule-based network security system 124 to a machine-learning based system 122 for threat identification, can similarly be applied in reverse. In other words, anomalies detected using machine-learning based models at system 122 can be output to system 124 and processed with rules-based anomaly detection at system 124 to identify (e.g. using threat identification rules) threats or threat indicators. Further, in some embodiments, the process may be applied in both directions with detected anomalies bi-directionally exchanged between systems 122 and 124 for threat identification.

Operating Environment

Figure 2A:
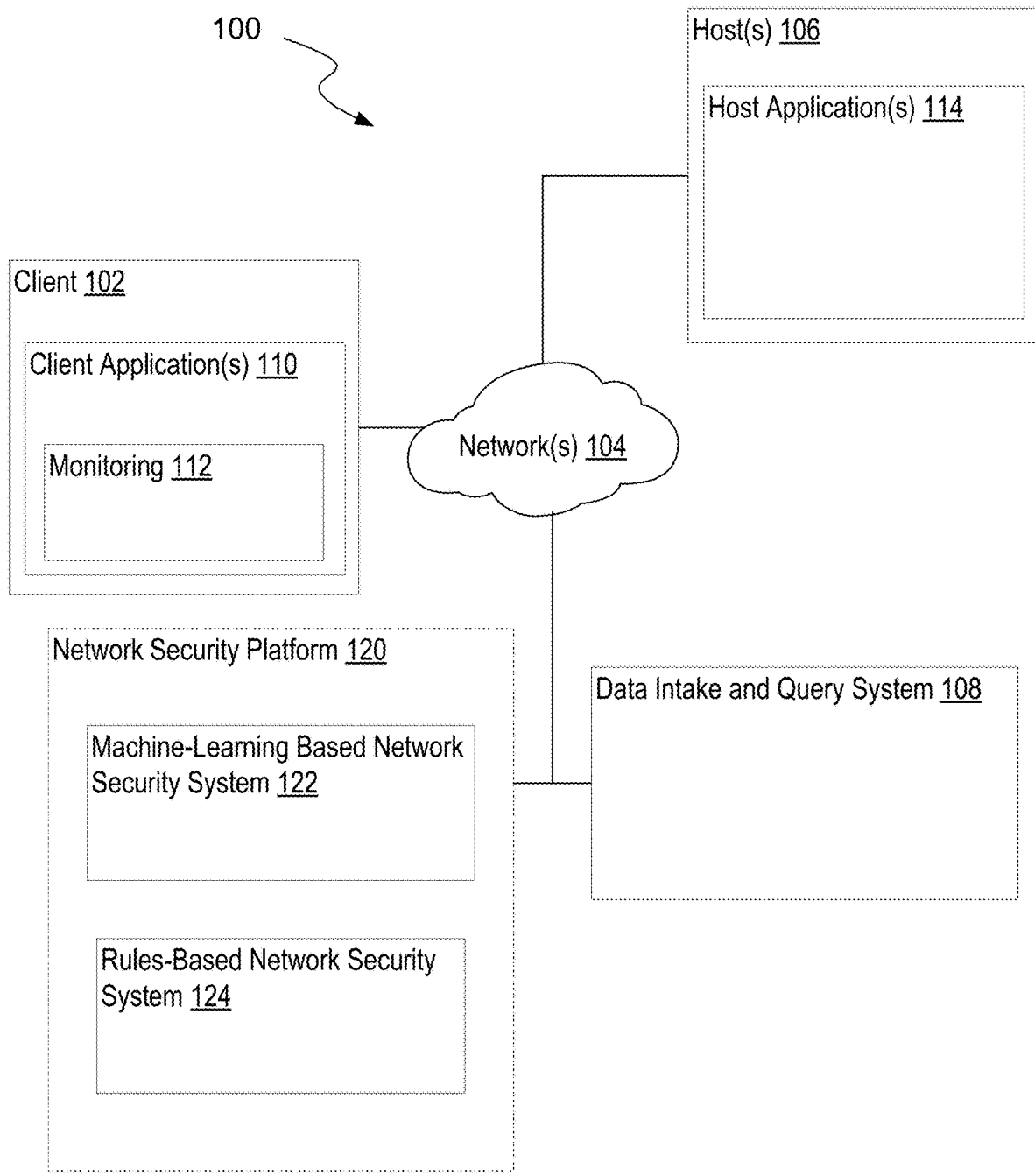
FIG. 2A is a block diagram that illustrates an example networked computer system in which an embodiment may be implemented.

FIG. 2A illustrates a networked computer system 100 in which an embodiment may be implemented. Those skilled in the art would understand that FIG. 2A represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106, a data intake and query system 108, and a network security platform 120 via one or more networks 104. Networks 104 broadly represent one or more LANs, WANs, cellular networks (e.g., LTE, HSPA, 3G, and other cellular technologies), or networks using any of wired, wireless, terrestrial microwave, or satellite links, and may include the public Internet. Network security platform may include a machine learning-based network security system(s) 122 and rules-based network security system(s) 124.

Note that security platform 120 is show as separate from data intake and query system 108 in FIG. 2A for illustrative purposes, however it shall be appreciated that their respective functionalities may be combined into fewer or more systems than as shown. Similarly, example network security systems 122 and 124 are shown as discrete systems in FIG. 2A for illustrative purposes, however it shall be appreciated that their respective functionalities may be combined into fewer or more systems than as shown. For example, all of systems 108, 122, and 124 may be implemented at a single computing device or distributed across multiple network-connected computing devices. Similarly, the respective functionalities of systems 108, 122, 124, may be implemented as one or more services by one or more service providers. These services may be accessible to end-users via any of client applications 110 or host applications 114. For example, in some embodiments, services associated with systems 108, 122, and 124 may be offered by a single service provider as part of an integrated network security platform.

Operating Environment—Host Devices

In the embodiment illustrated in FIG. 2A, computer system 100 includes one or more host devices 106. Host devices 106 may broadly include any number of computers, virtual machine instances, or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

Operating Environment—Client Devices

Client devices 102 of FIG. 2A represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

Operating Environment—Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent or received by a client application 110. For example, the monitoring component 112 may be configured to monitor data packets transmitted to or from one or more host applications 114. Incoming or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

In an embodiment, the monitoring component 112 may also monitor and collect performance data related to one or more aspects of the operational state of a client application 110 or client device 102. For example, a monitoring component 112 may be configured to collect device performance information by monitoring one or more client device operations, or by making calls to an operating system or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in FIG. 2A) in which a value is stored. This field indicates a network latency measurement associated with one or more network requests. The data record may include a "state" field to store a value indicating a state of a network connection, and so forth for any number of aspects of collected performance data.

Data Intake and Query System

Figure 2B:
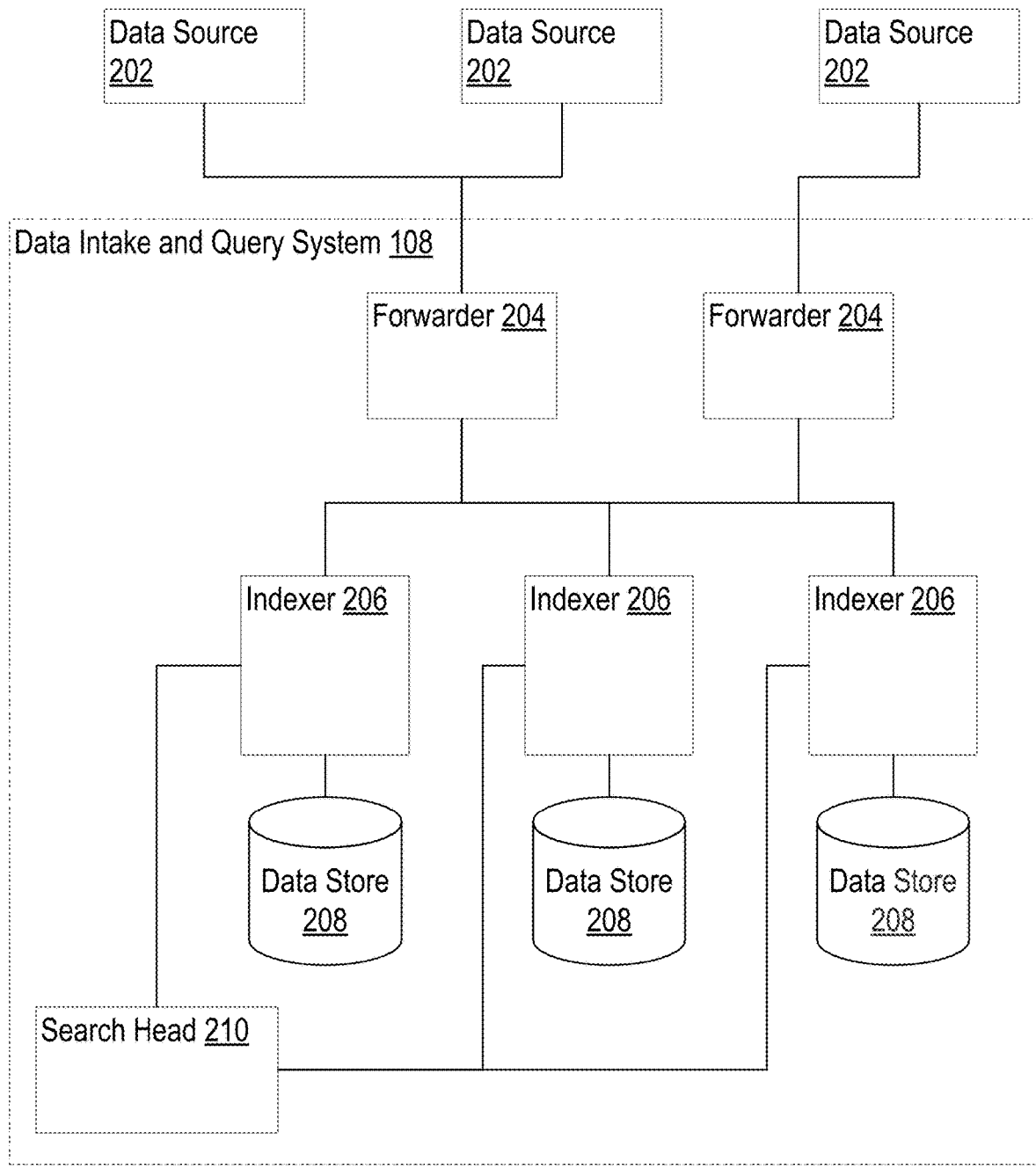
FIG. 2B is a block diagram that illustrates an example data intake and query system.

FIG. 2B depicts a block diagram of an illustrative data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw machine data to create events. A forwarder 204 may generate time stamps for events. Additionally, or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

Data Intake and Query System—Data Ingestion

Figure 3:
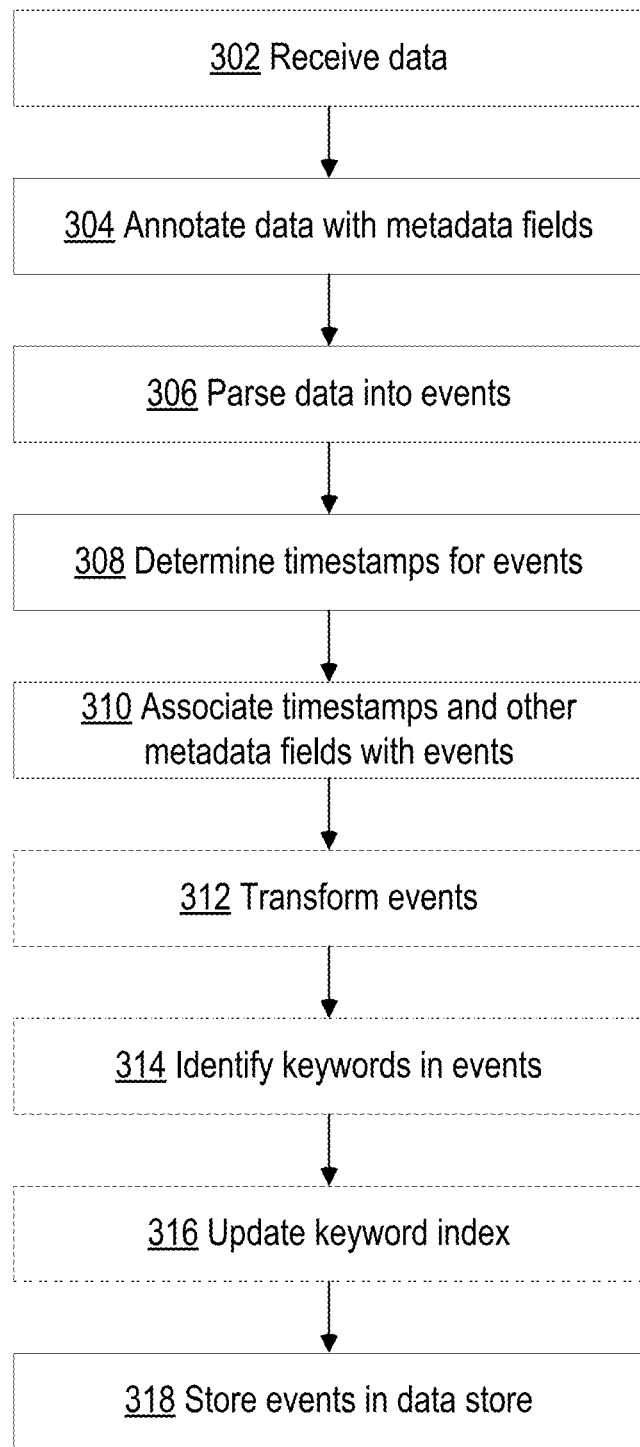
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

At block 302, a forwarder receives data from a data source 202 shown in FIG. 2B. A forwarder initially may receive the data as a raw data stream generated by the data source. For example, a forwarder may receive a data stream from a log file generated by an application server, from a stream of network data from a network device, or from any other data source. In one embodiment, a forwarder can receive raw machine data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the components to forward data. The forwarder can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. The forwarder can also index data locally while forwarding the data to another indexer.

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, the indexer can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query. Moreover, events and buckets can also be replicated across different indexers and data stores to facilitate high availability and disaster recovery.

Data Intake and Query System—Query Processing

Figure 4:
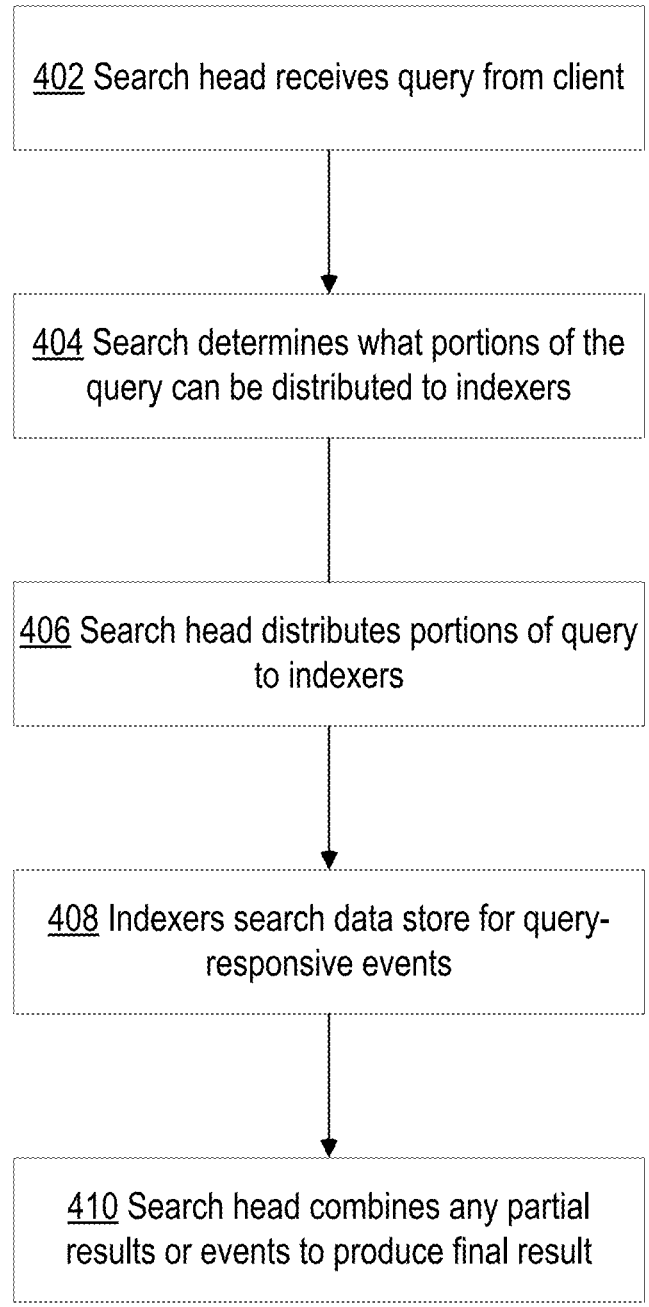
FIG. 4 is a flow diagram that illustrates an example of how a search head and indexers perform a search query.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in FIG. 2B.) that provides the search head with a list of indexers to which the search head can distribute the determined portions of the query. The master node maintains a list of active indexers and can also designate which indexers are responsible for responding to queries over certain sets of events. A search head can communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use a late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

Network Security Platform

Figure 5:
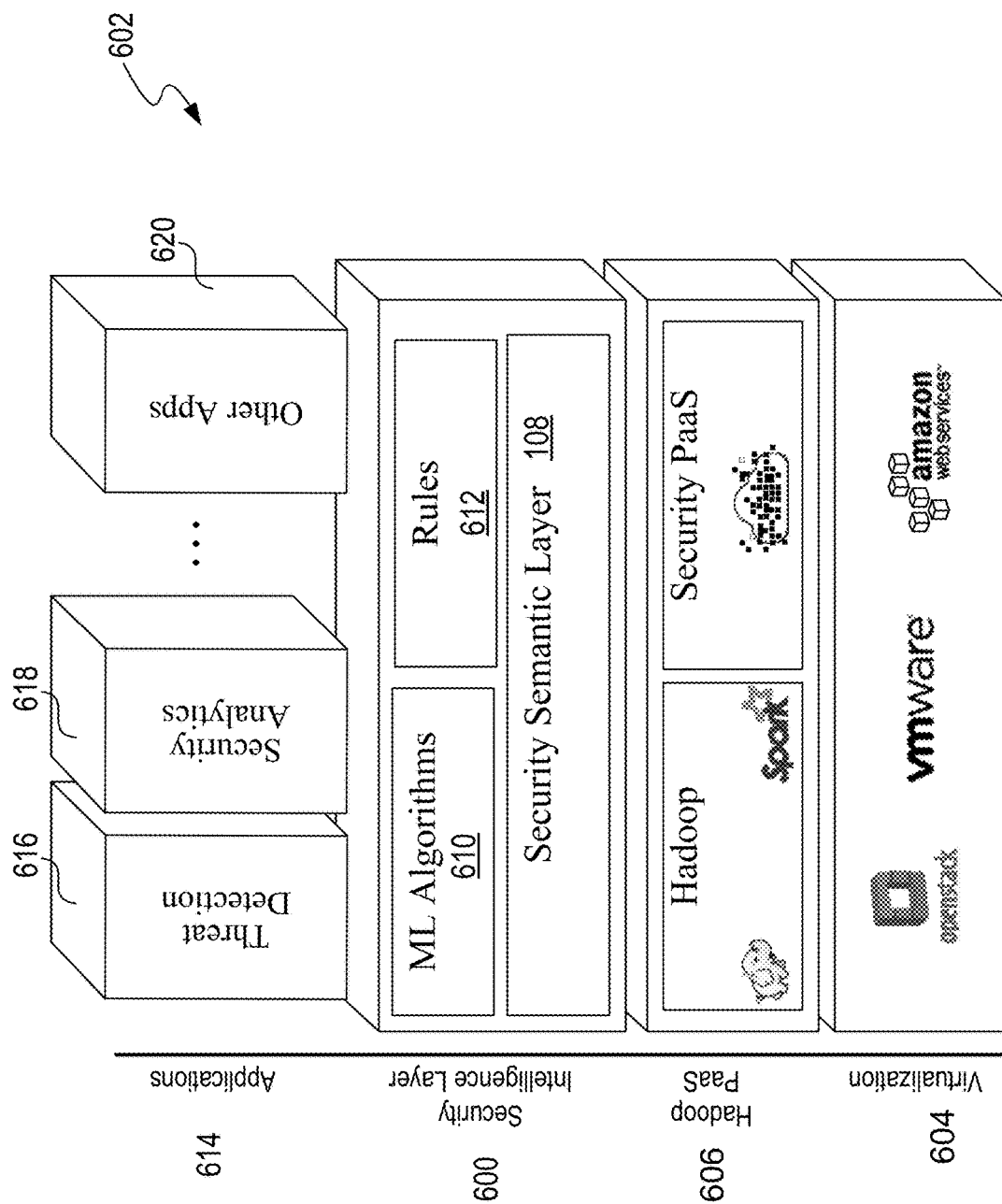
FIG. 5 shows an example of functional layers of a security platform.

FIG. 5 illustrates a high level view of an architecture of an example network security platform 120, previously described with respect to FIG. 2A. Recall that network security platform 120 may include a machine-learning based network security system 122 and a rules based network security system 124. In FIG. 5, a cloud computing infrastructure is shown, represented in part by a virtualization layer 604. Various cloud computing operating systems or platforms, such as OpenStack™, VMware™, Amazon Web Services™, Google Cloud™, or the like, may be employed in virtualization layer 604 to create public clouds or private clouds. Generally speaking, these cloud computing operating systems and others permit processing and storage to be implemented on top of a set of shared resources. Among its many advantages, cloud computing permits or facilitates redundancy, fault tolerance, easy scalability, low implementation cost and freedom from geographic restrictions.

Above the virtualization layer 604, a software framework layer 606 implements the software services executing on the virtualization layer 604. Examples of such software services include open-source software such as Apache Hadoop™, Apache Spark™, and Apache Storm™ Apache Hadoop™ is an example of an open-source software framework for distributed storage and distributed processing of very large data sets on computer clusters built from commodity hardware. Apache Storm™ is an example of a distributed real-time computation engine that processes data stream record-by-record. Apache Spark™ is an example of a large-scale data processing engine that collects events together for processing in batches. These are only examples of software that may be employed in implementations of the software framework layer 606.

A security intelligence layer 600 implements a security semantic layer 608, a machine learning layer 610, and a rules layer 612. The security semantic layer 608 can perform the extract, transform, and load (ETL) functions that prepare the incoming event data for further processing by downstream consumers. Note that the term ETL here is used in an illustrative sense to facilitate understanding, as the ETL stage described herein may include functionality in addition to or different from traditional ETL techniques. The machine learning layer 610 represents one of the consumers of the data output of the security semantic layer 608. The rules layer 612 represents another possible consumer of data output from the security semantic layer 608. In an example, event data may be received by the security semantic layer 108, and prepared (or "pre-processed") to be further processed by the machine learning layer 110 or rules layer 612.

Figure 6:
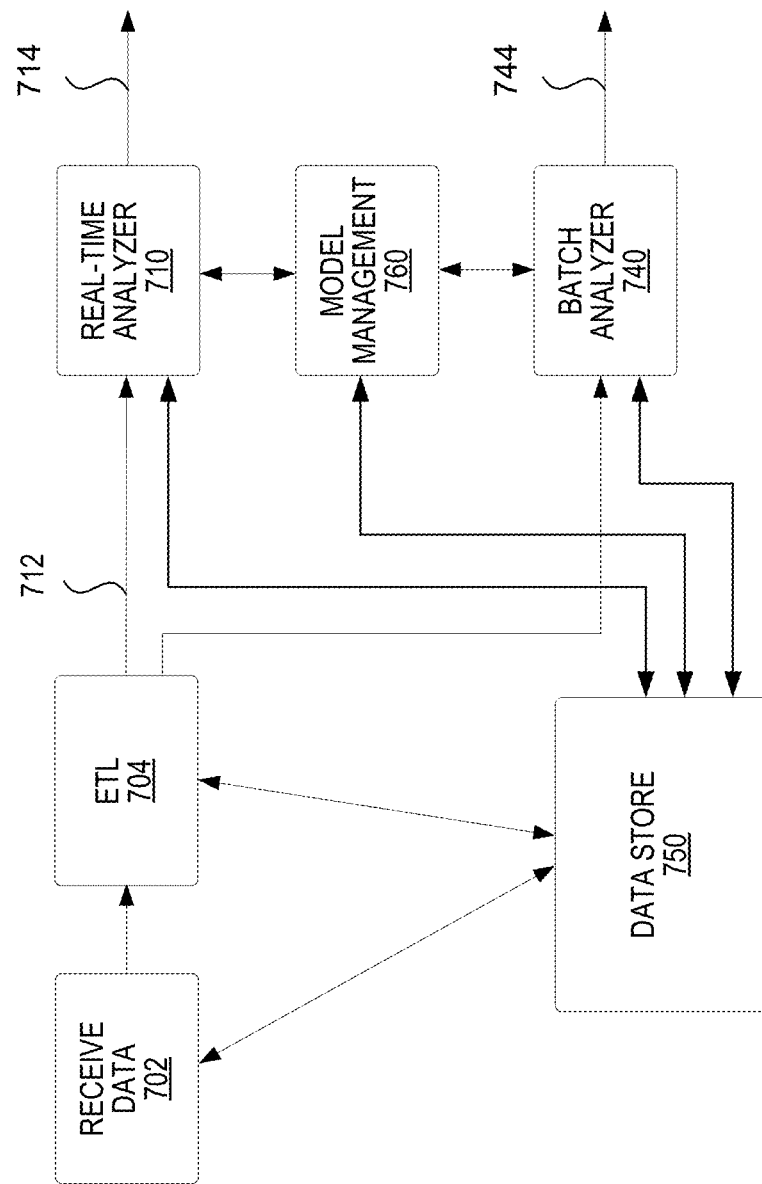
FIG. 6 shows a view of processing of data within an example network security platform.

Above the security intelligence layer 600 is an application layer 614. The application layer 614 represents the layer in which application software modules may be implemented. For example, applications part of application layer 614 may be implemented as one or more client applications 110 or host applications 114 described with respect to FIG. 2A. In an example, the output of the rules layer 612 include anomalies and the output of the machine learning layer 610 includes anomalies, threat indicators, or threats. This output may be analyzed by the various applications such as a threat detection application 616, a security analytics application 618 or other applications 620. Also, in some embodiments users may provide input via applications in the applications layer 612 to specify rules in the rules layer 612 or modify machine learning algorithms in the machine learning layer 610. An example of an applications that may be implemented in the applications layer 614 is the Splunk® App for Enterprise Security. These layers, modules and their operation will be discussed in greater detail below FIG. 6 shows a conceptual view of the processing of data within network security platform 120, according to some embodiments. A receive data block 702 represents a logical component in which event data and other data are received from one or more data sources. In an example, receive data block 702 includes application programming interfaces (APIs) for communicating with various data sources. An ETL block 704 is the data preparation component in which data received from the receive data block 202 is pre-processed, for example, by adding data or metadata to the event data (a process interchangeably called decoration, enrichment or annotation herein), or otherwise prepared, to allow more effective consumption by downstream data consumers (e.g., machine learning models).

The enriched event data from the ETL block 704 is then provided to a real-time analyzer 710 over a real-time processing path 712 for detecting anomalies, threat indicators and threats. Output 714 from the real-time analyzer 710 is provided for action by the human operator, in certain embodiments. It should be noted that the real-time analyzer 710 operates in real-time by analyzing event data as the event data received by the security platform 120.

The event data from the ETL block 704 is also provided to a batch analyzer 740 over a batch processing path 742 for detecting anomalies, threat indicators and threats. However, while the event data is provided to the real-time analyzer 710 in an unbounded, streaming, record-by-record manner, it is provided to the batch analyzer in the form of batches of event data (i.e., where each batch of event data contains a collection of events that arrived over the batch period). Because the batch analyzer 740 processes data in batch mode instead of in real-time, in addition to the event data that the real-time analyzer 710 receives, the batch analyzer 740 can receive additional historical event data from the security platforms, prior analysis (including the analysis results, the model states, and the supporting data) from the real-time analyzer 710 (e.g., through a model management component 760), or prior analysis from other analyzers (real-time or batch) implemented elsewhere in the same or other networks.

Machine learning models are employed to evaluate and analyze data in certain embodiments, that is not necessarily the case in every embodiment. In some cases, the security platform may also adapt more appropriately or more efficiently to the environment by using a combination of other suitable forms of analysis, including rule-based analysis, algorithm-based analysis, statistical analysis, etc. For example, as previously described, in some embodiments, anomalies detected using rule-based analysis can be input and combined with anomalies detected using the real time analyzer 710 or batch analyzer 740 to detect threat indicators or threats.

Figure 7:
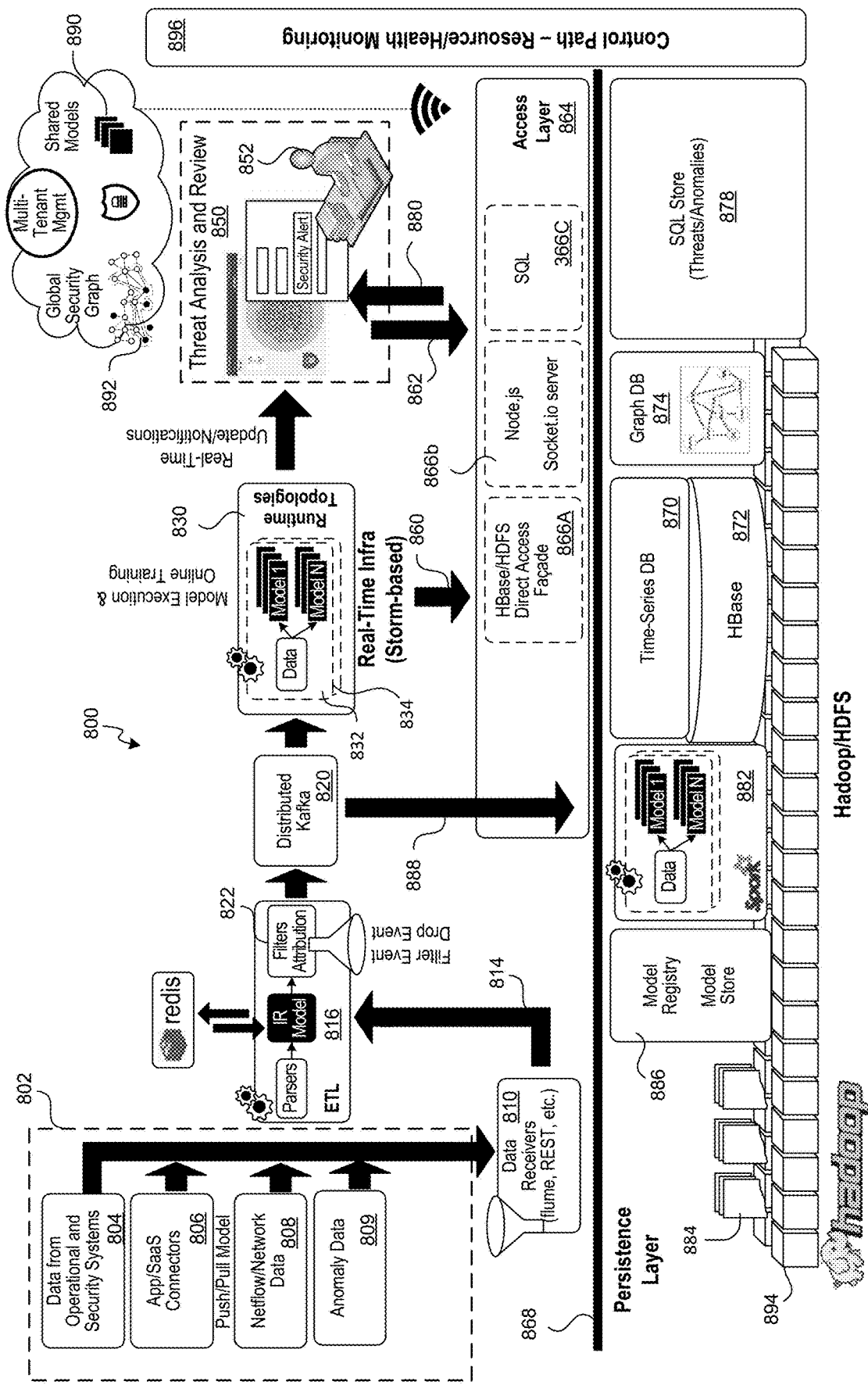
FIG. 7 shows the architecture of an example network security platform.

FIG. 7 illustrates an example of an overall architecture of the security platform 800 that may be similar to security platform 120 shown in FIG. 2A. Note that security platform 800 described with respect to FIG. 7 includes machine-learning based systems that may comprise or be part of the machine-learning based network security system 122 shown in FIG. 2A. Data sources 802 represent various data sources that provide data including event data (e.g. machine data) and other data, to be analyzed for anomalies and threats. The incoming data can include event data represents events that take place in the network environment. For example, data source 804 is a source of data pertaining to logs including, for example, user log-ins and other access events. These records may be generated from operational (e.g., network routers) and security systems (e.g., firewalls or security software products). Data source 806 is a source of data from different types of applications, including software as a service (e.g., Box™). Data source 806 may use different mechanisms for transmitting the event data, including a push mechanism, a pull mechanism, or a hybrid mechanism. Other data sources which may fall into the data source 806 category include human resource systems, accounting systems, customer relation databases, and the like. Data source 808 is a source of network management or analyzer data (e.g., event data related to traffic on a node, a link, a set of nodes, or a set of links). The network management or analyzer data may be obtained from various network operating systems and protocols, such as Cisco Netflow™. The data sources mentioned here are only examples, as other suitable data sources may also be used. Data source 809 includes anomaly data based on anomalous activity detected by another network security system, for example, rues-based network security system 124 described with respect to FIG. 2A. As previously mentioned, a rules-based network security system 124 may output anomaly data indicative of anomalous activity in an information technology environment based on processing event data (e.g. received from sources 804, 806, and 808) according to user-specified rules (as opposed to machine-learning models). This "rules-based" anomaly data is then fed into the a machine learning based network security system 122 (e.g. platform 800 shown in FIG. 7) to detect further anomalies, threat indicators, or threats. Again, although network security systems 122 and 124 are shown as discrete systems in FIG. 2A, they may in some instance be part of the same system of platform. For example, platform 800 may include rules-based anomaly detection processing (e.g. at data receiver 810 or analysis modules 830 or 882) that outputs anomaly data that is then fed into the platform 800 as a data source 802. Note, that in some embodiments, data sources 802 may include data received in response to a query from a search head 210 of a data intake and query system 108 described with respect to FIG. 2B.

The data sources 802 provide data to data receivers 810, which implement various APIs and connectors to receive (or retrieve, depending on the mechanism) the data for the security platform 800. The data receivers 810 may also optionally filter some of the data. For example, to reduce the workload of the security platform, a business rule may be set to state that all query events to "www.google.com" should be filtered out as not interesting (e.g., this type of access is determined not to represent any security threat). Technologies employed to implement the data receiver 810 may include Flume™ and REST™. Flume™ is an open-source distributed service for collecting, aggregating, and moving large amounts of log data. REST™ is an interface for accessing large databases.

The received data can then be provided via a channel 814 to a semantic processor (or data preparation stage) 816, which in certain embodiments performs, among other functions, ETL functions. In particular, the semantic processor 816 may perform parsing of the incoming event data, enrichment (also called decoration or annotation) of the event data with certain information, and optionally, filtering the event data. The semantic processor 816 introduced here is particularly useful when data received from the various data sources through data receiver 810 is in different formats, in which case the semantic processor 816 can prepare the data for more efficient downstream utilization (including, for example, by an event processing engine) while avoiding binding the unstructured data into any particular type of data structure.

A parser in the semantic processor 816 may parse the various fields of received event data representing an event (e.g., a record related to a log-in event). An identity resolution (IR) component (not shown in FIG. 4) may be optionally provided within the semantic processor 816 to correlate IP addresses with users, for example. This correlation permits the security platform to make certain assumptions about the relationship between an IP address and a user so that, if any event data arrives from that IP address in the future, an assumption regarding which user is associated with that IP address may be made. In some implementations, the event data pertaining to that IP address may be annotated with the identity of the user. Technology used to implement the data preparation functions of the semantic processor 816 may include Redis™.

An optional filter attribution block 822 in the semantic processor 816 removes certain pre-defined events. The attribution filter 822 in the semantic processor 816 may further remove events that need not be processed by the security platform. An example of such an event is an internal data transfer that occurs between two IP addresses as part of a regular file backup. In some embodiments, the functions of semantic processor 816 are configurable by a configuration file to permit easy updating or adjusting. Examples of configurable properties of the semantic processor 816 include how to (i) parse events, (ii) correlate between users and IP address, or (iii) correlate between one attribute with another attribute in the event data or an external attribute. The configuration file can also adjust filter parameters and other parameters in the semantic processor 816.

Data processed by the semantic processor 816 is sent to a distribution block 820. The distribution block 820 can be a messaging mechanism to distribute data to one or both of the real-time processing path and the batch processing path. The real-time processing path is entered via the right-facing arrow extending from the distribution block 820, whereas the batch processing path is entered via arrow 388 extending downward from the distribution block 820.

The real-time processing path includes an analysis module 330 that receives data from the distribution block 820. The analysis module 830 analyzes the data in real-time to detect anomalies, threat indicators, and threats. In certain embodiments, the aforementioned Storm™ platform may be employed to implement the analysis module 830. In other embodiments, the analysis module could be implemented by using Apache Spark Streaming.

In FIG. 7, at least two topologies 832 and 834 are illustrated in analysis module 830. Generally, a topology in this context is a specification of how an analysis module (e.g., module 330) groups and distributes work (e.g., to the different computation workers). A topology can also specify how the analysis module 830 groups and distributes input data for the model-related process threads. More details on the analysis module 830 and topologies are discussed below in relevant sections. Different machine learning models may evaluate different aspects of the pre-processed event data received from the distribution block 820. The machine learning models can also generate security-related scores for the events. Also, in some embodiments processing module 830 may process event data according to user-specified rules instead of machine learning based models. For example, in some embodiments a user specified rule may be received form another network security system (e.g. a rules based network security system) and implemented at processing module 830. The results from the analysis module 830 may be, for example, anomalies, threat indicators, and threats.

These anomalies, threat indicators and threats may be provided to a user interface (UI) system 850 for review by a human operator 852. UI 850 may be provided via nay number of applications or other systems. For example, in an embodiment, anomaly, threat, and threat indicator data is output for display via a UI at an enterprise security application (e.g. Splunk® App for Enterprise Security). Note that the enterprise security application may be part of another network system (e.g. a rules-based network security system). As an example, a visualization map and a threat alert may be presented to the human operator 852 for review and possible action. The output of the analysis module 830 may also automatically trigger actions such as terminating access by a user, terminating file transfer, or any other action that may neutralize the detected threats. In certain embodiments, only notification is provided from the analysis module 830 to the UI system 850 for review by the human operator 852. The event data that underlies those notifications or that gives rise to the detection made by the analysis module 830 are persistently stored in a database 878. If the human operator decides to investigate a particular notification, he or she may access from database 378 the event data (including raw event data and any associated information) that supports the anomalies or threat detection. On the other hand, if the threat detection is a false positive, the human operator 352 may so indicate upon being presented with the anomaly or the threat. The rejection of the analysis result may also be provided to the database 878. The operator feedback information (e.g., whether an alarm is accurate or false) may be employed to update the model to improve future evaluation.

Arrow 860 represents the storing of data supporting the analysis of the anomalies and threats in the real-time path. For example, the anomalies and threats as well as the event data that gives rise to detection of the anomalies and threats may be stored in database 378 (e.g., an SQL store) using a path represented by the arrow 860. Additional information such as the version of the models, the identification of the models used, and the time that the detection is made, may also be stored.

The human operator 852 may review additional information in response to the notification presented by the UI system 350. The data supporting the analysis of the anomalies and threats may be retrieved from database 878 via an access layer 864. Arrow 862 represents a data retrieval request via the access layer 864 to one or more of databases 870, 872, 874 and 878. In some embodiments, event data associated with stored anomalies, threats, and threat indicators may be retrieved from a data intake and security query system 108 in response to a query transmitted to search head 210. The data served up by the databases can be provided to the UI 850 by means of data pathway 880. The access layer 864 includes the APIs for accessing the various databases and the user interfaces in the UI 850. For example, block 866A represents the API for accessing the HBase or HDFS (Hadoop File Service) databases. Block 866B represents the various APIs compatible for accessing servers implementing sockets.io or node.js servers. SQL API 866C represents the API for accessing the SQL data store 378, which stores data pertaining to the detected threats and anomalies.

Line 868 is a conceptual line that separates the batch processing path (below line 868) from the real-time processing path (above line 868). The infrastructure which may operate in batch mode includes the SQL store 878 that stores information accessible by scripted query language (SQL), a time series database 870 that represents the database for storing time stamped data, an HBase 872 that can be an open-source, distributed, non-relational database system on which databases (e.g., the time serious database 870) can be implemented, and a GraphDB database 874 that stores security graphs 892, which may be based on relationship graphs generated from events. In some embodiments, the GraphDB database 874 comprises a Neo4j™ graph database.

A security graph, as described further below, is generally a representation of the relationships between entities in the network and any anomalies identified. For example, a security graph may map out the interactions between users, including information regarding which devices are involved, who or what is talking to whom/what, when and how interactions occur, which nodes or entities may be anomalous, and the like. The nodes of the security graph may be annotated with additional data if desired.

A batch analysis module 882 is the analysis module that processes data in batches. The analysis module 882 may take into account the historical event data stored in databases 870, 872, 874, and 878 (including "relatively" contemporary event data that is passed from distribution block 820 to the persistent layer below line 868 via network channel 888). In one example, the batch analysis module 882 may employ third party data 884. With more time allowance and more data available for analysis, the batch analysis module 382 may be able to uncover additional anomalies and threats that may not be easily detectable by the real-time analysis module 830. The model management block 886 includes a model store and a model registry. The model registry can store model type definitions for machine learning models, and the model store can store model states for machine learning models. Additional details on the model registry and the model store are discussed below.

In certain embodiments, the models that are employed for evaluation by one analysis module may be shared with another module. Model state sharing 890 may improve threat detection by various modules (e.g., two modules belonging to an international network of the same company, but one deployed in Asia and another one deployed in North America; or, one module being used in the real-time path and another in the batch path) as the model state sharing leverages knowledge learned from one module to benefit others. Security graphs 892 may also be shared among modules, and even across different organizations. For example, activities that give rise to a detection of anomalies or a threat in one enterprise may thus be shared with other enterprises. Hadoop nodes 894 represent the use of cloud-based big data techniques for implementing the architecture of FIG. 7 to improve scalability as well as the ability to handle a large volume of data. Control path 896 represents the control software that may be used for monitoring and maintaining the security platform 800.

Figure 8:
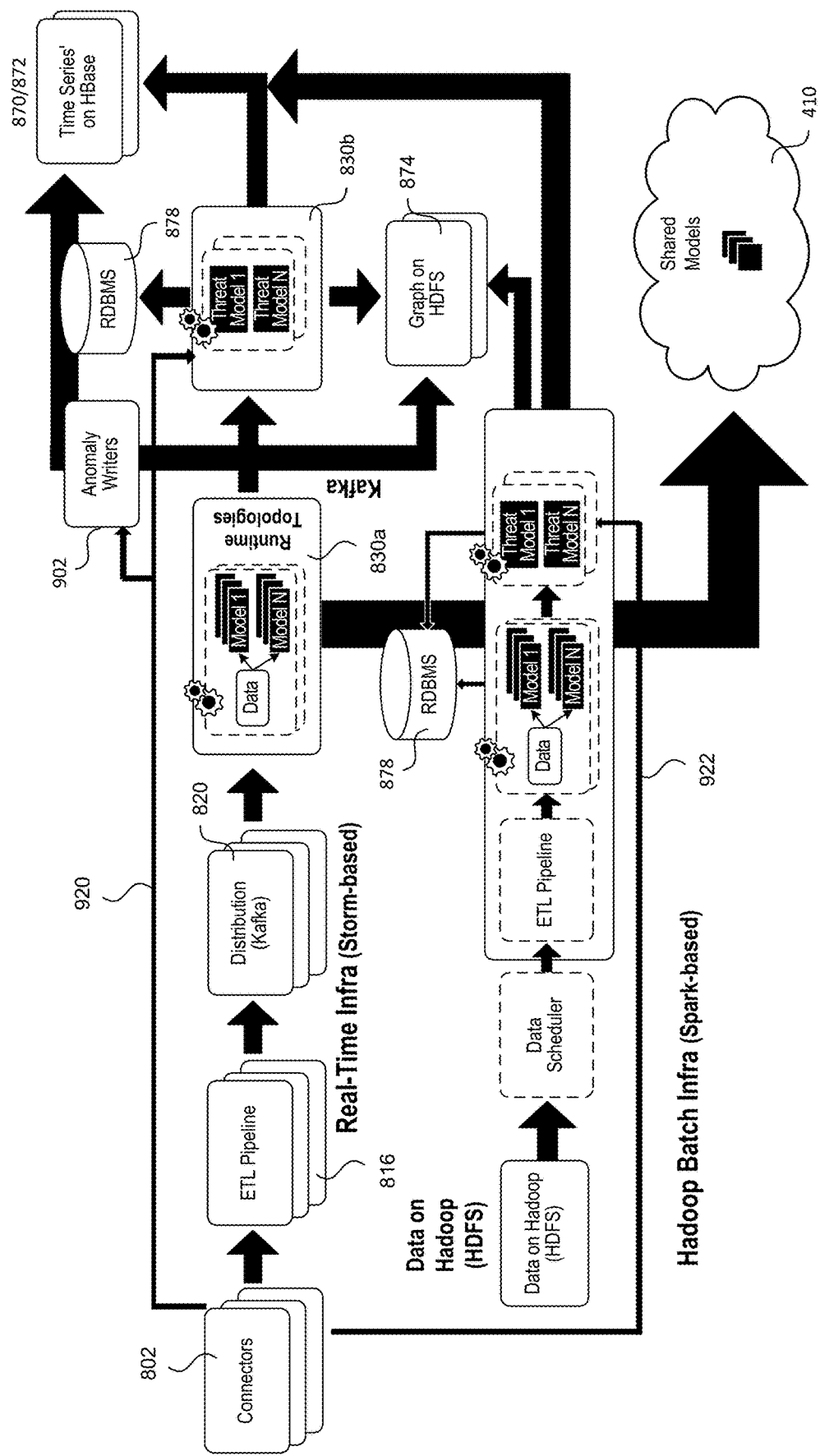
FIG. 8 shows an example implementation of the real-time processing path in greater detail.

FIG. 8 shows an example implementation of the real-time processing path in greater detail. With reference to both FIGS. 7 and 8, the analysis module 830 has been expanded as two analysis modules 830a and 830b to represent the anomaly detection stage and the threat detection stage, respectively. The analysis module 830a is responsible for detecting anomalies, and the output of the analysis module 830a is provided to the analysis module 830b for detecting threats or threat indicators based on the detected anomalies. In practice, the two stages may be performed by the same module utilizing different models in a staged manner.

The output of analysis module 830a, representing anomalies detected using machine learning-based models, is provided to an anomaly writer 902. The anomaly writer 902 can store the anomalies (e.g., including event data representing an anomalous event and any associated information) in the database 878. The same anomalies may also be stored in the time series database 870 and the HBase 872. The anomalies may also be stored in the graph database 874. In some embodiments, the anomalies can be stored in graph database 874 in the form of anomaly nodes in a graph or graphs; specifically, after an event is determined to be anomalous, an event-specific relationship graph associated with that event can be updated (e.g., by the anomaly writer 902) to include an additional node that represents the anomaly, as discussed further below. Certain embodiments of the security platform provide the ability to aggregate, at a specified frequency (e.g., once a day), the individual event-specific relationship graphs from all the processed events in order to compose a composite relationship graph for a given enterprise or associated network. This aforementioned update to an individual event's relationship graph allows the composite relationship graph to include nodes representing anomalies, thereby providing more security-related information. The individual event-specific relationship graph and the composite relationship graph are discussed in more detail below. The information stored may include the anomalies themselves and also relevant information that exists at the time of evaluation. These databases allow rapid reconstruction of the anomalies and all of their supporting data.

The output from the analysis modules 830b, representing threats, may be stored in the database 878, the times series database 870 or the Hbase 872. As in the case of anomalies, not only are the threats themselves stored, but relevant information that exists at the time of evaluation can also be stored.

The batch analysis module 882 can also operate in two stages for anomaly and threat detection in a similar fashion as discussed above with respect to the real-time analysis module 830. As previously discussed, anomalies detected using rules based-analysis may be combined with anomalies detected using machine learning anomaly detection models (e.g. at real time analysis module 830 or batch analysis module 882). In some embodiments anomaly data associated with these rules-based detected anomalies is passed through the data intake pipelines (e.g. ETL pipeline 816 and distribution 820). In other embodiments, anomaly data is passed directly to threat detection (e.g. analysis module 830b), for example, as indicated by pathways 920 and 922. As mentioned, these rules based anomalies may be received from a separate or integrated rules-based network security system 124. For example, a network administrator may specify anomaly detection rules via the Splunk® App for Enterprise Security. Anomalies can then be detected by processing data (e.g. from sources 804, 806, and 808) with these anomaly detection rules. Any detected anomalies can then be fed into threat detection models (in real time or batch) along pathways 920 and 922 and combined with anomalies detected using machine learning anomaly detection models at analysis modules 830a and 882. Also, in some embodiments rules-based detected anomalies may be stored in database 878 by anomaly writer 902.

User Behavioral Analysis

The security platform 800 can detect anomalies and threats by determining behavior baselines of various entities that are part of, or that interact with, a network (such as users, devices, applications, etc.) and then comparing activities of those entities to their behavior baselines to determine whether the activities are anomalous, or even rise to the level of threat. The behavior baselines can be adaptively varied by the platform 800 as new data are received. These functions can be performed by one or more machine-learning models, for example, in the real-time path, the batch path, or both.

Figure 9:
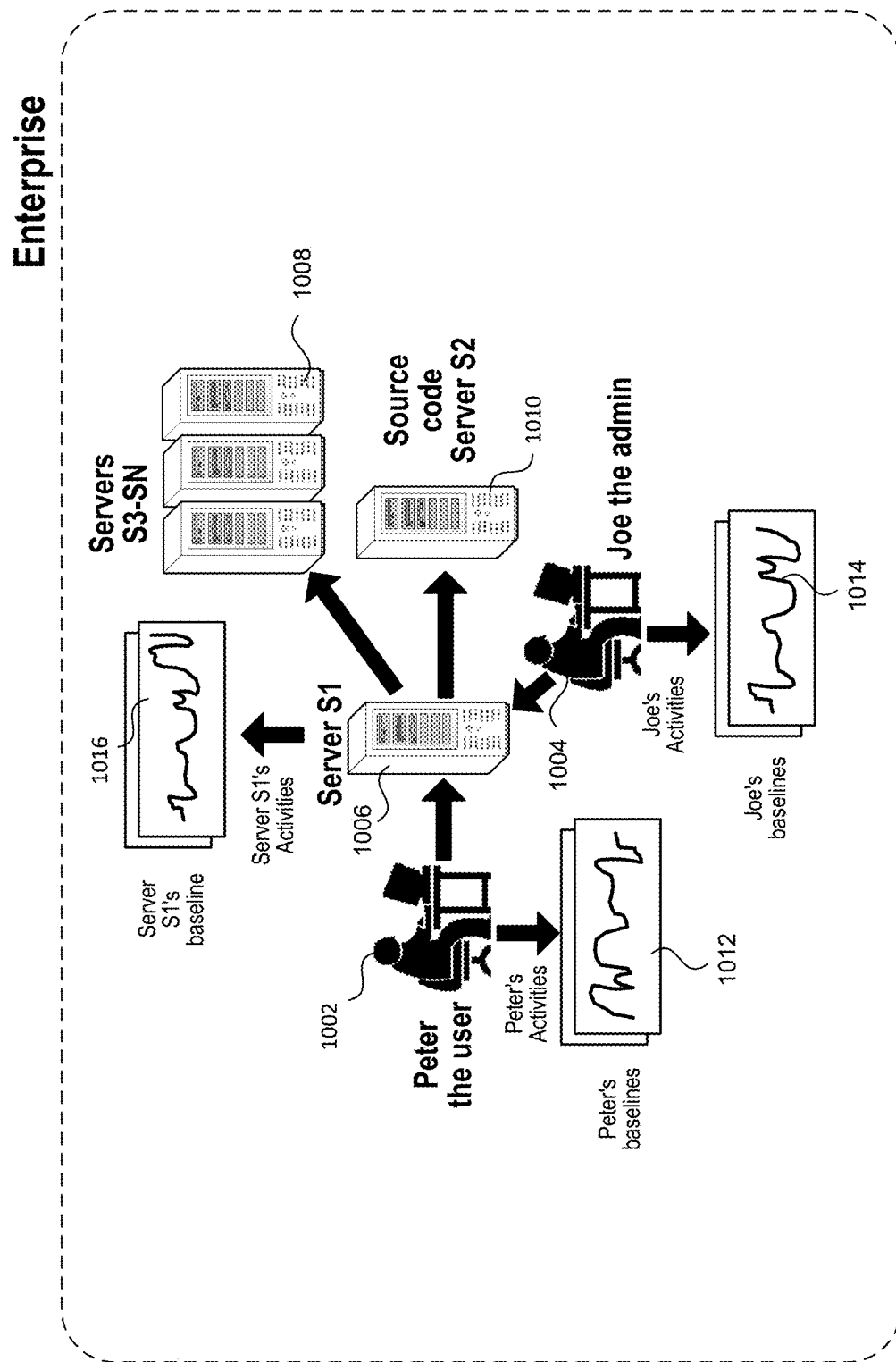
FIG. 9 shows an example representation of the process of building adaptive behavioral baselines and evaluating against such baselines to support the detection of anomalies.

FIG. 9 shows an example representation of a process of building behavior baselines to support the detection of anomalies. A human end user 1002 may employ a server 1006 to access a source code server 1010 for his work, for example. Assume that the human user 1002 occasionally accesses the data stored in servers 1008. In a manner described in more detail below, the security platform 800 can generate a baseline profile 1012 for access activities of user 1002, based on events indicative of network activities of user 1002. Likewise, a human administrative user 1004 other than user 1002 may employ the server 1006 to access the data stored in the servers 608. A baseline profile 1014 specific for access activities of user 604 can also be generated over time by the security platform 800, based on events indicative of network activities of user 1004.

The security platform 800 can create a behavior baseline for any type of entity (for example, a user, a group of users, a device, a group of devices, an application, or a group of applications). In the example of FIG. 9, the activities of server 1006 are monitored and a baseline profile 1016 specific for the server 1006 is generated over time, based on events indicative of network activities of server 1006.

Baseline profiles can be continuously updated (whether in real-time or in batch according to a predefined schedule) in response to received event data, i.e., they can be updated dynamically or adaptively based on event data. If the human user 1004 begins to access source code server 1010 more frequently in support of his work, for example, and his accessing of source code server 1010 has been judged to be legitimate by the security platform 800 or a network security administrator (i.e., the anomalies/threats detected upon behavior change have been resolved and deemed to be legitimate activities), his baseline profile 1014 is updated to reflect the updated "normal" behavior for the human user 1004.

In certain embodiments, anomalies and threats are detected by comparing events against the baseline profile for an entity to which the event relates (e.g., a user, an application, a network node or group of nodes, a software system, data files, etc.). If the variation is more than insignificant, the threshold for which may be dynamically or statically defined, an anomaly may be considered to be detected. The comparison may be based on any of various techniques, for example, time-series analysis (e.g., number of log-ins per hour), machine learning, or graphical analysis (e.g., in the case of security graphs or security graph projections). Preferably, this detection is performed by various machine learning models.

Additional details are discussed below regarding various components of the security platform including, for example, the data intake and preparation engine, event processing engine, configurations for real-time implementations, configurations for batch implementation, machine learning models and different applications, various kinds of anomaly and threat detections, and graphic user interfaces for presenting security-related issues.

Data Intake and Preparation

Figure 10:
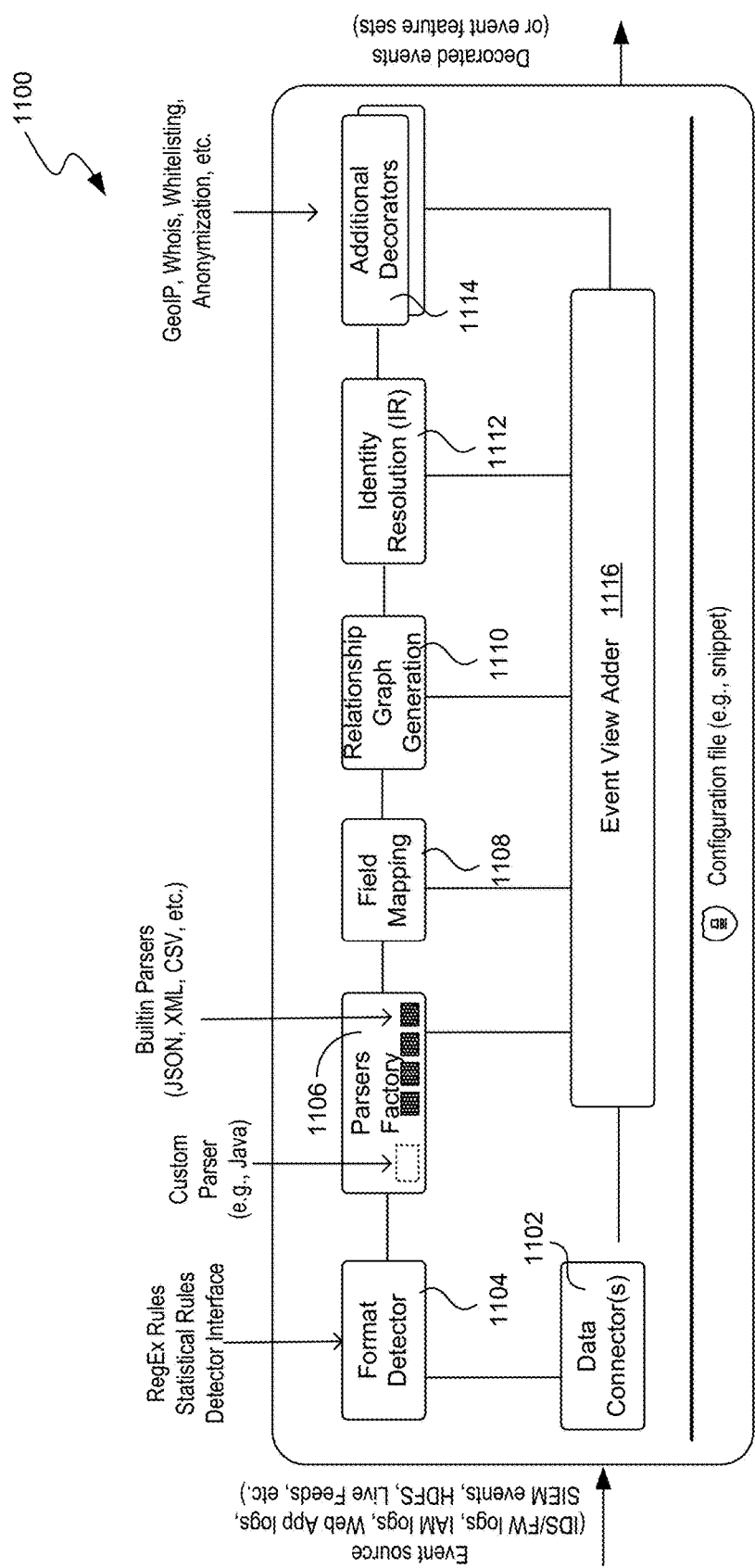
FIG. 10 shows an example implementation of the data intake and preparation stage of the network security platform.

FIG. 10 shows an example implementation of a data intake and preparation stage 1100 of the security platform 800. The data intake and preparation stage (or engine) 1100 can be an implementation of ETL stage 704 in FIG. 7 or semantic processor 816 in FIG. 8. The data intake and preparation stage 1100 can include a number of components that perform a variety of functions disclosed herein. In the example of stage 1100, the data intake and preparation stage of the security platform includes a number of data connectors 1102, a format detector 1104, a number of parsers 1106, a field mapper 1108, a relationship graph generator 1110, an identity resolution module 1112, a number of decorators 1114, and event view adder 1116. These components (e.g., sets of instructions) need not be implemented as separate software programs, procedures or modules, and thus various subsets of these components may be combined or otherwise rearranged in various embodiments. Also, the components shown in FIG. 10 are only one example of the data intake and preparation stage components that can be used by the security platform; the data intake and preparation stage could have more or fewer components than shown, or a different configuration of components.

The various components shown in FIG. 10 can be implemented by using hardware, software, firmware or a combination thereof, including one or more signal processing or application specific integrated circuits. The components in the stage 1100 are shown arranged in a way that facilitates the discussion herein; therefore, any perceivable sequence in the stage 1100 is merely an example and can be rearranged. Any step in the stage 1100 may be performed out-of-sequence or in parallel to the extent that such rearrangement does not violate the logic dependency of the steps. One or more steps described for the stage 1100 may be optional, depending on the deployed environment. The data output from the data intake and preparation stage 1100 can also be referred to herein as "decorated events" or "event feature sets." A decorated event includes the raw machine data associated with an event, plus any decoration, enrichment, information, or any other suitable intelligence that is generated based upon or extracted from the event during the data intake and preparation stage. In some embodiments, because of the computationally intensive processes that the data intake and preparation stage may perform, the data intake and preparation engine may be implemented separately from the rest of the stages in the security platform, for example, on a standalone server or on dedicated nodes in a distributed computer cluster.

Various data connectors 1102 can be employed by the security platform (e.g., at the data intake stage) to support various data sources. Embodiments of the data connectors 1102 can provide support for accessing/receiving indexed data, unindexed data (e.g., data directly from a machine at which an event occurs), data from a third-party provider (e.g., threat feeds such as Norse™, or messages from AWS™ CloudTrail™), or data from a distributed file system (e.g., HDFS™). Hence, the data connectors 1102 enable the security platform to obtain machine data from various different data sources. Some example categories of such data sources include:

(1) Identity/Authentication: e.g., active directory/domain controller, single sign-on (SSO), human resource management system (HRMS), virtual private network (VPN), domain name system (DNS), or dynamic host configuration protocol (DHCP);

(2) Activity: e.g., web gateway, proxy server, firewall, Netflow™, data loss prevention (DLP) server, file server, or file host activity logs;

(3) Security Products: e.g., endpoint security, intrusion prevention system, intrusion detection system, or anti-virus;

(4) Software as a Service (SaaS) or Mobile: e.g., AWS™ CloudTrail™, SaaS applications such as Box™ or Dropbox™, or directly from mobile devices; and (5) External Threat Feeds: e.g., Norce™, TreatStream™, Financial Services Information Sharing and Analysis Center (FS-ISAC)™, or third-party blacklisted IP/domains.

Depending on the embodiment, external threat feeds may directly feed to the security platform, or indirectly through one or more security products that may be coexisting in the environment within which the security platform is deployed. As used herein, the term "heterogeneous event" refers to the notion that incoming events may have different characteristics, such as different data formats, different levels of information, and so forth. Heterogeneous events can be a result of the events originating from different machines, different types of machines (e.g., a firewall versus a DHCP server), being in a different data format, or a combination thereof.

The data connectors 1102 can implement various techniques to obtain machine data from the data sources. Depending on the data source, the data connectors 1102 can adopt a pull mechanism, a push mechanism, or a hybrid mechanism. For those data sources (e.g., a query-based system, such as Splunk®) that use a pull mechanism, the data connectors 1102 actively collect the data by issuing suitable instructions to the data sources to grab data from those data sources into the security platform. For those data sources (e.g., ArcSignt™) that use a push mechanism, the data connectors 1102 can identify an input (e.g., a port) for the data sources to push the data into the system. The data connectors 1102 can also interact with a data source (e.g., Box™) that adopts a hybrid mechanism. In one embodiment of the data connectors 1102 for such hybrid mechanism, the data connectors 1102 can receive from the data source a notification of a new event, acknowledges the notification, and at a suitable time communicate with the data source to receive the event.

For those data connectors 802 that may issue queries, the queries can be specifically tailored for real-time (e.g., in terms of seconds or less) performance. For example, some queries limit the amount of the anticipated data by limiting the query to a certain type of data, such as authentication data or firewall related data, which tends to be more relevant to security-related issues. Additionally or alternatively, some queries may place a time constraint on the time at which an event takes place.

Moreover, in some examples, the data connectors 1102 can obtain data from a distributed file system such as HDFS™. Because such a system may include a large amount of data (e.g., terabytes of data or more), it is preferable to reduce data movement so as to conserve network resources. Therefore, some embodiments of the data connectors 802 can generate a number of data processing jobs, send the jobs to a job processing cluster that is coupled to the distributed file system, and receive the results from the job processing cluster. For example, the data connectors 1102 can generate MapReduce™ jobs, and issue those jobs to a job processing cluster (e.g., YARN™) that is coupled to the distributed file system. The output of the job processing cluster is received back into the security platform for further analysis, but in that case, no or very little raw machine data is moved across the network. The data is left in the distributed file system. In some examples, the generated jobs are user behavior analysis related.

Optionally, after the data connectors 802 obtain/receive the data, if the data format of the data is unknown (e.g., the administrator has not specified how to parse the data), then the format detector 1104 can be used to detect the data format of the input data. For example, the format detector 1104 can perform pattern matching for all known formats to determine the most likely format of a particular event data. In some instances, the format detector 1104 can embed regular expression rules or statistical rules in performing the format detection. Some examples of the format detector 1104 employ a number of heuristics that can use a hierarchical way to perform pattern matching on complex data format, such as an event that may have been generated or processed by multiple intermediate machines. In one example, the format detector 1104 is configured to recursively perform data format pattern matching by stripping away a format that has been identified (e.g.,, by stripping away a known event header, like a Syslog header) in order to detect a format within a format.

However, using the format detector 1104 to determine what data format the input data may be at run time may be a time- and resource-consuming process. At least in the cybersecurity space, it is typical that the formats of the machine data are known in advance (e.g., an administrator would know what kind of firewall is deployed in the environment). Therefore, as long as the data source and the data format are specified, the data intake and preparation stage can map the data according to known data formats of a particular data source, without the need of performing data format detection. In certain embodiments, the security platform can prompt (e.g., through a user interface) the administrator to specify the data format or the type of machine(s) the environment includes, and can automatically configure, for example, the parsers 1106 in the data intake and preparation stage for such machines.

Further, the security platform provides a way to easily supporting new data format. Some embodiments provide that the administrator can create a new configuration file (e.g., a configuration "snippet") to customize the data intake and preparation stage for the environment. For example, for a particular data source, the configuration file can identify, in the received data representing an event, which field represents a token that may correspond to a timestamp, an entity, an action, an IP address, an event identifier (ID), a process ID, a type of the event, a type of machine that generates the event, and so forth. In other examples (e.g., if a new data format is binary), then the security platform allows an administrator to leverage an existing tokenizer/parser by changing the configuration file, or to choose to implement a new, customized parser or tokenizer.

In a number of implementations, through the configuration file (e.g., snippet), the administrator can also identify, for example, field mappings, decorators, parameters for identity resolution (IR), or other parameters of the data intake and preparation stage. The configuration snippet can be monitored and executed by the data intake and preparation engine on the fly to allow the an administrator to change how various components in the data intake and preparation engine functions without the need to recompile codes or restart the security platform.

After receiving data by the data connectors 1102, the parsers 1106 parse the data according to a predetermined data format. The data format can be specified in, for example, the configuration file. The data format can be used for several functions. The data format can enable the parser to tokenize the data into tokens, which may be keys, values, or more commonly, key-value pairs. Examples of supported data format include machine data output as a result of active-directory activity, proxy activity, authentication activity, firewall activity, web gateway activity, virtual private network (VPN) connection activity, an intrusion detection system activity, network traffic analyzer activity, or malware detection activity.

Each parser can implement a set of steps. Depending on what type of data the data intake and preparation stage is currently processing, in some embodiments, the initial steps can including using regular expression to perform extraction or stripping. For example, if the data is a system log (syslog), then a syslog regular expression can be first used to strip away the packet of syslog (i.e., the outer shell of syslog) to reveal the event message inside. Then, the parser can tokenize the event data into a number of tokens for further processing.

The field mapper 1108 can map the extracted tokens to one or more corresponding fields with predetermined meanings. For example, the data format can assist the field mapper 1108 to identify and extract entities from the tokens, and more specifically, the data format can specify which of the extracted tokens represent entities. In other words, the field mapper 1108 can perform entity extraction in accordance with those embodiments that can identify which tokens represent entities. An entity can include, for example, a user, a device, an application, a session, a uniform resource locator (URL), or a threat. Additionally, the data format can also specify which tokens represent actions that have taken place in the event. Although not necessarily, an action can be performed by one entity with respect to another entity; examples of an action include use, visit, connect to, log in, log out, and so forth. In yet another example, the filed mapper 1108 can map a value extracted to a key to create a key-value pair, based on the predetermined data format.

The entity extraction performed by the field mapper 1104 enables the security platform to gain potential insight on the environment in which the security platform is operating, for example, who the users are, how many users there may be in the system, how many applications that are actually being used by the users, or how many devices there are in the environment.

Event Relationship Discovery/Mini-Graphs

Figures 11, 12:
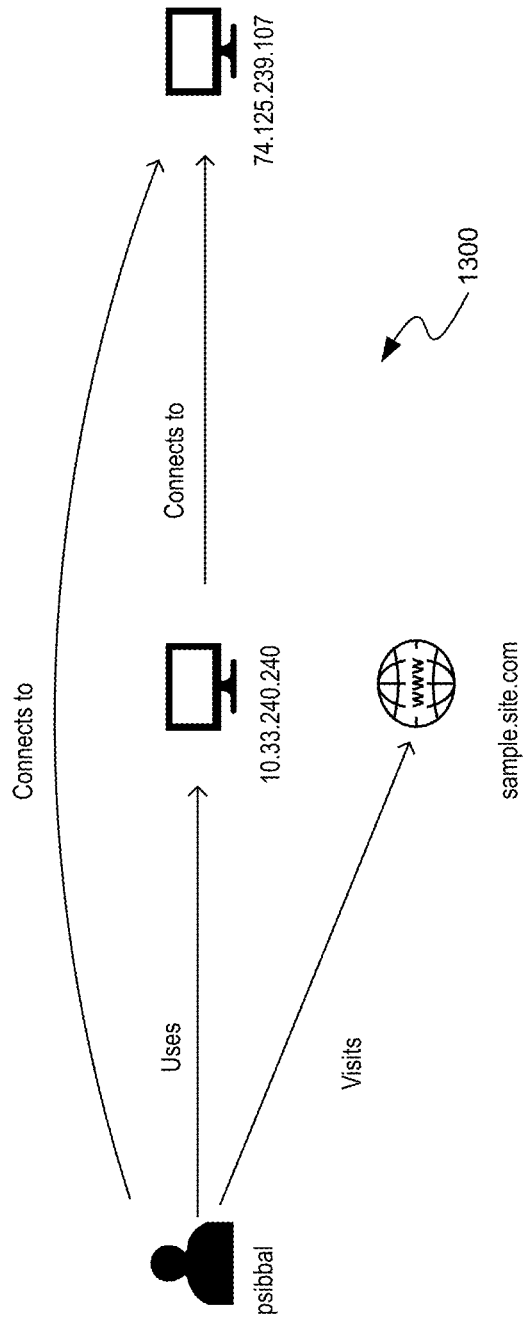
FIG. 11 shows raw machine data received by the data intake and preparation stage.
FIG. 12 shows an event-specific relationship graph based on the event shown in FIG. 11.

FIGS. 11 and 12 show an example event relationship discovery and recordation technique, which can be implemented in the data intake and preparation stage. To facilitate description, FIGS. 11 and 12 are explained below with reference to FIG. 10. The relationship discovery and recordation technique can be performed by, for example, the relationship graph generator 1110. Specifically, after the entities are identified in the tokens, the relationship graph generator 1110 is operable to identify a number of relationships between the entities, and to explicitly record these relationships between the entities. Some implementations of the relationship graph generator 1110 generate a single relationship graph for each event; such an event-specific relationship graph may also be called a "mini-graph." Further, some implementations incorporate the generated relationship graph into the event as metadata, in the form of a data structure representing the relationship graph. A graph in the context of this description includes a number of nodes and edges. Each node in the relationship graph represents one of the entities involved in the event, and each edge represents a relationship between two of the entities. In general, any event involves at least two entities with some relationship between them (e.g., a device and a user who accesses the device) and therefore can be represented as an event-specific relationship graph.

In some implementations, the graph generator 1110 can identify a relationship between entities involved in an event based on the actions that are performed by one entity with respect to another entity. For example, the graph generator 1110 can identify a relationship based on comparing the action with a table of identifiable relationships. Such a table of identifiable relationship may be customizable and provides the flexibility to the administrator to tailor the system to his data sources (described above). Possible relationships can include, for example, "connects to," "uses," "runs on," "visits," "uploads," "downloads," "successfully logs onto," "restarts," "shuts down," "unsuccessfully attempts to log onto," "attacks," and "infects." Also, the identified relationship between the entities can be indicative of the action, meaning that the identifiable relationship can include the action and also any suitable inference that can be made from the action. For example, an event that records a GET command (which is an action) may indicate that the user is using a machine with a certain IP address to visit a certain website, which has another IP address. In practice, however, the number of identifiable relationships can be directly correlated to the size of the graph, which may impact the security platform's responsiveness and performance. Also, identifiable relationships can include a relationship between entities of the same type (e.g., two users) or entities of different types(e.g., user and device).

In some embodiments, specific details on how to construct the edges and the identifiable relationships are recorded in the configuration file (e.g., snippet). For example, a portion of the configuration file can specify, for the relationship graph generator 1110, that an edge is to be created from an entity "srcUser" to another entity "sourceIP," with a relationship that corresponds to an event category to which the event belongs, such as "uses."

FIG. 11 illustrates raw event data 1200 received by the data intake and preparation stage. The example set of raw event data 1200, representing activity in an information technology environment, may be part of a log data generated by a web gateway server. In some embodiments, the example set of event data 1200 may represent an event or at least a sub portion of the machine data underlying an event. The web gateway is located where network traffic in and out the environment goes through, and therefore can log the data transfer and web communication from a system inside the environment. The particular activity as represented by the event data 1200 indicates that, at a particular point of time identified by the timestamp, the user "psibbal" uses the IP address "10.33.240.240" to communicate with an external IP address "74.125.239.107," and transfers 106 bytes of data.

Using the aforementioned techniques (e.g., the parsers 1106, and the field mapper 1108), the graph generator 1110 can readily identify that the event represented in the FIG. 11 involves a number of entities, such as the user "psibbal," the source IP "10.33.240.240," the destination IP "74.125.239.107," and an URL "sample.site.com." The graph generator 1110 also identifies that an action "GET" is involved in the event. Accordingly, the graph generator 1110 can compare the action to the table of identifiable actions, identify one or more relationships between the entities, and create an event-specific relationship graph 1300 based on the event. As shown in FIG. 12, the relationship graph 1300 includes the entities that are involved in the events. Each entity is represented by a different node. The relationship graph 1300 also includes edges that link the nodes representing entities. The identified relationships between the entities are the edges in the graph 1300. The relationship graph 1300 can be stored in known data structures (e.g., an array) suitable for representing graphs that have nodes and edges.

Note, however, that the components introduced here (e.g., the graph generator 1110) may be tailored or customized to the environment in which the platform is deployed. As described above, if the network administrator wishes to receive data in a new data format, he can edit the configuration file to create rules (e.g., in the form of functions or macros) for the particular data format including, for example, identifying how to tokenize the data, identifying which data are the entities in the particular format, or identifying the logic on how to establish a relationship. The data input and preparation stage then can automatically adjust to understand the new data format, identify identities and relationships in events in the new format, and create event relationship graphs therefrom.

Then, in some embodiments, the graph generator 1110 attaches the relationship graph 902 to the associated event. For example, the graph 1300 may be recorded as an additional field of data included in an event. In alternative embodiments, the relationship graph 1300 can be stored or transferred individually (i.e., separate from the associated event) to subsequent nodes in the security platform. After additional processes (e.g., identity resolution, sessionization, or other decorations) in the data intake and preparation stage, events including the relationship graph 1300 can be sent to a distributed messaging system, which may be implemented based on Apache Kafka™. The messaging system can in turn send the event to an event processing engine (e.g., a machine learning model execution and analytics engine, such as the complex event processing engine introduced here and described further below) for further processing. As described further below, the event processing engine is operable to use machine learning models to perform analytics based on the events and, in some instances, in conjunction with their associated relationship graphs, to security-oriented anomalies and threats in the environment.

The messaging system (e.g., Apache Kafka™) can also accumulate or aggregate, over a predetermined period of time (e.g., one day), all the relationship graphs that are generated from the events as the events come into the security platform. Particularly, note that certain types of behavioral anomalies and threats can become more readily identifiable when multiple events are compared together, and sometimes such comparison may even be the only way to identify the anomalies or threats. For example, a beaconing anomaly happens when there is a device in the network that communicates with a device outside the network in an unexpected and (mostly) periodic fashion, and that anomaly would become more identifiable when relationship graphs associated with all the device's related beacons are combined into a composite relationship graph. As such, at the messaging system, the relationship graphs (mini-graphs) for all events, or at least for multiple events, can be combined into a larger, composite relationship graph. For example, a computer program or a server can be coupled to the messaging system to perform this process of combining individual relationship graphs into a composite relationship graph, which can also be called an enterprise security graph. The composite relationship graph or enterprise security graph can be stored, for example, as multiple files, one file for each of multiple predetermined time periods. The time period depends on the environment (e.g., the network traffic) and the administrator. In some implementations, the composite relationship graph is stored (or "mined" in data mining context) per day; however, the graph mining time period can be a week, a month, and so forth.

In some embodiments, event-specific relationship graphs are merged into the composite relationship graph on an ongoing basis, such that the composite relationship graph continuously grows over time. However, in such embodiments it may also be desirable to remove ("age out") data deemed to be too old, from the composite relationship graph, periodically or from time to time.

In some embodiments, the nodes and edges of the composite graph are written to time namespaces partitioned graph files. Then, each smaller segment can be merged with a master partition (e.g., per day). The merge can combine similar nodes and edges into the same record, and in some embodiments, can increase the weight of the merged entity nodes. Note that the exact order of the events' arrival becomes less important, because even if the events arrive in an order that is not the same as how they actually took place, as long as the events have timestamps, they can be partitioned into the correct bucket and merged with the correct master partition. Some implementations provide that the composite graphs can be created on multiple nodes in a parallelized fashion.

In this manner, this composite relationship graph can include all identified relationships among all identified entities involved in the events that take place over the predetermined period of time. As the number of events received by the security platform increases, so does the size of this composite relationship graph. Therefore, even though a relation graph from a single event may not carry much meaning from a security detection and decision standpoint, when there are enough events and all the relationship graphs from those events are combined into a composite relationship graph, the composite relationship graph can provide a good indication of the behavior of many entities, and the quality/accuracy of this indication increases over time as the composite relationship graph grows. Then, the subsequent processing stages (e.g., the complex processing engine) can use models to perform analytics on the composite relationship graph or on any particular portion (i.e., "projection", discussed further below) of the composite relationship graph. In some embodiments, the composite relationship graph is persistently stored using a distributed file system such as HDFS™.

In some embodiments, when various individual events' relationship graphs (along with their associated decorated events) are stored in the messaging system but have not yet been combined to create the composite relationship graph, each such event's relationship graph can be further updated with any information (e.g., anomalies) that is discovered by downstream processes in the security platform. For example, if an event is found to be an anomalous, then the relationship graph associated with that anomalous event can be updated to include this information. In one example, the individual relationship graph of that anomalous event is revised to include an anomaly node (along appropriate edges), so that when the composite relationship graph is created, it can be used to determine what other entities might be involved or affected by this anomaly.

At least in some embodiments, the composite graph enables the security platform to perform analytics on entity behaviors, which can be a sequence of activities, a certain volume of activities, or can be custom defined by the administrator (e.g., through a machine learning model). By having an explicit recordation of relationships among the events, the relationship graph generator 810 can enable the analytics engines introduced here (e.g., the complex processing engine) to employ various machine learning models, which may focus on different portions or aspects of the discovered relationships between all the events in the environment, in order to detect anomalies or threats.

Identity Resolution (IR) and Device Resolution (DR)

Figure 13:
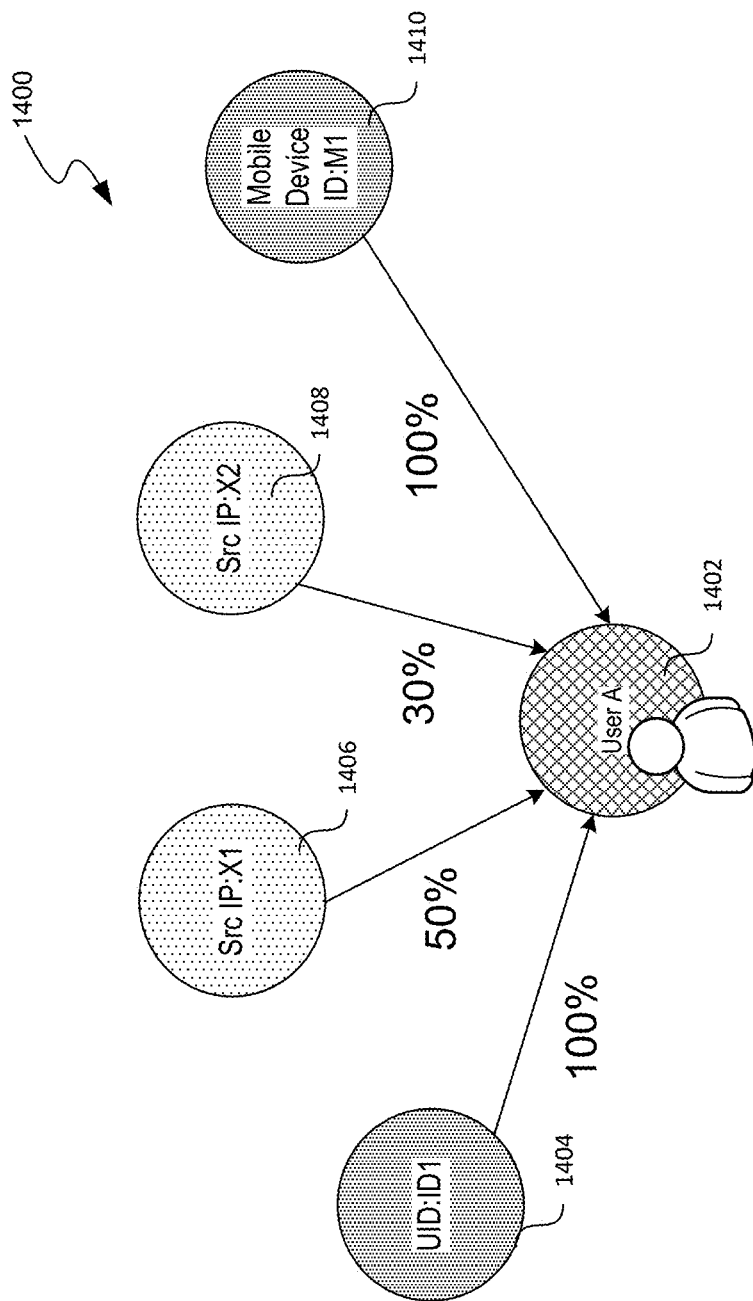
FIG. 13 shows an example implementation of an identity resolution technique based on the information in the events.

FIG. 13 shows an example identity resolution technique based on the information in the events, which can be implemented in the data intake and preparation stage described above. To facilitate description, FIG. 13 is explained below with reference to FIG. 10. Identity resolution can be performed by, for example, the identity resolution module 1112. Specifically, after the entities are identified in the tokens, the identity resolution module 1112 is operable to perform an identity resolution, which enables keeping track of which user logged into which particular computer system or device across the network.

In the context of computer security and especially unknown threat detection, information about a user's behavior can be very important. However, as previously discussed, not all events/activities/logs include user information. Consider a typical firewall event as an example. Except for a few advanced firewall products, many typical firewalls do not know and do not record the user's identity in an event. Therefore, many times even when a particular communication is determined to be malicious, traditional security products are unable to attribute the malicious behavior to a particular user. Thus, when logs or device-level events do not capture the user information, the identity resolution module 1112 in the data intake and preparation stage can attribute those events (and behaviors) to the right user.

In addition, traditional solutions for identity resolution adopt techniques that are too simplistic and lack responsiveness to any changes to the environment. For example, one traditional technique may be a simple lookup, such as where the administrator maintains a resource attribution file that records a particular IP address belongs to a particular person. However, such a file is often hard to keep accurate and easily becomes obsolete, especially when the amount of the devices in the environment is very large, as is often the case in today's environment.

Accordingly, the security platform introduced here can perform identity resolution based on the facts. The identity resolution module 1112 can gain the knowledge by observing the system environment (e.g., based on authentication logs), thereby building the intelligence to make an educated identity resolution determination. That is, the identity resolution module 1112 is able to develop user identity intelligence specific and relevant to the system's environment without any explicit user identity information.

To facilitate this fact-based identity resolution functionality in the security platform, the identity resolution module 1112 can utilize a machine learning model to generate and track a probability of association between a user and a machine identifier. Specifically, after the entities in event data that represents an event are extracted (e.g., by the field mapper 1108), the identity resolution module 1112 can identify whether the event data includes a user identifier or a machine identifier, and can create or update the probability of association accordingly. As is discussed in more detail in other sections of this disclosure, the model initiated by the identity resolution module 1112 can, in some embodiments, obtain the information it needs, e.g., obtaining machine identifiers in an event, through one or more interfaces. A machine identifier is an identifier that can be associated with a machine, a device, or a computing system; for example, a machine identifier can be a media access control (MAC) address, or an Internet Protocol (IP) address. Different machine identifiers can be generated by the same machine. A user identifier is an identifier that can be associated with a user; for example, a user identifier can be a user login identifier (ID), a username, or an electronic mail address. Although not illustrated in FIG. 10, some embodiments of the identity resolution module 1112 can resolve a user identity of a particular user by, for example, querying a database using a user identifier as a key. The database, which may be a human resource management system (HRMS), can have records indicating a number of user identifiers that are registered to the user identity. Note that, in some alternative embodiments, a user identifier may be directly treated as a user for simpler implementation, even though such implementation may not be an ideal one because behaviors of the same user may not be detected because the user has used different user identifiers.

More specifically, a machine learning model can have different phases, for example, a training phase (after initiation and before ready) and an active phase (after ready and before expiration). In a training phase of a machine learning model, if an event that is received involves both a user and a machine identifier (e.g., if the event data representing the event has both a user identifier and a machine identifier), then machine learning model that is employed by the identity resolution module 1112 can use this event to create or update the probability of association between the user and the machine identifier. For example, when an authentication event is received (e.g., when a user logs into a particular machine) and involves a user (e.g., identified by a user identifier such as a username) and a machine identifier, the model learns that the user is now associated with the machine identifier, at least for a period of time until the user logs out or times out from the particular machine.

As more events are received, the model can become increasingly better trained about the probability of association between the user and the machine identifiers. In some embodiments, the identity resolution module 1112 creates a probabilistic graph to record a probability of association for each user it is currently tracking. The probabilistic graph can include peripheral nodes, a center node, and edges. An example of such probabilistic graph 1400 is shown in FIG. 13. In graph 1400, nodes 1404, 1406, 1408, and 1410 are the peripheral nodes representing the machine identifiers. Node 1402 is the center node representing the user. Edges between each peripheral node and the center node represent the probability of association between the particular machine identifier and the user. According to some embodiments, the machine learning models used for identification resolution are user specific. It is also noted that the machine learning models used in the identity resolution (and device resolution, introduced below) are generally simpler than those models that would be used for anomaly and threat detection. In many embodiments, the models that are used in the identity resolution or device resolution are time-sequenced probabilistic graphs, in which the probability changes over time.

According to a number of embodiments, the models that are used to generate and track the probability of association between each user and possible machine identifiers are time-dependent, meaning that a result from the models has a time-based dependence on current and past inputs. The time dependence is useful to capture the scenario where a device is first assigned or given to a particular user, and is subsequently reassigned to a different user, which happens often in a large organization. To achieve this, in some embodiments, the identity resolution module 1112 can initiate, for a given user, different versions of the machine learning model at different point of time, and each version may have a valid life time. As events related to the given user arrive, versions of a machine learning model are initiated, trained, activated, (optionally) continually updated, and finally expired.

The models can be trained and, in some implementations, continually updated after their activation, by relevant events when the events are received. An example of a relevant event is an authentication event, which inherently involves a user (e.g., which may be represented by a user identifier) and a number of machine identifiers (e.g., an IP address or a MAC address). Depending on the model, other criteria for an event to be considered relevant for model training or updating purposes may include, for example, when a new event includes a particular machine identifier, a particular user identifier, or the recency of the new event. Moreover, some models may assign a different weight to the new event based on what type of event it is. For example, given that the new event is an authentication event, some models assign more weight to a physical login type of authentication event than to any other type of authentication event (e.g., a remote login).

Depending on the particular deployment, the machine learning model can be considered trained and ready when one or more criteria are met. In one example, a version of the model can be considered trained when a certain number of events have gone through that version of the model. In another example, a version of the model can be considered trained when a certain time period has passed after the version of the model is initiated. Additionally or alternatively, a version of the model is considered trained when a certain number of criteria are met (e.g., when the model becomes sufficiently similar to another model). Additional details of machine learning models that can be employed (including training, readiness, activation, and expiration) by various engines and components in the security platform are discussed in other sections of this disclosure.

After a version of a model is sufficiently trained (e.g., when the probability of association exceeds a confidence threshold, which depends on the model's definition and can be tuned by the administrator for the environment), the identity resolution module 1112 then can activate the version of the model. Thereafter, when a new event arrives, if the new event meets certain criteria for the identity resolution, the identity resolution module 1112 can create a user association record (e.g., in memory) indicative that the new event is associated with a particular user. The criteria for the identity resolution can include, for example, when the new event includes a machine identifier (regardless of whether it also includes a user identifier), or when the new event is received during a time period which the version is active. It is observed that the identity resolution technique is especially useful to help identify an event that includes only a machine identifier but no user identifier.

Based on this user association record, the identity resolution module 1112 can annotate the new event to explicitly connect the new event to the particular user. For example, the identity resolution module 1112 can add, as a field, the particular user's name to the new event in its associated event data. Alternatively, the identity resolution module 1112 can annotate the new event by adding a user identifier that belongs to the particular user. In addition, the identity resolution module 1112 can send the user association record to a cache server that is implemented based on Redis™.

With the fact-based identity resolution techniques disclosed herein, the security platform has the ability to attribute an event that happens on a device to a user, and to detect behavioral anomalies and threats based on that attribution. The security platform can achieve this without the need of maintaining an explicit look-up file and irrespective of what the data source is (i.e., regardless of whether a data source for an event includes a user identifier or not).

Although not illustrated in FIG. 11, an embodiment of the data intake and preparation stage can also implement a device resolution module to create an association between one machine identifier and another. In a manner similar to how the identity resolution module 1112 tracks the possibility of association between a user and a machine identifier, the device resolution module can track the possibility of association between a first machine identifier and a second machine identifier. Thereafter, when a new event is received, if the event includes the first machine identifier but not the second, the device resolution module can create a machine association record indicative that the new event having the first machine identifier is associated with the second machine identifier. Optionally, the machine identifier can be translated into a more user-friendly machine name, such as "Tony's Laptop."

The device resolution technique can be particularly useful in an environment that includes a dynamic host configuration protocol (DHCP) service, and therefore a computer in the environment does not have a static IP address. Because the same computer can potentially get a different IP address each time it starts in such environment, naively attributing a behavior to a particular IP address may lead to incorrect analysis. In manners similar to the identity resolution, the device resolution can create a mapping between, for example, a MAC address and an IP address, which can remain valid for a period of time. One example of events where the relationship between a MAC address and an IP address can be found is the DHCP logs. Like identity resolution, such machine identifier mapping can be dynamically updated as the time goes by and more events are received. Whenever the environment changes, the device resolution module can derive a new mapping, meaning that the same IP address can become associated with a different, updated MAC address. Note that, for the particular case of DHCP services, it is generally easier to estimate when a particular version of a device resolution model should expire, because a DHCP service setting typically includes explicit lease expiration provisions.

Machine Learning Based Complex Event Processing

Certain embodiments introduced here include a machine learning-(ML-) based complex event processing (CEP) engine that provides a mechanism to process data from multiple sources in a target computer network (e.g. in an information technology environment) to derive anomaly-related or threat-related conclusions in real-time so that an appropriate response can be formulated prior to escalation. A CEP engine is a processing entity that tracks and reliably analyzes and processes unbounded streams of electronic records to derive a conclusion therefrom. An "unbounded stream" in this context is an open-ended sequence of data that is continuously received by the CEP engine. An unbounded stream is not part of a data container with a fixed file size; instead, it is a data sequence whose endpoint is not presently known by the receiving device or system. In a computer security context, a CEP engine can be useful to provide real-time analysis of machine data to identify anomalies.

The ML-based CEP engine described herein enables real-time detection of and response to computer security problems. For example, the input data of the ML-based CEP engine includes event feature sets, where each event feature set corresponds to an observable event in the target computer network.

A conventional CEP engine relies on user-specified rules to process an incoming event to identity a real-time conclusion. User-specified rules benefit from its computational simplicity that makes real-time computation plausible. However, conventional CEP engines rely on people to identify known event patterns corresponding to known conclusions. Accordingly, conventional CEP engines are unable to derive conclusions based on patterns or behaviors that are not previously known to authors of the user-specified rules. Conventional CEP engines do not consider historical events. The added complexity (e.g., memory consumption and processing power requirement) associated with the inclusion of the historical events would likely overtax an otherwise resource-limited computer system that supports a conventional CEP engine.

Certain embodiments introduced here include an ML-based CEP engine that utilizes distributed training and deliberation of one or more machine learning models. "Deliberation" of a machine learning model or a version of a machine learning model involves processing data through a model state of the machine learning model or version of the machine learning model. For example, deliberation can include scoring input data according to a model deliberation process logic as configured by the model state. The ML-based CEP engine processes event feature sets through the ML models to generate conclusions (e.g., security-related anomalies, security-related threat indicators, security-related threats, or any combination thereof) in real-time. "Real-time" computing, or "reactive computing", describes computer systems subject to a processing responsiveness restriction (e.g., in a service level objective (SLO) in a service level agreement (SLA)). In real-time processing, conclusions are reached substantially immediately following the receipt of input data such that the conclusions can be used to respond the observed environment. The ML-based CEP engine continuously receives new incoming event feature sets and reacts to each new incoming event feature set by processing it through at least one machine learning model. Because of real-time processing, the ML-based CEP engine can begin to process a time slice of the unbounded stream prior to when a subsequent time slice from the unbounded stream becomes available.

In some embodiments, the ML-based CEP engine is implemented as, or within, analysis modules 830 or 882 in FIG. 7 and couples to a data intake and preparation stage that receives data from multiple data sources 802. The target-side computer system is operated in a target computer network, which the ML-based CEP engine monitors for computer security issues. The target-side computer system collects machine data from the target computer network as the raw event data. The data intake and preparation stage creates an event feature set from raw machine data pertaining to a single machine-observed event or a sequence of machine-observed events. The event feature set can include at least a subset of the raw machine data; metadata associated with the raw machine data; transformed, summarized, or normalized representation of portions of the raw machine data; derived attributes from portions of the raw machine data; labels for portions of the raw machine data; or any combination thereof. To facilitate real-time processing in the ML-based CEP engine, the data intake and preparation stage can process, in real-time, the raw machine data as it is received. The data intake and preparation stage and the ML-based CEP engine can store its inputs and outputs in non-persistent memory (e.g., volatile memory), such that all I/O operations of the ML-based CEP engine and the data intake and preparation stage operate on the non-persistent memory.

Operations in non-persistent memory can help reduce the time lag of the ML-based CEP engine to satisfy the processing responsiveness restriction. In some embodiments, instead of the non-persistent memory, the inputs and outputs are stored in solid-state memory (e.g., one or more Flash drives), which is typically faster than hard disks and other non-solid-state data storage devices.

The ML-based CEP engine trains and retrains (e.g., updates) the machine learning models in real-time and applies (e.g., during the model deliberation phase) the machine learning models in real-time. Parallelization of training and deliberation enables the ML-based CEP engine to utilize machine learning models without preventing or hindering the formation of real-time conclusions. The ML-based CEP engine can be implemented on a distributed computation system (e.g., a distributed computation cluster) optimized for real-time processing. For example, a distributed computation system, such as Apache Storm™, can implement task parallelism instead of data parallelism. Storm is an open source distributed real-time computation system. In other embodiments, the distributed computation system can be implemented with data parallelism, such as Apache Spark™ or Apache Spark Streaming. Spark is an open source cluster computing framework. The distributed computation system can be coupled to other distributed components, such as a cluster-based cache (e.g., Redis), a distributed file system (e.g., HDFS), a distributed resource management system, or any combination thereof. The ML-based CEP engine can implement additional services to facilitate the distributed training and deliberation of machine learning models, such as a distributed messaging platform and a central service for distributed synchronization and centralized naming and configuration services.

The ML-based CEP engine disclosed herein is advantageous in comparison to conventional CEP engines at least because of its ability to recognize unknown patterns and to incorporate historical data without overburdening the distributed computation system by use of machine learning models. Because the ML-based CEP engine can utilize unsupervised machine learning models, it can identify entity behaviors and event patterns that are not previously known to security experts. In some embodiments, the ML-based CEP engine can also utilize supervised, semi-supervised, and deep machine learning models.

The ML-based CEP engine is further capable of condensing and summarizing historical knowledge by observing streams of events to train the machine learning models. This enables the ML-based CEP engine to include a form of historical comparison as part of its analysis without consuming too much data storage capacity. For example, the ML-based CEP engine can train a decision tree based on the historical events. In this case, the trained decision tree is superior to a user-specified rule because it can make predictions based on historical sequence of events. In another example, the ML-based CEP engine can train a state machine. Not only is the state machine trained based on a historical sequences of events, but it is also applied based on a historical sequence of events. For example, when the ML-based CEP engine processes event feature sets corresponding to an entity through the state machine, the ML-based CEP engine can track a number of "states" for the entity. These run-time states (different from a "model state" as used in this disclosure) represent the history of the entity without having to track every historical event involving the entity.

The machine learning models enable the ML-based CEP engine to perform many types of analysis, from various event data sources in various contextual settings, and with various resolutions and granularity levels. For example, a machine learning model in the ML-based CEP engine can perform entity-specific behavioral analysis, time series analysis of event sequences, graph correlation analysis of entity activities, peer group analysis of entities, or any combination thereof. For example, the data sources of the raw event machine can include network equipment, application service servers, messaging servers, end-user devices, or other computing device capable of recording machine data. The contextual settings can involve scenarios such as specific networking scenarios, user login scenarios, file access scenarios, application execution scenarios, or any combination thereof. For example, an anomaly detected by the machine learning models in the ML-based CEP engine can correspond to an event, a sequence of events, an entity, a group of entities, or any combination thereof. The outputs of the machine learning models can be an anomaly, a threat indicator, or a threat. The ML-based CEP engine can present these outputs through one or more output devices, such as a display or a speaker.

Examples of entity-specific behavioral analysis include hierarchical temporal memory processes that employ modified probabilistic suffix trees (PST), collaborative filtering, content-based recommendation analysis, statistical matches in whitelists and blacklists using text models, entropy/randomness/n-gram analysis for uniform resource locators (e.g., URLs), other network resource locators and domains (AGDs), rare categorical feature/association analysis, identity resolution models for entities, land speed violation/geo location analysis, or any combination thereof. Examples of time series analysis of event sequences include Bayesian time-series statistical foundation for discrete time-series data (based on variable-memory Markov models and context-tree weighting), dynamic thresholding analysis with periodicity patterns at several scales, change-point detection via maximum-a-posteriori-probability (MAP) modeling, cross-correlation and causality analysis via variable-memory modeling and estimation of directed mutual information, outlier analysis, or any combination thereof.

Examples of graph-based analysis of entity activities include command and control detection analysis, beaconing detector, device, IP, domain and user reputation analysis, lateral movement detector, dynamic fingerprinting for users/devices, or any combination thereof. Examples of peer group analysis of entities include grouping of entities based on similarity and page rank, social-neighborhood graph-based clustering, online distributed clustering, clustering for bipartite and generic graphs, or any combination thereof.

Figure 14:
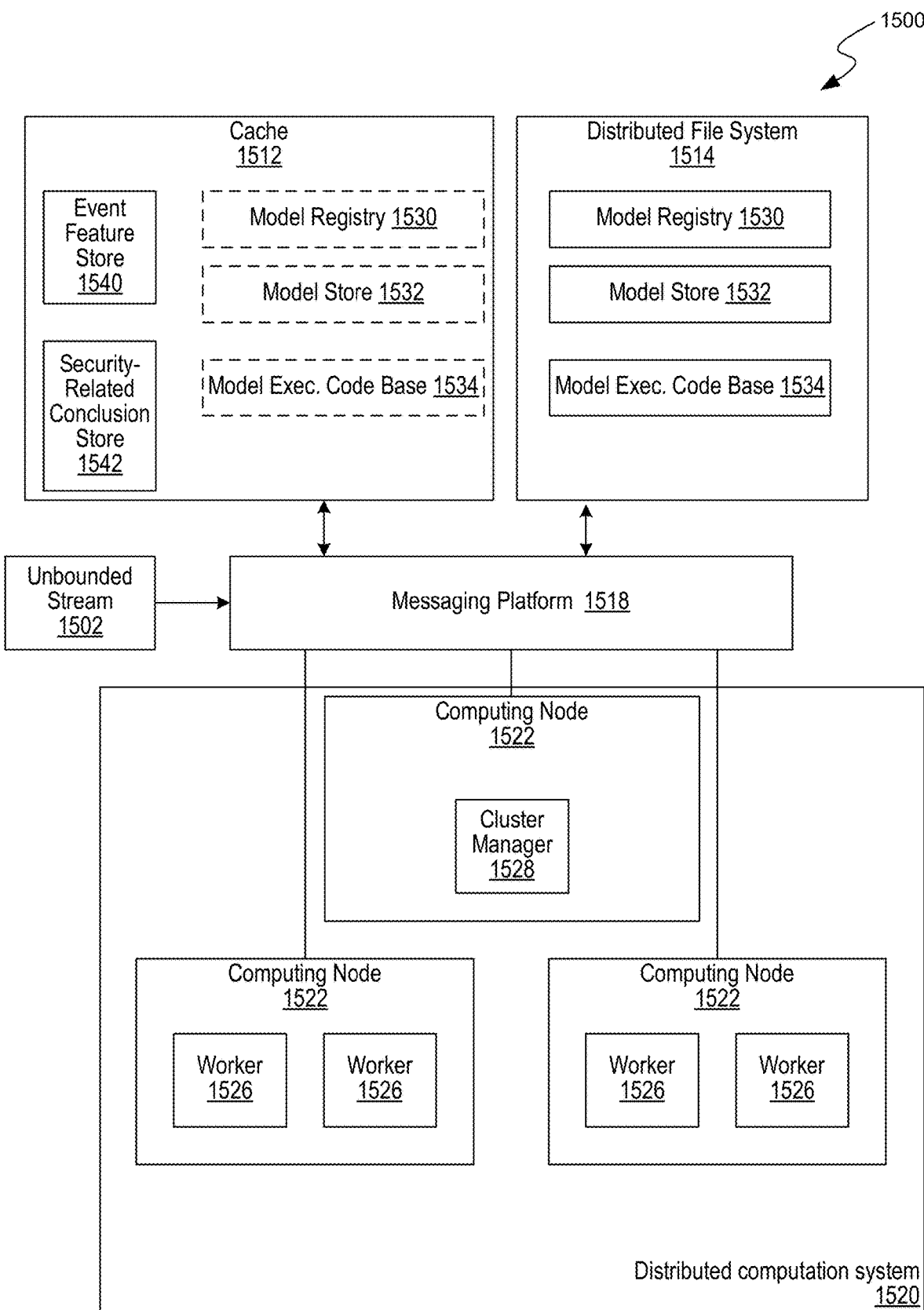
FIG. 14 is a block diagram of a machine learning-based complex event processing (CEP) engine.

FIG. 14 is a block diagram of an ML-based CEP engine 1500, in accordance with various embodiments. The ML-based CEP engine 1500 receives an unbounded stream 1502 of event feature sets as its input. Each event feature set corresponds to a machine-observed event. The ML-based CEP engine 1500 can train machine learning models using the unbounded stream 1502. The ML-based CEP engine 1500 can also compute security-related conclusions (e.g., an anomaly, a threat indicator, or a threat as described in this disclosure) by processing at least a subset of the event feature sets (e.g., from the unbounded stream 1502) through the machine learning models.

The ML-based CEP engine 1500 includes a cache component 1512, a distributed filesystem 1514, a messaging platform 1518, and a distributed computation system 1520. The ML-based CEP engine 1500 can include other data access systems. For example, the data access systems include a relational database (e.g., a structured query language (SQL) database), a non-relational database (e.g., HBase), a time series database, a graph database, or any combination thereof. The ML-based CEP engine 1500 can include other resource management systems (e.g., a distributed coordination system, such as ZooKeeper). The cache component 1512 can be non-persistent memory (e.g., volatile memory). The cache component 1512 can be a distributed cache, such as a cluster-based cache or a peer-to-peer cache. For example, the cache component 1512 is implemented in REDIS, an open source key-value cache.

The distributed filesystem 1514 stores data on a cluster of computing machines to provide high aggregate bandwidth across the cluster. The distributed filesystem 1514 includes at least a name node and a plurality of data nodes. Each data node serves blocks of data over a network using a file access protocol (e.g., block protocol or file-based protocol) specific to the distributed filesystem 1514. For example, the distributed filesystem 1514 is implemented according to the Hadoop distributed file system (HDFS).

The distributed filesystem 1514 stores a model registry 1530, a model store 1532, and a model execution code base 1534. In some embodiments, the model execution code base 1534 is part of the model registry 1530. The model registry 1530 stores model type definitions. A model type definition can configure whether a distributed computation system is responsible for a model type and can configure a model training workflow (i.e., a workflow of how to train machine learning models of a model type) and a model deliberation workflow (i.e., a workflow of how to apply machine learning models of a model type) of the model type. The model store 1532 stores model states that represent machine learning models or versions of the machine learning models. A model state, described further below, is a collection of numeric parameters in a data structure. A model training process thread produces and updates a model state. A model deliberation process thread is configured by a model state to process event feature sets into security-related conclusions. The model execution code base 1534 stores process logics for running model-related process threads. In some embodiments, the model execution code base 1534 also stores process logics associated with event views.

In some embodiments, the content of the distributed file system 1514 can be shared with another distributed computation system (e.g., a batch data processing engine discussed in various parts of this disclosure). For example, a model state stored in the model store 1532 representing a machine learning model or a version of a machine learning model can be shared with the other distributed computation system. For another example, one or more model types in the model registry 1530 and the model execution code base 1534 can be shared with the other distributed computation system.

The cache component 1512 stores an event feature store 1540 and a security-related conclusion store 1542. The cache component 1512 can cache (e.g., the most recently used or most recently received event feature sets) from the unbounded stream 1502 in the event feature store 1540. The cache component 1512 can cache the security-related conclusions (e.g., the most recently produced or the most recently used) in the security-related conclusion store 1542. The ML-based CEP engine 1500 can compute the security-related conclusions by processing the event feature sets through the machine learning models. In some embodiments, the cache component 1512 stores copies or references to entries in the model store 1532. In some embodiments, the cache component 1512 stores copies or references to entries in the model registry 1530. In some embodiments, the cache component 1512 stores copies or references to at least a portion of the model execution code base 1534.

The messaging platform 1518 provides a computer application service to facilitate communication amongst the various system components of the ML-based CEP engine 1500 and between external systems (e.g., the data intake and preparation stage) and the ML-based CEP engine 1500. For example, the messaging platform 1518 can be Apache Kafka, an open-source message broker utilizing a publish-subscribe messaging protocol. For example, the messaging platform 1518 can deliver (e.g., via self-triggered interrupt messages or message queues) the event feature sets from the unbounded stream 1502 to model-related process threads (e.g., one or more of model training process threads, model deliberation process threads, and model preparation process threads) running in the distributed computation system 1520. The messaging platform 1518 can also send data within the cache component 1512 or the distributed filesystem 1514 to the model-related process threads and between any two of the model-related process threads.

For the ML-based CEP engine 1500, the distributed computation system 1520 is a real-time data processing engine. The distributed computation system 1520 can be implemented on the same computer cluster as the distributed filesystem 1514. In some embodiments, an ML-based batch processing engine runs in parallel to the ML-based CEP engine. In those embodiments, the ML-based batch processing engine can implement a distributed computation system configured as a batch processing engine (e.g., using a data parallelism architecture). The system architecture of the ML-based batch processing engine can be identical to the ML-based CEP engine 1500, except for the distributed computing platform engine running on the distributed computation system, and the ML-based batch processing engine's inputs including batch data containers of event feature sets (instead of an unbounded stream of incoming event feature sets).

The distributed computation system 1520 can be a distributed computation cluster. The distributed computation system 1520 coordinates the use of multiple computing nodes 1522 (e.g., physical computing machines or virtualized computing machines) to execute the model-related process threads. The distributed computation system 1520 can parallelize the execution of the model-related process threads. The distributed computation system 1520 can implement a distributed resource manager (e.g., Apache Hadoop YARN) and a real-time distributed computation engine (e.g., Storm or Spark Streaming) to coordinate its computing nodes 1522 and the model-related process threads running thereon. The real-time distributed computation engine can be implemented based on a task parallel architecture. In an alternative embodiment, the real-time distributed computation engine can be implemented based on a data-parallel architecture.

Each computing node 1522 can implement one or more computation workers (or simply "workers") 1526. A computation worker is a logical construct of a sandboxed operating environment for process threads to run on. A computation worker can be considered a "processing node" of the computing cluster of the distributed computation system 1520. In some implementations, at least one of the computing nodes 1522 implements a cluster manager 1528 to supervise the computation workers 1526. Each of the computation workers 1526 can execute one or more model-related process threads. In some implementations, a computation worker 1526 only executes one type of model-related process thread, where process threads of that type share the same input data.

Model Registry

Figure 15:
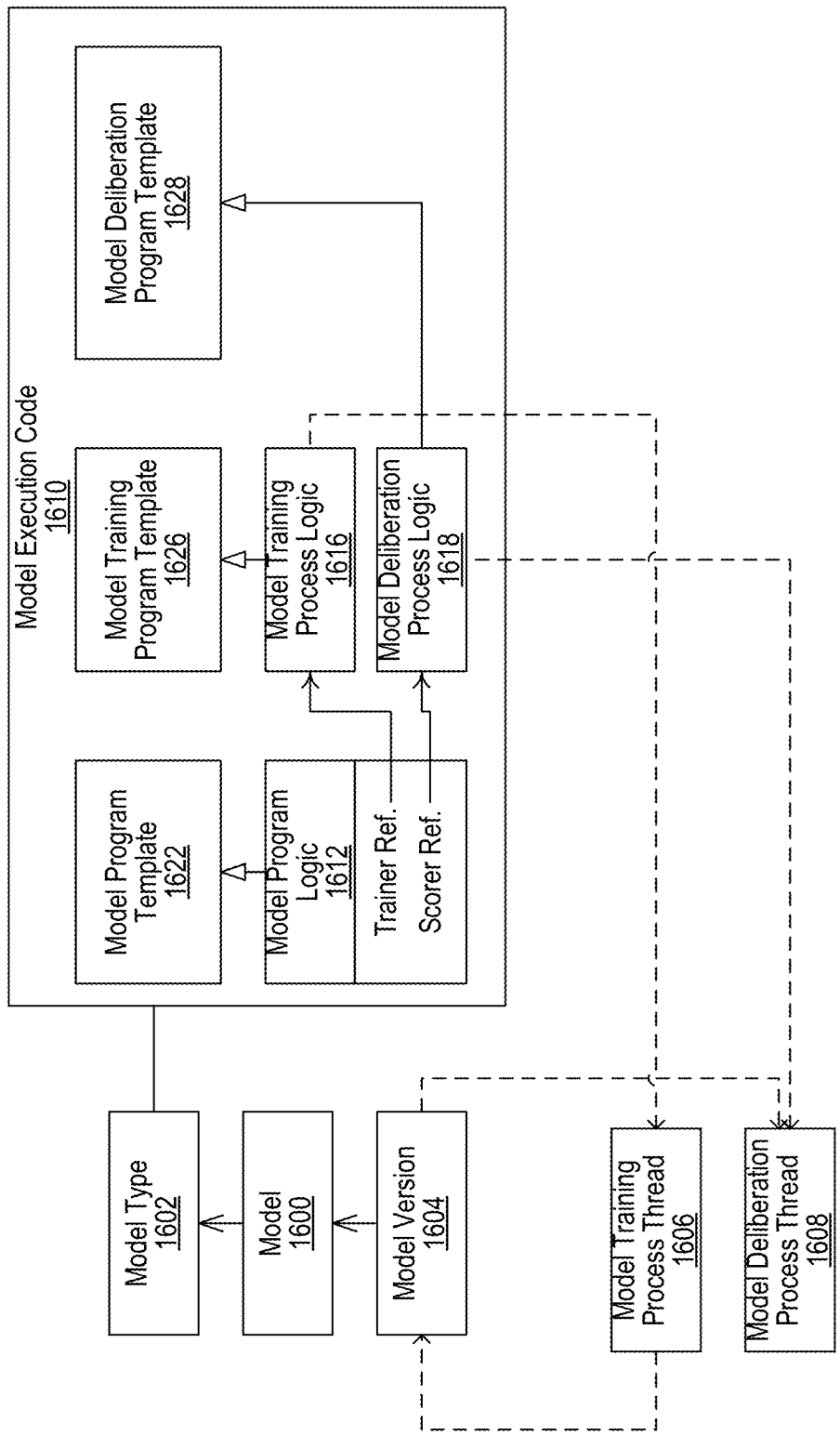
FIG. 15 is a block diagram illustrating an architectural framework of a machine learning model.
Figure 16:
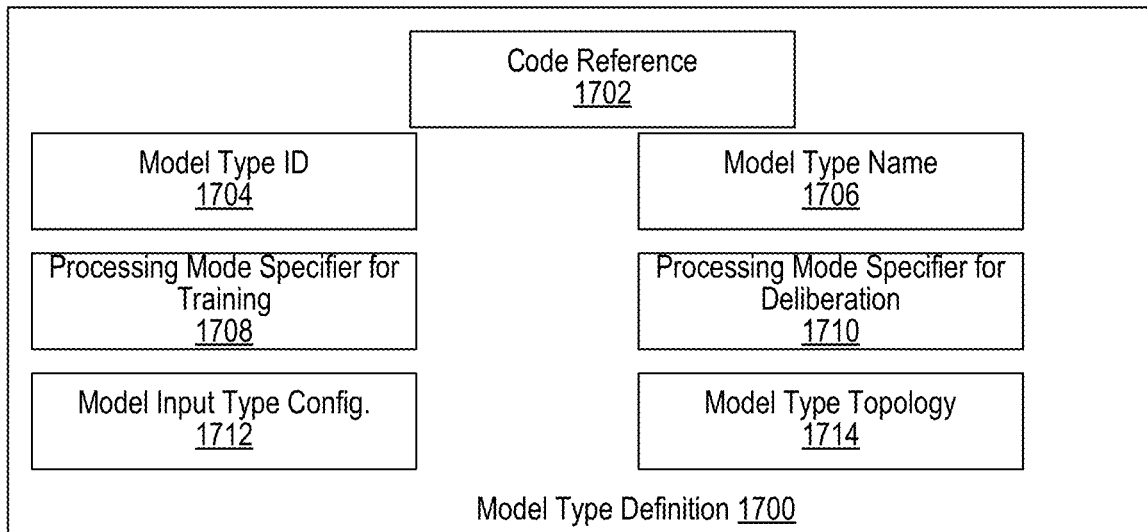
FIG. 16 is a block diagram illustrating an example of the model type definition.

FIG. 15 is a block diagram illustrating an architectural framework of a machine learning model, in accordance with various embodiments. A machine learning model 1600 corresponds to a model type 1602. The ML-based CEP engine 1500 can implement multiple machine learning models of the same model type. For example, a model type can define a workflow for entity-specific models to be trained and applied. In this example, the ML-based CEP engine 1500 trains as many models of the model type as there are known entities. The model type 1602 is defined by a model type definition 1700 stored in the model registry 1530. FIG. 16 is a block diagram illustrating an example of the model type definition 1700. The model type definition 1700 includes various configurations of how a machine learning model is to be trained or applied. The model type definition 1700 includes a code reference 1702 to a model execution code 1610 in the model execution code base 1534. The model type definition 1700 includes a model type identifier 1704, a model type name 1706, a processing mode specifier 1708 for the model training workflow, a processing mode specifier 1710 for the model deliberation workflow, a model input type configuration 1712 (e.g., one or more subscriptions to one or more event views as described in this disclosure), a model type topology 1714, or any combination thereof. A processing mode specifier specifies a processing mode, such as a real-time processing mode or a batch processing mode.

The model input type configuration 1712 specifies what event views (e.g., described in this disclosure) that the model type 1602 subscribes to. The event feature sets from the unbounded stream 1502 can be labeled with event view labels corresponding to the event views. The ML-based CEP engine 1500 can select the event feature sets received from the unbounded stream 1502 based on event view labels of the event feature sets (e.g., selecting only the event feature sets based on the event view labels corresponding to the event view subscriptions in the model input type configuration 1712). The ML-based CEP engine 1500 can call and execute an access interface associated with an event view subscription to organize the selected event feature sets and provide format/bind at least a subset of features within the selected event feature sets to a preferred data structure for a model-related process thread. The ML-based CEP engine 1500 can provide (e.g., stream via a data pipeline) the selected and formatted event feature sets to a model-related process thread of the model type 1602.

The model type topology 1714 specifies how the ML-based CEP engine 1500 groups and distributes model-specific process threads to, for example, the different computation workers 1526 in the distributed computation system 1520. The model type topology 1714 also specifies how the ML-based CEP engine 1500 groups and distribute the input data for the model-specific process threads of the same model type 1602. In some embodiments, the ML-based CEP engine 1500 groups and divides the input data for the model-specific process threads into mutually exclusive partitions. In other embodiments, the ML-based CEP engine 1500 groups the input data for the model-specific process threads into groups that have at least some overlap. For example, the model type topology 1714 can specify an entity type (e.g., a type associated with users, devices, systems, applications, process threads, network resource locators, or any combination thereof). In one specific example, if the model type topology 1714 specifies users as the entity type, the ML-based CEP engine 1500 groups the selected event feature sets by user groups. For example, the ML-based CEP engine 1500 can divide all known user entities into user groups, and divide the selected event feature sets by the user group or groups to which each event feature set corresponds. Consequently, the distributed computation system 1520 can assign a computation worker 1526 to process event feature sets corresponding to each group/partition.

One or more model states stored in the model store 1532 represent the machine learning model 1600. If the ML-based CEP engine 1500 trains and applies a single version of the machine learning model 1600, then a single model state represents the machine learning model 1600. In embodiments where the ML-based CEP engine 1500 trains multiple versions of the machine learning model 1600, each model version 1604 corresponds to a different model state stored in the model store 1532. In such embodiments, a group of model states corresponds to different model versions representing different training stages of the machine learning model 1600. In this case, the group of model versions is part of the same machine learning model 1600 because these model states are all trained for a specific entity or a specific purpose. For example, a machine learning model can be a label used to refer to the group of model states that are specifically trained by event feature sets corresponding to a single user and applied to event feature sets corresponding to that single user. Each model state of each model version can correspond to a different sequence of event feature sets used to train the model state (herein the different sequences of event feature sets correspond to different "training stages"). For another example, a machine learning model can be a label used to refer to the group of model states that are specifically trained by a specific type of anomalies and applied to that type of anomalies.

A model state is the output of a model training process thread 1606. The ML-based CEP engine 1500 instantiates a model deliberation process thread 1608 based on the model state. The model training process thread 1606 and the model deliberation process thread 1608 can be referred to as "model-specific process threads." The ML-based CEP engine 1500 can instantiate the model-specific process threads in the distributed computation system 1520. For simplicity, in parts of this disclosure, "instantiating" a model refers to instantiating the model deliberation process thread 1608 for a particular version of a machine learning model. Also for simplicity, in parts of this disclosure, "processing" input data "through" a model refers to processing the input data by the model deliberation process thread 1608 corresponding to the model.

The model execution code 1610 includes model program logic 1612 that describes data structures associated with model-related process threads and logic of the model-related process threads. The model program logic 1612 references model training process logic 1616 and model deliberation process logic 1618. The model training process logic 1616 defines how the model training process thread 1606 is to transform input data (e.g., one or more event feature sets) into a model state or an update to the model state. The model state is representative of a machine learning model or at least a version of a machine learning model (when there are multiple versions). As more input data is provided to the model training thread, the model training thread can update the model state. The model deliberation process logic 1618 defines how input data (e.g., one or more event feature sets) to a model deliberation process thread, configured by a model state, is to be transformed into security-related conclusions.

The model execution code 1610 also includes a model program template 1622, a model training program template 1626, and a model deliberation program template 1628. These program templates contain process logics that are shared amongst all types of machine learning models. These program templates also impose restrictions such that an author of the model program logic 1612, the model training process logic 1616, and the model deliberation process logic 1618 creates consistent process logics that can function in the ML-based CEP engine 1500. For example, the model program template 1622 can impose a restriction that any model program logic, such as the model program logic 1612, has to reference at least a model training process logic and a model deliberation process logic.

The architectural framework described in FIG. 15 enables real-time registration of a new model type. Real-time registration enables a network security administrator to deploy updates to the ML-based CEP engine 1500 or an ML-based batch processing engine without having to shut down the engines or any model-related process threads running thereon. The program templates and the workflow configurations using the model type definition 1700 provide a formal way to train and apply machine learning models. The use of the distributed filesystem 1514 facilitates persistence of model states while the model-related process threads are running in a distributed manner.

The ability to label the model version 1604 to a model state in the model store 1532 enables the ML-based CEP engine 1500 to maintain lineage between training data sets for a machine learning model and the model states produced therefrom. The versioning of the machine learning models enables simultaneous training of different machine learning models using the same data to produce model states corresponding to different windows of training data sets. The simultaneous training of the machine learning models further enables the ML-based CEP engine 1500 to "expire" model versions that have been trained with outdated data.

Figure 17:
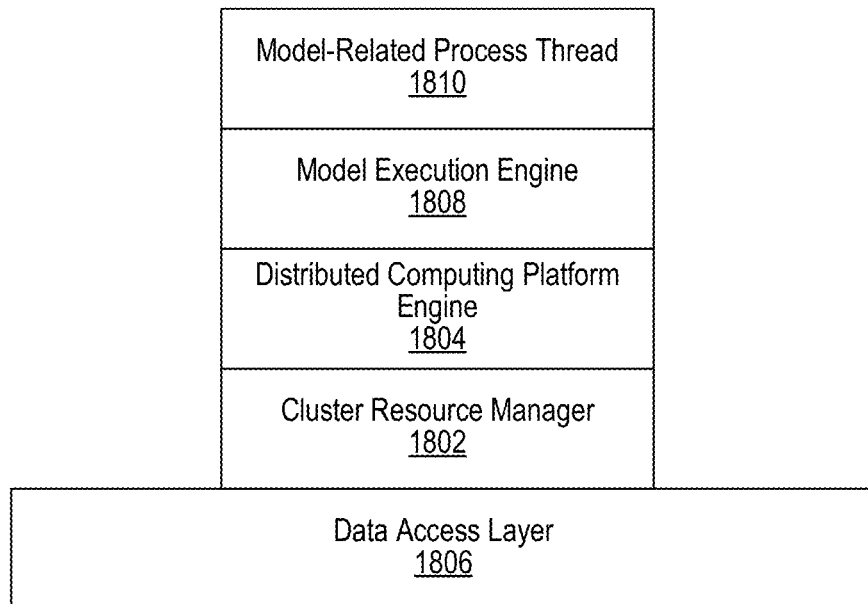
FIG. 17 is a block diagram illustrating an example system architecture for implementing the distributed computation system.

FIG. 17 is a block diagram illustrating a system architecture for implementing the distributed computation system 1520, in accordance with various embodiments. The distributed computation system 1520 implements a cluster resource manager 1802 (e.g., YARN). The cluster resource manager 1802 can function as an operating system for running data processing platform engines. For example, the cluster resource manager 1802 can implement a distributed computing platform engine 1804 (e.g., a real-time distributed computation platform, such as Storm or Spark Streaming). The processes running on the distributed computing platform engine 1804 can access various data access systems in a data access layer 1806. For example, the data access layer 1806 can provide access to a relational database, a graph database, a non-relational database, a time series database, the cache component 1512, the distributed filesystem 1514, or any combination thereof.

The distributed computing platform engine 1804 can implement a model execution engine 1808. The model execution engine 1808 can then initialize one or more model-related process threads 1810 (e.g., a model preparation thread, one or more model training threads or model deliberation threads) managed by the distributed computing platform engine 1804. Each model-related process thread 1810 is a sequence of program instructions related to training, deliberation, or preparation of a machine learning model. Each model-related process thread 1810 can be managed independently by the distributed computing platform engine 1804. For example, method 1900 illustrates a potential workflow of a model preparation thread; method 2000 illustrates a potential workflow of a model training thread, and method 2100 illustrates a potential workflow of a model deliberation thread. The data access layer 1806 can enable the model-related process threads 1810 to access model type definitions in the model registry 1530, model states in the model store 1532, and event feature sets in the cache component 1512.

Anomalies, Threat Indicators, and Threats

Figure 18:
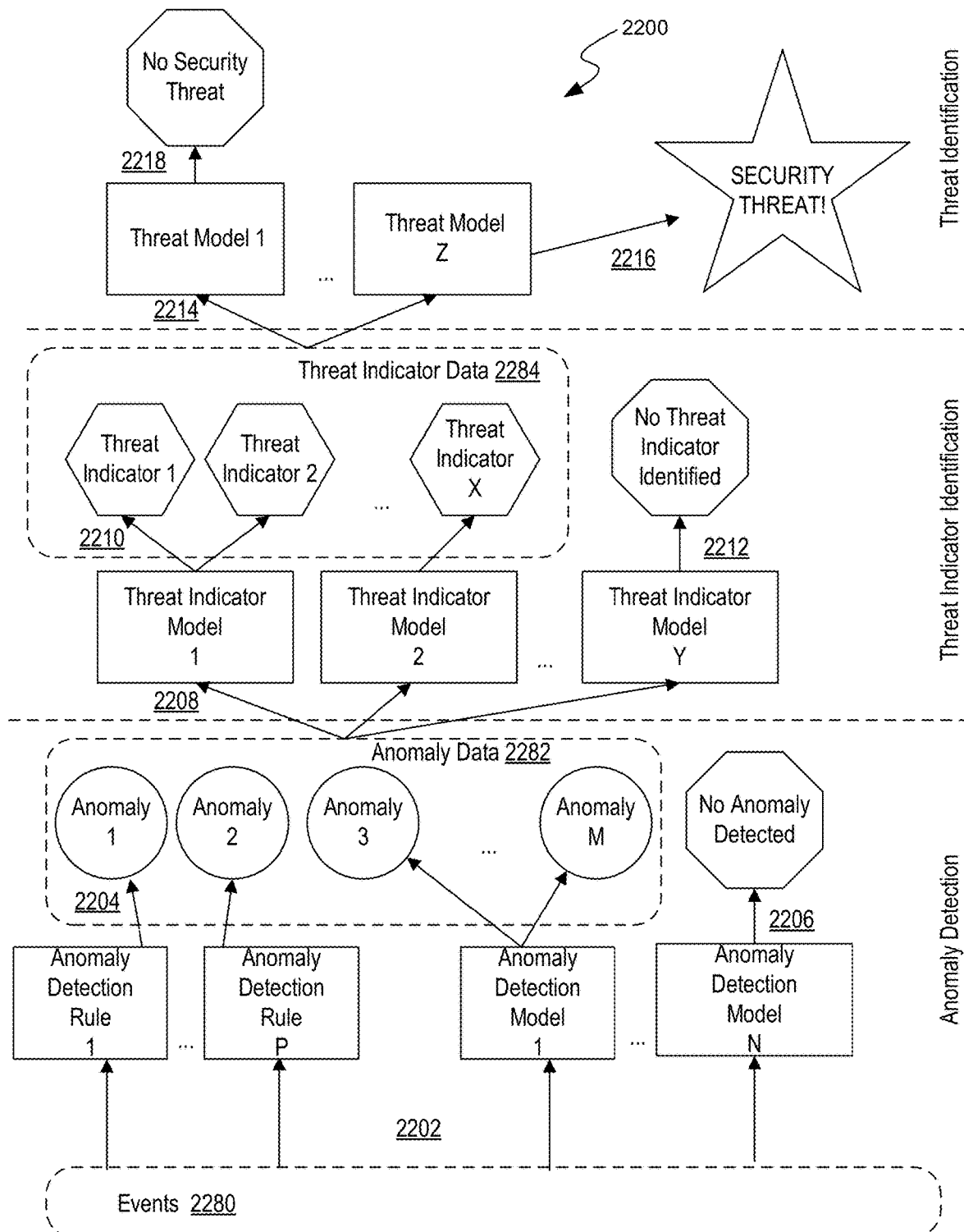
FIG. 18 is flow diagram illustrating an example process for detecting anomalies, identifying threat indicators, and identifying threats to network security.

FIG. 18 is flow diagram illustrating in more detail an example process 2200 for detecting anomalies, identifying threat indicators, and identifying threats to network security. The process begins by identifying anomalies in events associated with an information technology environment. As shown in FIG. 18 at step 2202, events 2280 are processed through one or more anomaly detection models 1 through N (e.g. machine learning models as discussed above) as well as one or more anomaly detection rules 1 through P. Note as previously described, processing at step 2202 may be performed by different computing systems. For example processing of events 2280 may be performed by a processing module 830 of platform 800 and processing of events 2280 may be by a separate or integrated network security system applying user-specified anomaly detection rules. Also, step 2202 does not necessarily involve processing of the same events. At step 2204 the various processes according to rules and machine-learning based models may output anomaly data 2182 indicative of a plurality of anomalies 1 through M. As shown in FIG. 18, an anomaly is not necessarily detected when events are processed according to certain rules or models. For example, as shown at step 2206, when the events 2280 are processed by anomaly detection model N, no anomaly is detected.

The process continues with generating anomaly data 2282 indicative of the anomalies in response to the detection. The anomaly data 2282, as used herein, can refer to the entire set or a subset of the detected anomalies across the information technology environment. For example, as represented in FIG. 18, the processing of events 2280 according to the plurality of models and rules at step 2202 leads to the outputting of anomalies (or associated data) 1 through M at step 2204. In some embodiments, the anomaly data 2282 includes the events from the set of processed events 2180 that are associated with detected anomalies. In other words, the anomaly processing can be viewed as a filtering process to pass on only events associated with anomalous activity. In some embodiments, the anomaly data 2282 can include all or portions of the machine data included in the associated events. In other embodiments, the anomaly data 2282 includes data in addition to the associated events. For example, the anomaly data associated with a particular entity may include underlying raw machine data associated with the anomalous activity, annotated information about that entity (e.g. a user ID or account associated with a device), timing data associated with the anomalous activity (e.g. when the anomaly occurred, when a similar anomaly last occurred, or periodicity of this type of anomaly showing up for the particular entity), etc. In some embodiments, the anomaly data 2282 is stored in a data structure in the form of an anomaly graph. In such embodiments, the anomaly graph includes a plurality of vertices (nodes) representing entities associated with the information technology environment and a plurality of edges, each of the plurality of edges representing an anomaly linking two of the plurality of vertices (nodes).

The process continues with identifying threat indicators associated with a potential security threat to the information technology environment by processing the anomaly data. As shown in FIG. 18, at step 2208 the anomaly data 2182 (or at least a subset of anomaly data 2282) is processed through a plurality of threat indicator models 1 through Y, which at step 2210 may output threat indicator data 2284 including a plurality of threat indicators. In an embodiment, the processing of events 2280 at step 2202 to produce anomaly data 2282 occurs on a per entity basis, while the processing of anomaly data 2282 at step 2208 can occur across the the information technology environment, or at least a sub-portion of the information technology environment. In other words, each anomaly 1 through M is detected as anomalous for a particular entity given event data associated with the given entity. While useful, this evaluation is performed without reference to other activity in the information technology environment. At step 2108, however, the plurality of threat indicator models 1 through Y are evaluating the plurality of anomalies 1 through M that occur across the information technology environment being monitored, not just for a particular entity. As shown in FIG. 18, a threat indicator is not necessarily identified based on a given set of anomaly data 2282. For example, as shown at step 2212, when the anomaly data 2282 is processed according to threat indicator model Y, no threat indicator is identified.

The process continues with generating threat indicator data 2284 indicative of the threat indicators in response to the identifying the threat indicators. Again, as with the anomaly data 2182, the threat indicator data 2284, as used herein, generally refers to the entire set or a subset of the identified threat indicators across the information technology environment being monitored. For example, as represented in FIG. 18, the processing of anomaly data 2282 according to the plurality of threat indicator models at step 2208 leads to the outputting of threat indicators (or associated data) 1 through X at step 2210. In some embodiments, the threat indicator data 2284 simply includes only the events 2280 associated with identified threat indicators. In other words, the threat indicator processing can be viewed as a further filtering of the events 2280 to pass on only events associated with threat indicators. In other embodiments, the threat indicator data 2284 includes data beyond the underlying events. For example, the threat indicator data 2284 may include the underlying raw machine data associated with the anomalous activity, annotated information about the entities (e.g. users, devices, etc.) associated with the threat indicator, timing data associated with the threat indicator (e.g. when the threat indicator was raised, when a similar threat indicator last occurred, periodicity of this type of threat indicator, etc.). In some embodiments the threat indicator data 2284 is stored in a data structure in the form of a threat indicator graph. In such embodiments, the threat indicator graph may include a plurality of vertices (nodes) representing entities associated with the information technology environment and a plurality of edges, each of the plurality of edges representing a threat indicator linking two of the plurality of vertices (nodes). In other embodiments, the threat indicator data 2284 is instead stored in a relational database or a key-store database.

In some embodiments, the threat indicator data 2284 is incorporated into a network security graph, which may be the composite relationship graph discussed above. The network security graph can include a plurality of vertices (nodes) representing entities associated with the information technology environment and a plurality of edges linking two or more of the plurality of vertices (nodes). Each edge in such a graph represents an association between the entities represented by the vertices (nodes). Accordingly, anomalies defined in the anomaly data 2282, or threat indicators defined in the threat indicator data 2284, can be incorporated into the graph as vertices (nodes), each linked to one or more of the entities by one or more edges. For example consider an example in which a threat indicator is identified and is associated with a user 1 using a device 1 operating in the information technology environment. In a highly simplified network security graph, the user and device are each defined as a node with an edge linking them to represent the association (i.e. user 1 uses device 1). An anomaly or a threat indicator is then incorporated as a third node into the simplified graph with edges linking to both the node representing user 1 and the node representing device 1.

The process continues with at step 2214 with identifying threats to the security of the an information technology environment by processing the threat indicator data 2284.

Detecting Anomalies

Figure 19:
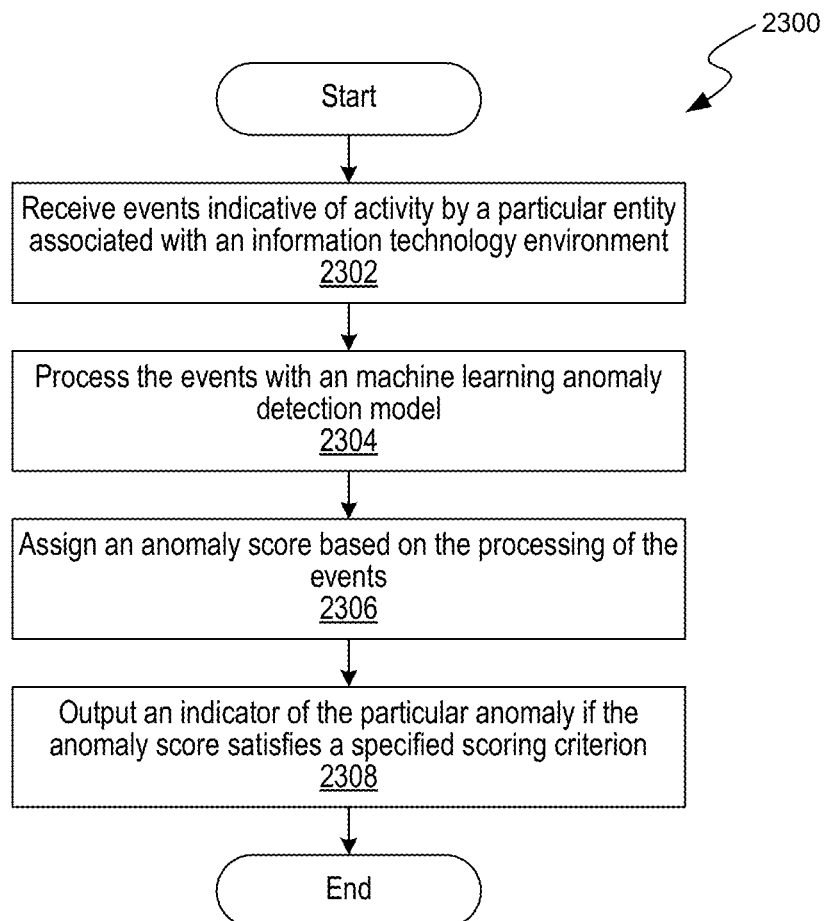
FIG. 19 is a flow diagram describing an example process for detecting anomalies using machine-learning models.

FIG. 19 is a flow diagram describing an example process 2300 for detecting anomalies using machine learning algorithms. Process 2300 begins at step 2302 with receiving event data 2280 indicative of activity by a particular entity associated with an information technology environment. In some embodiments, events 2280 are received in response to a search query submitted to a data intake and query system 108.

Process 2300 continues at step 2304 with processing the events 2280 through an anomaly detection model. According to an embodiment, an anomaly detection model includes at least model processing logic defining a process for assigning an anomaly score to the processed events 2280 and a model state defining a set of parameters for applying the model processing logic. A plurality of anomaly detection models instances may be instantiated for each entity associated with the information technology environment. Each model instance may be of a particular model type configured to detect a particular category of anomalies based on received events. For example, in an embodiment, a computer operating in an information technology environment is associated with various anomaly detection models, with one of the anomaly detection models configured to detect an anomaly indicative of a machine generated beacon communication to an entity outside of the information technology environment. According to some embodiments, the security platform includes anomaly detection models configured to detect a number of different kinds of anomalous activity, such as lateral movement, blacklisted entities, malware communications, rare events, and beacon activity. Each of these anomaly detection models would include unique processing logic and parameters for applying the processing logic. Similarly, each model instance (i.e. for a particular entity) may include unique processing logic and parameters for applying the processing logic. In some embodiments, processing of event data 2280 is performed in real-time as the event data is received. In such an embodiment, real-time processing may be performed by a processing engine optimized for high rate or real-time processing, such as Apache Storm or Apache Spark Streaming.

Process 2300 continues at step 2306 with assigning an anomaly score based on the processing of the events 2302 through the anomaly detection model. Calculation of the anomaly score is done by the processing logic contained within the anomaly detection model and represents a quantification of a degree to which the processed events are associated with anomalous activity on the network. In some embodiments, the anomaly score is a value in a specified range. For example, the resulting anomaly score may be a value between 0 and 10, with 0 being the least anomalous and 10 being the most anomalous.

Process 2300 continues at step 2308 with outputting an indicator of a particular anomaly if the anomaly score satisfies a specified criterion (e.g., exceeds a threshold). Continuing with the given example, the specified criterion may be set such that an anomaly is detected if the anomaly score is 6 or above, for example. The specified criterion need not be static, however. In some embodiments, the criterion (e.g., threshold) is dynamic and changes based on situational factors. The situational factors may include volume of events, presence or absence of pre-conditional events, user configurations, and volume of detected anomalies.

In some embodiments, outputting the indicator of the particular anomaly (i.e. generating anomaly data) includes determining that the anomalous activity detected in the events is associated with a particular category of anomalous activity. Accordingly, the anomaly data indicative of the particular category can include a tag indicative that the anomalous activity associated with the particular anomaly is associated with the particular category of anomalous activity. As will be explained, when anomalies detected using machine learning anomaly detection models are combined with anomalies detected using user-specified anomaly detection rules, an identifying tag can facilitate the proper processing of the anomaly data to identify threat indicators and threats.

Figure 20:
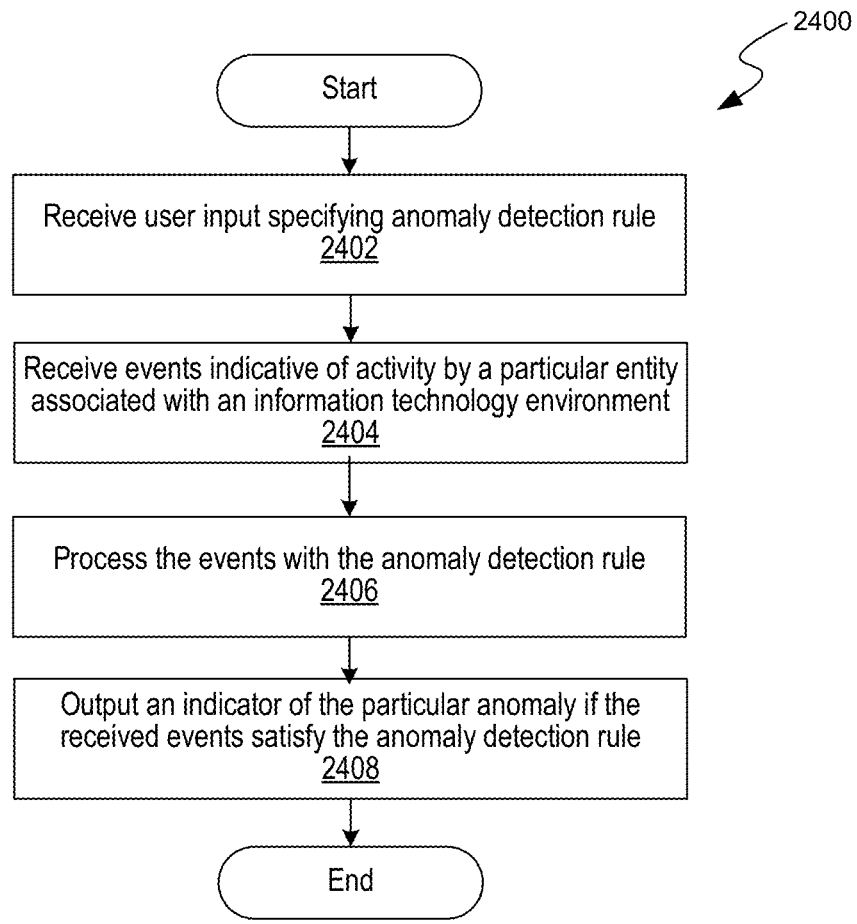
FIG. 20 is a flow diagram describing an example process for detecting anomalies using user-specified rules.

FIG. 20 is a flow diagram describing an example process 2400 for detecting anomalies using user specified rules. Process 2400 begins at step 2402 with receiving user input specifying an anomaly detection rule. User input may be received via a GUI of a rules-based network security system 124. For example, in an embodiment a network administrator may access a GUI via the Splunk® App for Enterprise Security instantiated at a client device 102 with reference to FIG. 2B. Through the enterprise security app, the network administrator may view events, anomaly data, threat indicator data, and threat data. For example, anomaly data (detected using machine learning models) and threat indicator data may be output by network security platform 120 for display via the GUI of the Splunk® App for Enterprise Security. Drawing on their experience and expertise in network security and the particular aspects of the computer network, the network security administrator can specify rules for detecting anomalies based on received event data. For example, a user specified rule may state that an anomaly is detected when a particular account experiences 10 failed login attempts within 1 minute. This is just an example of a rule that a network security administrator may define. Any number of other rules may be specified that pertain to specific events, event patterns, entities (i.e. users, devices, applications, accounts, etc.), etc. In some embodiments, the user input may identify a type of entity to detect when the specified rule is satisfied. When rules-based detected anomalies are acquired by a machine-learning based network security system, an identifying tag can facilitate the proper processing of the rules-based detected anomaly with other corresponding machine-learning based anomalies to detect threat indicators and threats.

Process 2400 continues at step 2404 with receiving events 2280 indicative of activity by a particular entity in an information technology environment. In some embodiments, events 2280 are received in response to a search query submitted to a search head of a data intake and query system 108.

Process 2400 continues at step 2406 with processing the events 2280 with the anomaly detection rule. In other words the rule is applied to incoming or indexed events and if the event satisfies the rule an indicator of the particular anomaly (i.e. anomaly data) is output at step 2408.

Identifying Threat Indicators

Figure 21:
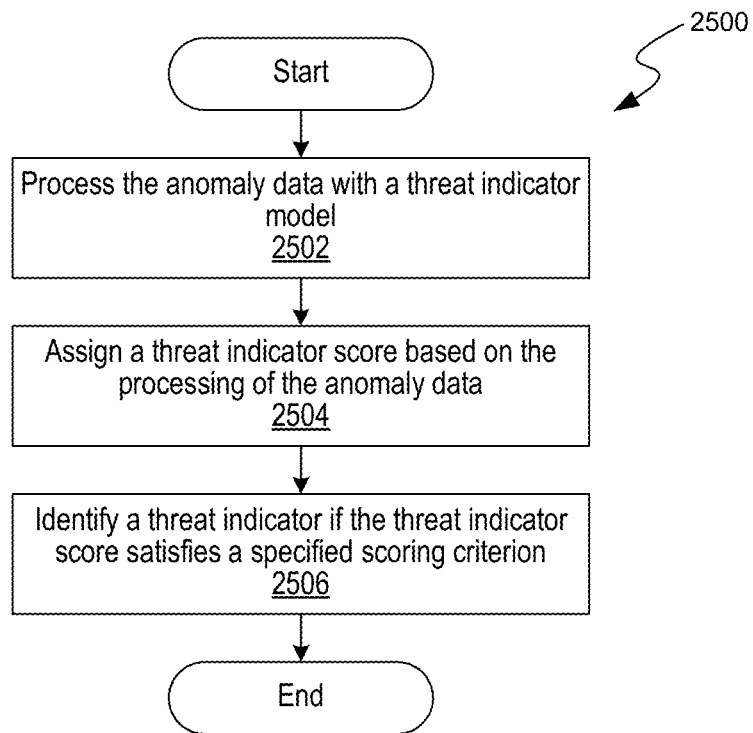
FIG. 21 is a flow diagram describing an example process for identifying threat indicators.

FIG. 21 is a flow diagram describing an example process 2500 for identifying threat indicators. Process 2500 begins at step 2502 with processing the anomaly data 2282 through a threat indicator model, which like the anomaly detection models may also be a machine learning based model. As with the previously described anomaly models, according to some embodiments, a threat indicator model can include model processing logic defining a process for assigning a threat indicator score based on processing the anomaly data 2282. The threat indicator model can also include a model state defining a set of parameters for applying the model processing logic. Specific use cases for identifying threat indicators based on detected anomalies are discussed in more detail herein. In each described use case the steps to identifying a threat indicator may be incorporated into the processing logic. In some embodiments, processing of the anomaly data 2282 may include aggregating anomaly data from across the information technology environment, correlating different anomalies within the anomaly data, or enhancing the anomaly data through enrichment using external data sources. In some embodiments, processing of anomaly data 2282 is performed in real-time as the event data is received and anomalies are generated. In such an embodiment, real-time processing may be performed by a processing engine optimized for high rate or real-time processing, for example, Apache Storm or Apache Spark Streaming. In some embodiments, processing of anomaly data 2282 is instead or additionally performed in batch mode. In such an embodiment, batch mode processing may be performed by a processing engine optimized high volumes of data, such as Apache Spark on a Hadoop distributed computing cluster.

As previously mentioned, anomaly data 2282 can include anomalies detected using machine-learning anomaly detection models (see process 2300 in FIG. 19) and using user-specified rules (see process 2400 in FIG. 20). In some embodiments, anomalies are detected using user-specified rules at a rule-based network security system 124 that may be part of network security platform 120 or an entirely separate system. Accordingly, in some embodiments, before step 2502 can occur, a computer system executing process 2500 may first acquire anomalies (e.g. in the form of anomaly data) that were detected using a user-specified anomaly detection rule form a separate rules-based network security system 124. As previously mentioned, anomalies may include tags indicating that they are associated with one or more categories of anomalous activity. Accordingly, before processing anomalies together to identify threats, a computer system executing process 2500 may first determine if the one or more anomalies to be processed are associated with corresponding categories based on their respective tags. This is not to say that the categories must match for multiple anomalies to be processed together. For example, beacon (i.e. machine-generated) communications may know to correspond with malware command and control communications. It may therefore mat be beneficial to process anomalies detected in these categories together using models to identify threats or threat indicators. In some embodiments the model type used to process the anomaly data defines which categories of anomalies are processed using the model.

Process 2500 continues at step 2504 with assigning a threat indicator score based on processing the anomaly data 2282. As with the anomaly detection models, in some embodiments, calculation of the threat indicator score is based on the processing logic contained within the threat indicator model and represents a quantification of a degree to which the processed anomaly data is associated with activity that may potentially be a threat to the security of information technology environment. As previously described, a threat indicator can be conceptualized as an escalation or intermediate step between detection of an anomaly and identification of a threat to network security. In some embodiments, the threat indicator score is a value in a specified range. For example, the resulting threat indicator score may be a value between 0 and 10, with 0 being the least threating and 10 being the most threatening.

Process 2500 continues at step 2506 with identifying a threat indicator if the threat indicator score satisfies a specified criterion (e.g., a threshold). Continuing with the given example, the specified criterion may be set such that a threat indicator is identified if the threat indicator score is 6 or above, for example. The specified criterion need not be static, however. In some embodiments, the criterion (e.g., threshold) is dynamic and changes based on situational factors. The situational factors may include volume of processed events, presence or absence of pre-conditional events, user configurations, and volume of detected anomalies.

Identifying Threat Indicators—Entity Associations

As described previously, a detected anomaly is typically associated with one or more entities associated with an information technology environment. For example, if an anomaly is detected that is suggestive of beacon activity (discussed further below), that beacon activity is typically from one or more devices operating within the network being monitored. Each of those devices may be associated with one or more users. In this particular use case, the threat indicator models, such as those described previously with respect to FIG. 22, are configured to analyze the relationships between entities associated with the information technology environment and the detected anomalies making up the set of anomaly data 2304 across the information technology environment.

Figure 22:
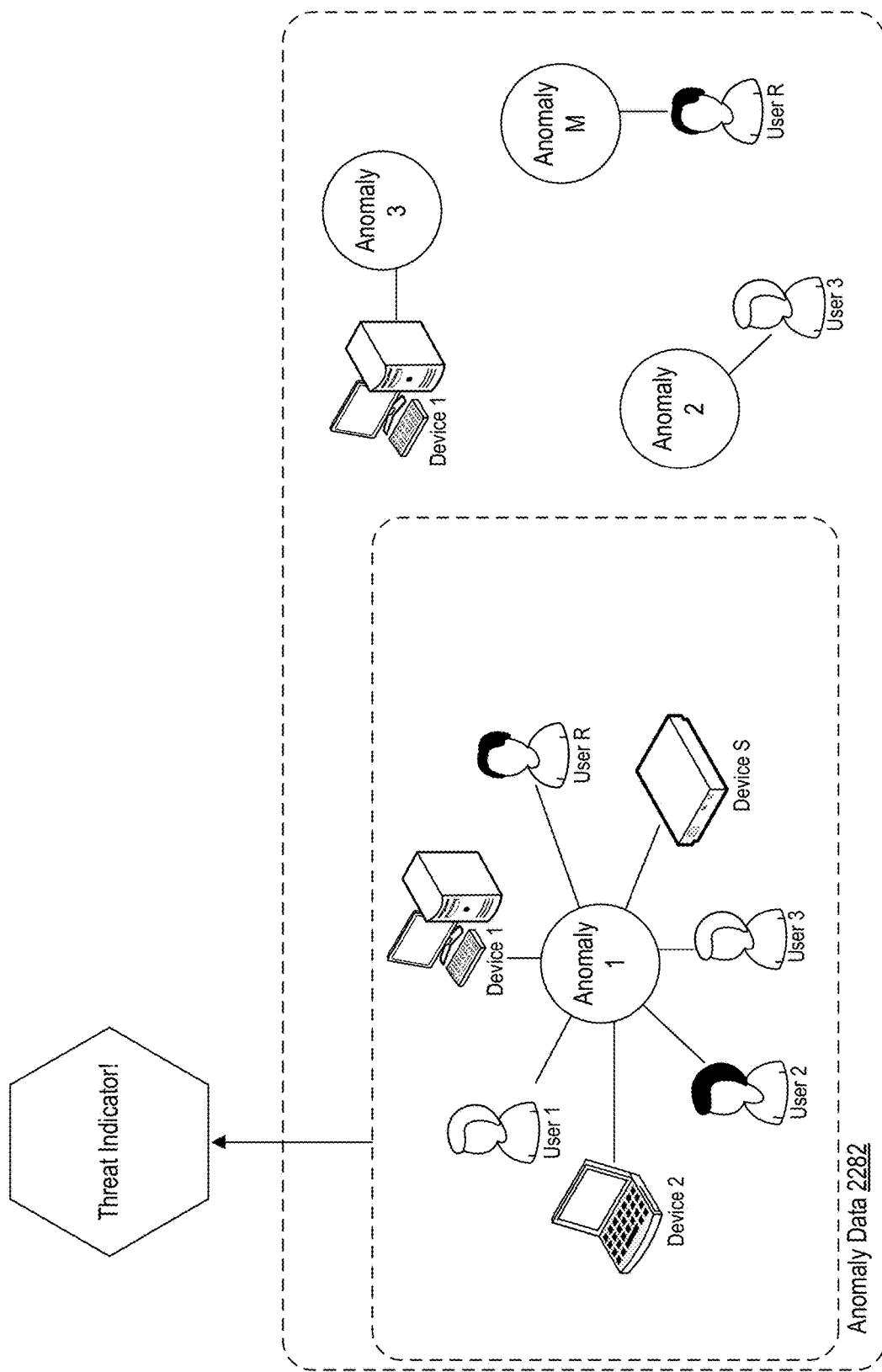
FIG. 22 illustrates an example case for identifying threat indicators based on entity associations with detected anomalies.

FIG. 22 illustrates an example use case for identifying threat indicators based on entity associations with detected anomalies. The use case illustrated in FIG. 22 is identifying a threat indicator if, based on processing the anomaly data, it is determined that a high number of entities are associated with a particular anomaly or a particular category of anomaly.

A shown in FIG. 22, a number of detected or acquired anomalies 1 though M are included in anomaly data 2282, which is surrounded by the larger dotted line box. Associated with these detected anomalies are various entities including devices 1 though S and users 1 through R. In this example, anomaly 1 is shown to be associated with at least seven unique entities, including users 1 through R, and devices 1 through S. Anomalies 2, 3, and M, however, are each associated with just one entity, user 3, device, 1, and user R (respectively). This use case assumes that a correlation among anomalies and entities that establishes relatively high interrelationship is more suspicious than individual occurrences of anomalous activity. In other words, if a detected anomaly is associated with a high number of entities (e.g. users or devices) associated with the information technology environment, that anomaly may be more indicative of a security threat to the information technology environment. Accordingly, anomaly 1, surrounded by the smaller dotted line box, may be identified as a threat indicator based on the processing of anomaly data 2304. It is important to note here that this type of system wide view of anomalous activity is not possible at the anomaly detection level, in some embodiments, because some anomaly detection model instances may be set up to process evetns on a per-entity basis. In other words, an anomaly detection model is only concerned with what is occurring at a particular entity, while a threat indicator model is concerned with what is occurring across the entire computer system.

Anomaly 1 is shown in FIG. 22 as a single anomaly for clarity purposes, however it may also represent a cluster of anomalies that are somehow related to one another. In one embodiment, anomaly 1, as shown in FIG. 22, may represent a set of anomalies of a particular category of anomaly. For example, a threat indicator may be identified if a high number of entities in an information technology environment are associated with beacon activity. That beacon activity may be associated with hundreds or thousands of detected anomalies across the network. In another embodiment, anomaly 1, as shown in FIG. 22, may represent a cluster of anomalies of not just the same category, but substantially matching on a lower level as well. For example, beacon activity broadly describes a wide range of behavior. However, analysis at a lower level can uncover similarities among certain types of beaconing. For example, beacon communications known to be associated with malware command and control communications may exhibit similar characteristics. These characteristics may be described in profile or footprint associated with a particular anomaly. This profile or footprint is based on the underlying events 2280 that gave rise to the anomaly. For example, while individually unique, a set of anomalies based on beacon communications may exhibit patterns related to destination entities, periodicity of communications, etc. Accordingly, anomaly 1, as shown in FIG. 22 may represent a plurality of individual anomalies that, although unique, all have substantially matching profiles or footprints.

In some embodiments, the use case described in FIG. 22 involves a process that begins with determining a measure (e.g., a count) of entities of the information technology environment associated with a particular anomaly, a particular category of anomaly, or a set of anomalies with substantially matching profiles or footprints. In some embodiments, this determination is based on an absolute number tracked from when monitoring of the information technology environment commenced. In other embodiments, this determination may be over a pre-determined or dynamic time period.

The process continues with identifying a threat indicator if the measure of entities associated with the particular anomaly, particular category of anomaly, or a set of anomalies with substantially matching profiles or footprints, satisfies a specified criterion. The specified criterion may simply be a threshold number of entities associated with an anomaly. For example, identifying a threat indicator if 20 entities are associated with a beacon related anomaly. This threshold value need not be static however. The threshold value may depend on the type of anomaly detected, the types of entities associated (e.g. mission critical systems vs. non-critical systems), the temporal clustering of entities associated with the anomaly, etc. In the context of a threat indicator model as described with respect to FIG. 21, a threat indicator score can be assigned based on the processing of the anomaly data with a threat indicator being identified if the threat indicator score satisfies a specified criterion. For example, the 20 entities associated with a particular anomaly may lead to assigning an threat indicator score of 6 on a scale of 1 to 10. Accordingly a threat indicator is identified because the assigned threat indicator score is at least 6.

Figure 23:
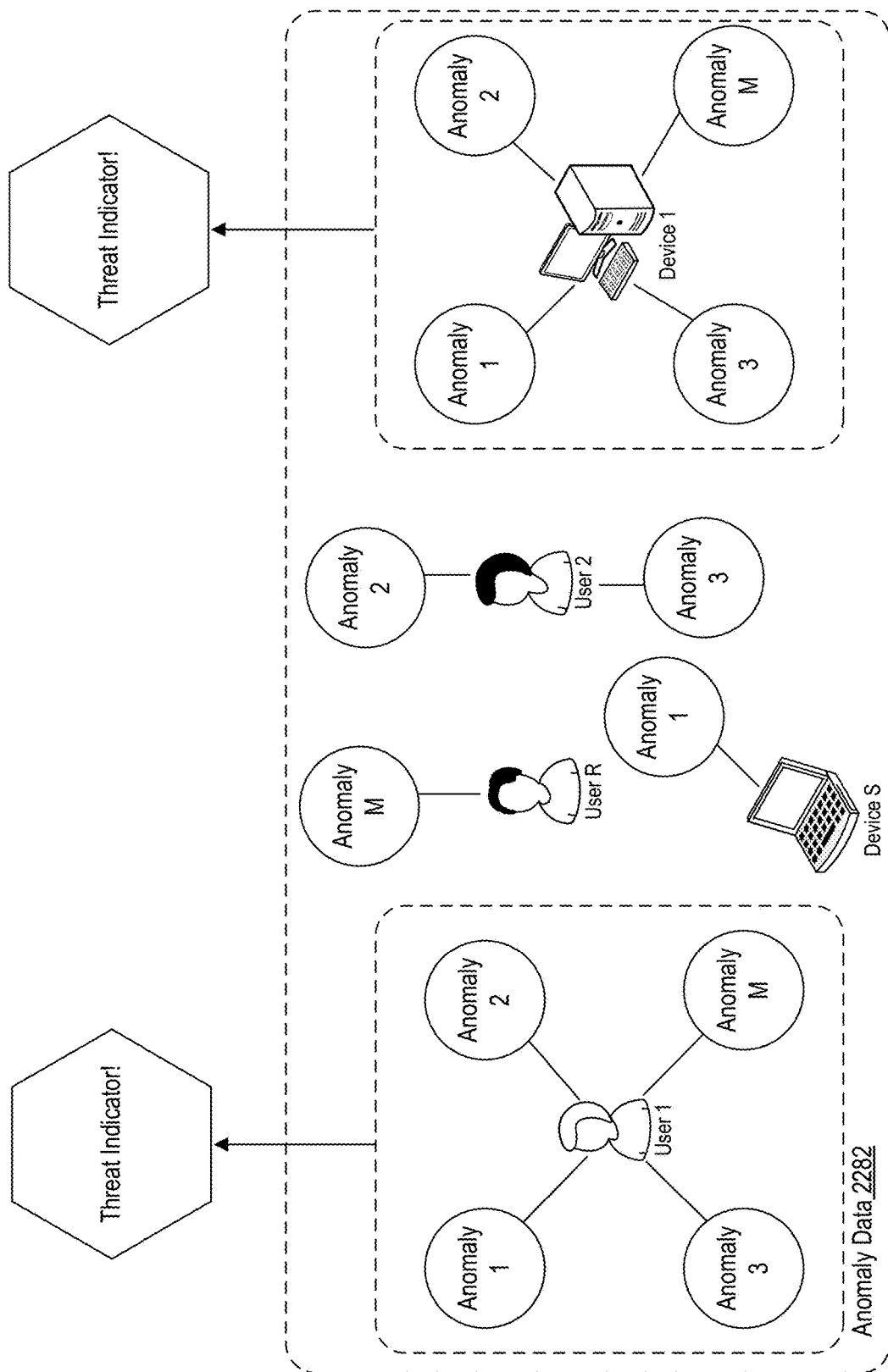
FIG. 23 illustrates an example case for identifying threat indicators based on entity associations with detected anomalies.

FIG. 23 illustrates an example case for identifying threat indicators based on entity associations with detected anomalies. The use case illustrated in FIG. 23 is identifying a threat indicator if, based on processing the anomaly data, it is determined that a high number of anomalies are associated with a particular entity.

As shown in FIG. 23, a number of detected or acquired anomalies 1 though M are included in anomaly data 2282, which is surrounded by the larger dotted line box. Associated with these detected anomalies are various entities including devices 1 though S and users 1 through R. Here, user 1 is shown to be associated with at least four anomalies 1 though M (as indicated by the first of two smaller dotted line boxes), and device 1 is shown to be associated with least four anomalies 1 though M (as indicated by the second of two smaller dotted line boxes). As with the use case described with respect to FIG. 22, this use case assumes that a correlation among anomalies and entities that establishes relatively high interrelationship is more suspicious than individual occurrences of anomalous activity. In other words, an entity (such as a user or device) that is associated with a high number of detected anomalies may be more indicative of threating activity. Accordingly, two threat indicators are identified based on the anomaly data 2282 shown in FIG. 23, one threat indicator based on the anomalies associated with user 1 and one threat indicator based on the anomalies associated with device 1.

As described with respect to FIG. 22, each anomaly 1 through M shown in FIG. 23 is shown as a single anomaly for clarity purposes. However, each anomaly shown in FIG. 23 may also represent a cluster of anomalies that are somehow related to one another. For example, anomaly 1 may represent a single instance of an anomaly, multiple anomalies of the same category, or multiple anomalies with substantially matching profiles or footprints.

In some embodiments, the use case described in FIG. 23 involves a process that begins with determining a measure (e.g. a count) of anomalies associated with a particular entity of the an information technology environment. In some embodiments, this determination is based on an absolute number tracked from when monitoring of the information technology environment commenced. In other embodiments, this determination may be over a pre-determined or dynamic time period.

The process continues with identifying a threat indicator if the measure of anomalies associated with the particular entity satisfies a specified criterion.

In an embodiment, the specified criterion may simply be a threshold number of anomalies associated with a particular entity. For example, identifying a threat indicator if 20 beacon anomalies are associated with particular user device on the network. This threshold value need not be static, however. The threshold value may depend on the type of anomaly detected, the types of entity associated with the anomalies (e.g. mission critical systems vs. non-critical systems), the temporal clustering of anomalies associated with a particular entity, etc. In the context of a threat indicator model as described with respect to FIG. 21, a threat indicator score can be assigned based on the processing of the anomaly data 2282 with a threat indicator being identified if the threat indicator score satisfies a specified criterion. For example, the 20 anomalies associated with a particular entity may lead to assigning an threat indicator score of 6 on a scale of 1 to 10. Accordingly a threat indicator is identified because the assigned threat indicator score is at least 6.

Identifying Threat Indicators—Anomaly Duration

Figure 24:
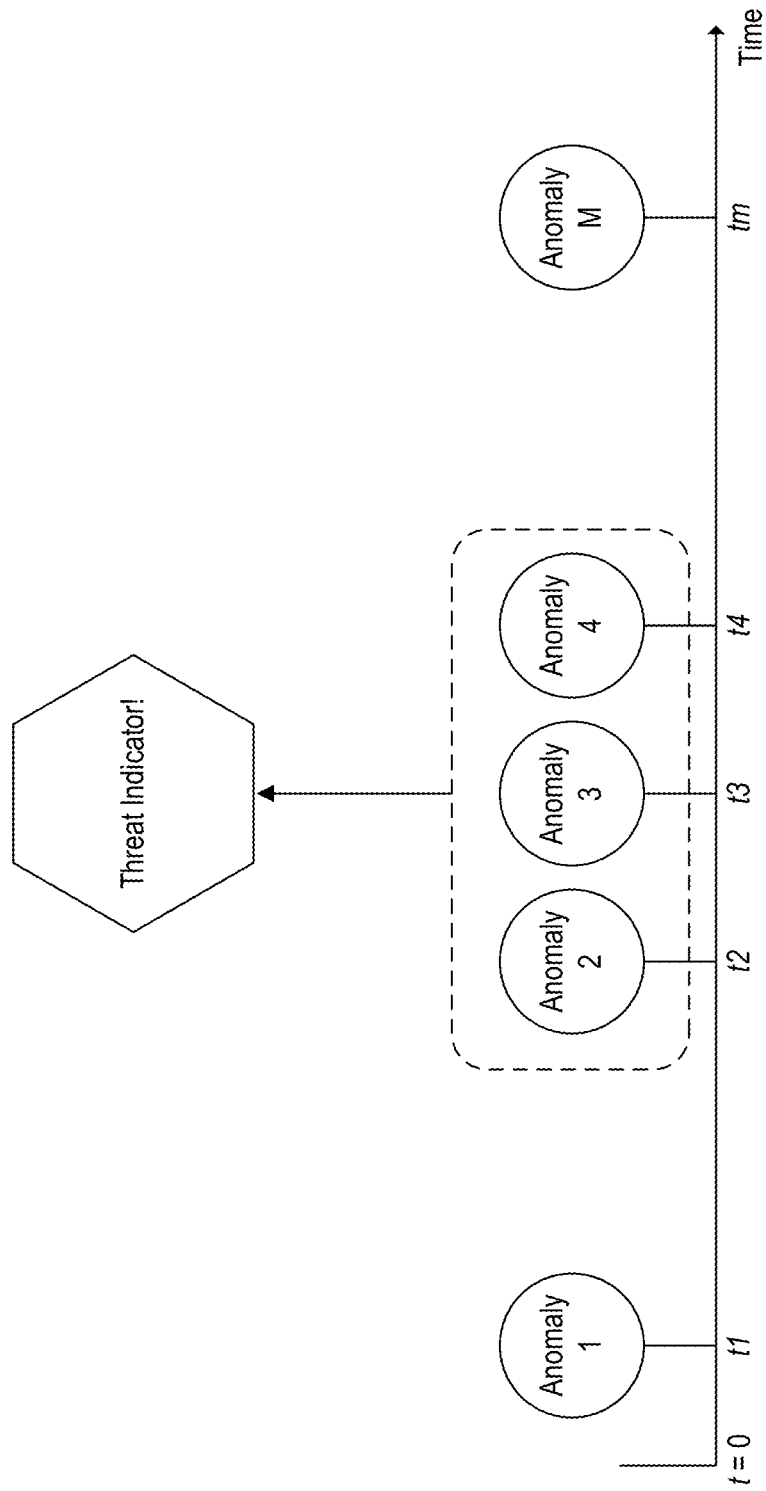
FIG. 24 illustrates an example use case for identifying threat indicators based on duration of detected anomalous behavior.

FIG. 24 illustrates an example case for identifying threat indicators based on duration of detected anomalous activity. Anomalies may be detected over a period of time, for example, as shown in FIG. 24, anomalies 1 through M are detected at time periods t1 through tm. This use case assumes that a temporal correlation among detected anomalies is indicative of suspicious activity. For example, a high number of anomalies occurring in a short time period may be indicative of a concentrated threat to the security of the network.

In some embodiments, the use case described in FIG. 24 involves a process that begins with monitoring a duration of a particular anomaly over a time period. Although anomalies 1 through M shown in FIG. 24 are shown as discrete events, in some cases an anomaly may have duration with a starting time and an end time. The process continues with identifying a threat indicator if the monitored duration of the anomaly satisfies a specified criterion.

In some embodiments, the use case described in FIG. 24 involves a process that begins with determining a number of anomalies that have substantially matching profiles or footprints (e.g. as described in the previous use case) over a time period. These substantially matching anomalies may indicate a pattern of anomalous activity that has duration. The process continues with identifying a threat indicator if the number of anomalies with substantially matching profiles satisfy a specified criterion.

Identifying Threat Indicators—Local vs. Global Rarity Analysis

Figure 25:
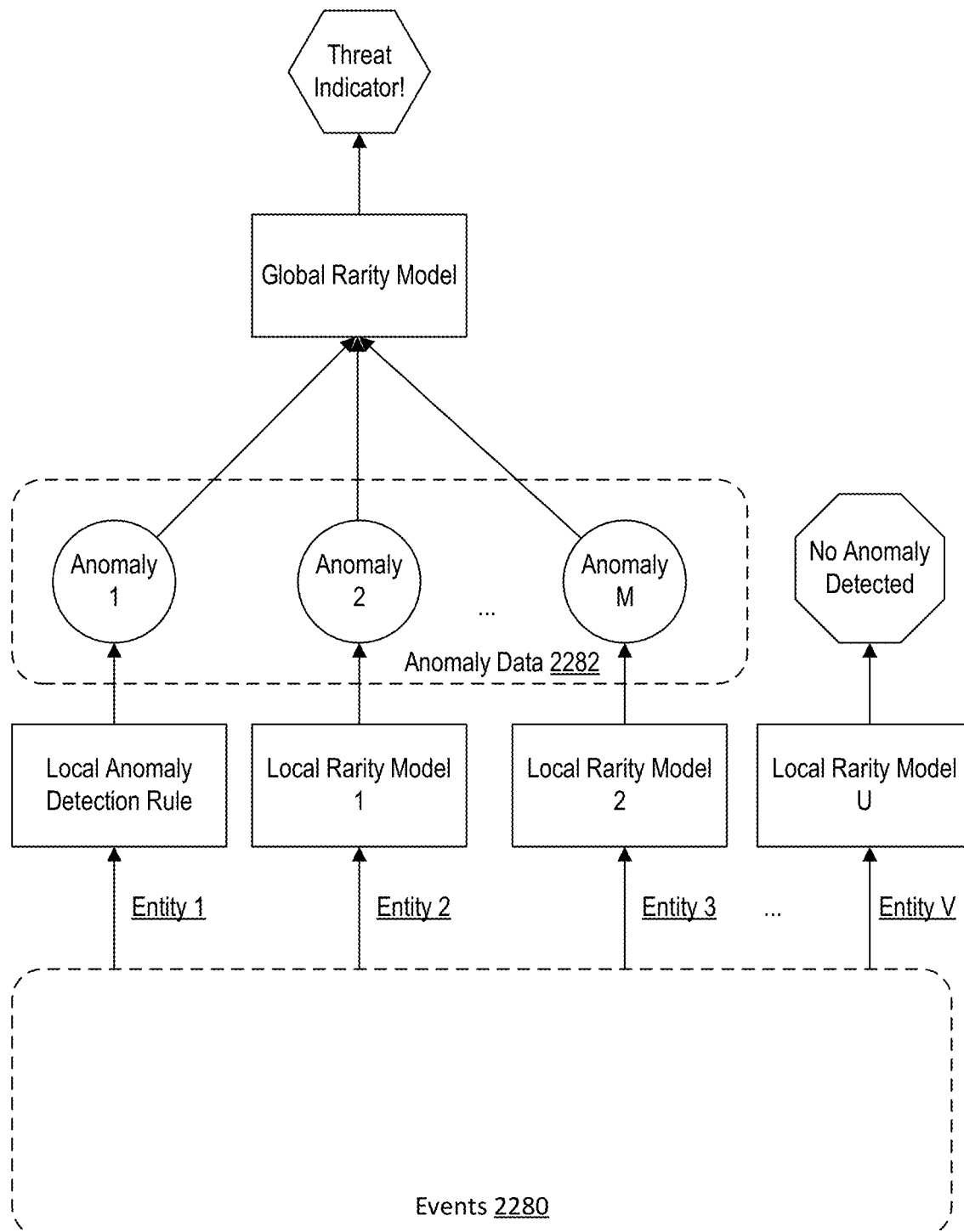
FIG. 25 illustrates an example use case for identifying threat indicators based on local and global rarity analysis.

FIG. 25 illustrates an example use case for identifying threat indicators based on local and global rarity analysis. As described elsewhere in this specification, in some embodiments, anomalies are detected based on a rarity analysis. In other words, if an event satisfies a rarity analysis (i.e. is determined to be rare), it is detected as an anomaly. This anomaly detection based on rarity analysis is local rarity analysis, because it looks at the rarity of the event in the context of a particular entity. In this use case the anomalies detected based on local rarity analysis are analyzed across the information technology environment according to a global rarity analysis. In some cases the number of similar anomalies is important indicator of their severity. For example, a machine generated beacon anomaly may be interpreted as malicious if occurring in only a small number of systems (intruders of malware infections typically affect only a small number of systems, sophisticated attackers will infect a single device).

As shown in FIG. 25, events 2280 are processed through a number of anomaly detection models 1 through U that employ local rarity analysis at entities 2 through V. The events 2280 can also be processed according to a user specified anomaly detection rules that are associated with a particular entity (e.g. local rule associated with entity 1. For example a network administrator may specify a rule to output an anomaly if a particular user has more than 3 failed login attempts. The detected anomalies 1 through M are then analyzed according to a global rarity analysis model to identify a threat indicator. In some embodiments, the use case described in FIG. 25 involves a process that begins with performing a global rarity analysis across the anomaly data 2282 (or a subset of the anomaly data 2282) over a time period, with the anomaly data 2282 including anomalies each detected using local rarity analysis. The process continues with identifying a threat indicator if a pattern in the detected anomalies satisfies a global rarity criterion. In some embodiments a global rarity model is a model that applies the same processing logic as a local rarity model, except that it is applied to the set of anomalies across the network being monitored instead of the events pertaining to a single entity. Detection of anomalies by using rarity analysis is discussed in greater detail in a section below.

Identifying Threat Indicators—Combining Anomalies

Figure 27:
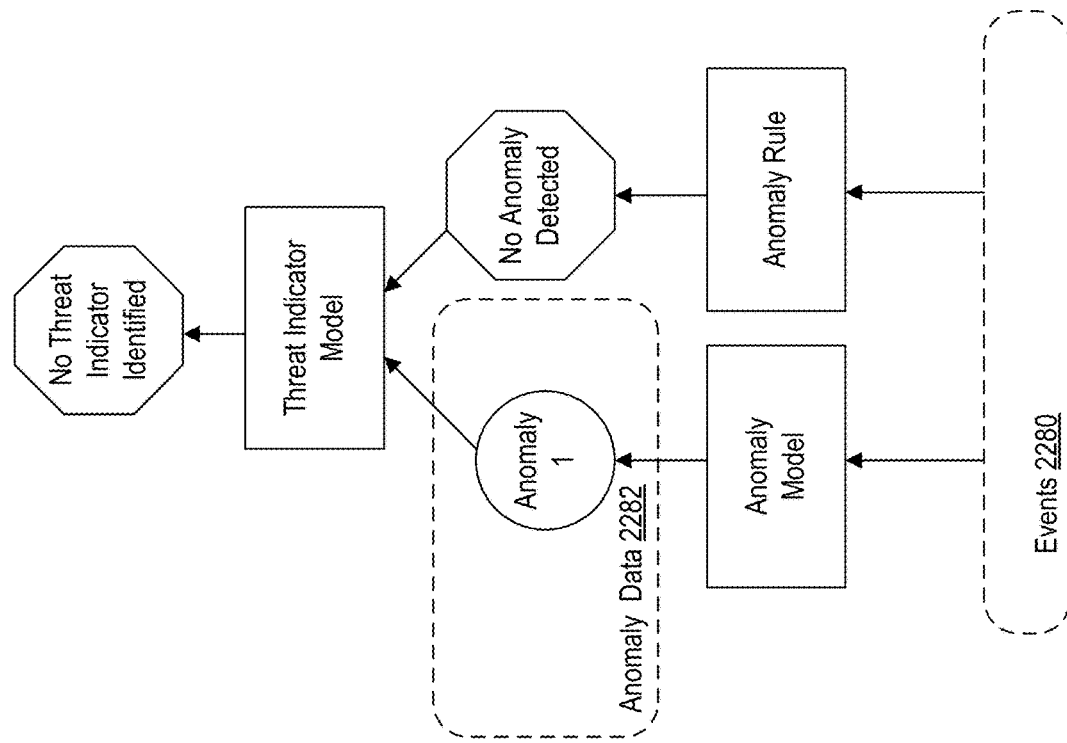
FIG. 27 illustrates nonidentification of a threat indicator according to an example use case based on combing the outputs from different anomaly detection models and rules.
Figure 26:
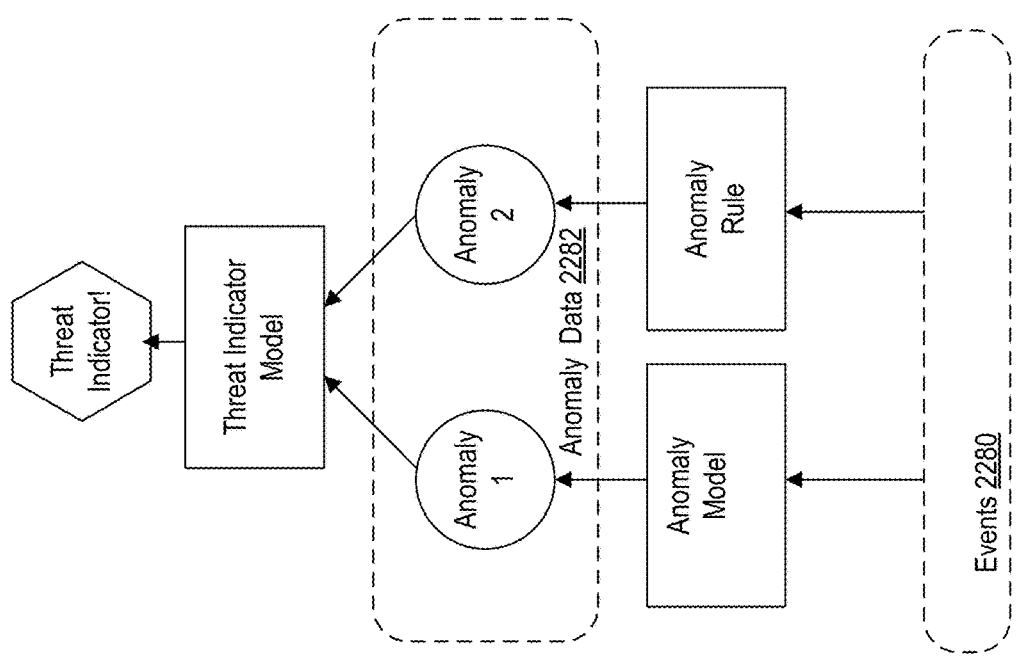
FIG. 26 illustrates identification of a threat indicator according to another example case based on combining the outputs from different anomaly detection models and anomaly detection rules.

FIGS. 26-27 illustrate an example use case for identifying threat indicators based on combining the outputs (i.e. detected anomalies) from different anomaly models. As described elsewhere in this specification, in some embodiments, different types of anomalies are detected based a different models. In such cases, it may be beneficial to correlate the anomalies detected using different model types. For example, a machine generated beacon anomaly (detected by a beacon detection model) provides more insight if the destination of the beacon is rare for the environment (detected with a rarity analysis model).

As shown in FIG. 26, a threat indicator is identified by processing the anomaly data 2282 according to a threat indicator model if anomalies 1 and 2 are present. For example, two types of beacon activity may be considered to be more suspicious when observed in combination. However, as shown in FIG. 27, if anomaly 2 is not detected (and therefore not part of anomaly data 2304), the threat indicator is not identified based on processing according to the threat indicator model.

As previously discussed, in some embodiments, some anomalies are detected by processing events 2280 with machine-learning based models (e.g. anomaly 1 shown in FIGS. 26 and 27) and some anomalies may be detected using user-specified rules (e.g. anomaly 2 shown in FIG. 26). In some embodiments, the use case described in FIGS. 26-27 involves combining anomaly data associated with different types of anomalies, assigning a threat indicator score based on the result of the combining, and identifying a threat indicator if the threat indicator score satisfies a specified criterion.

Figure 29:
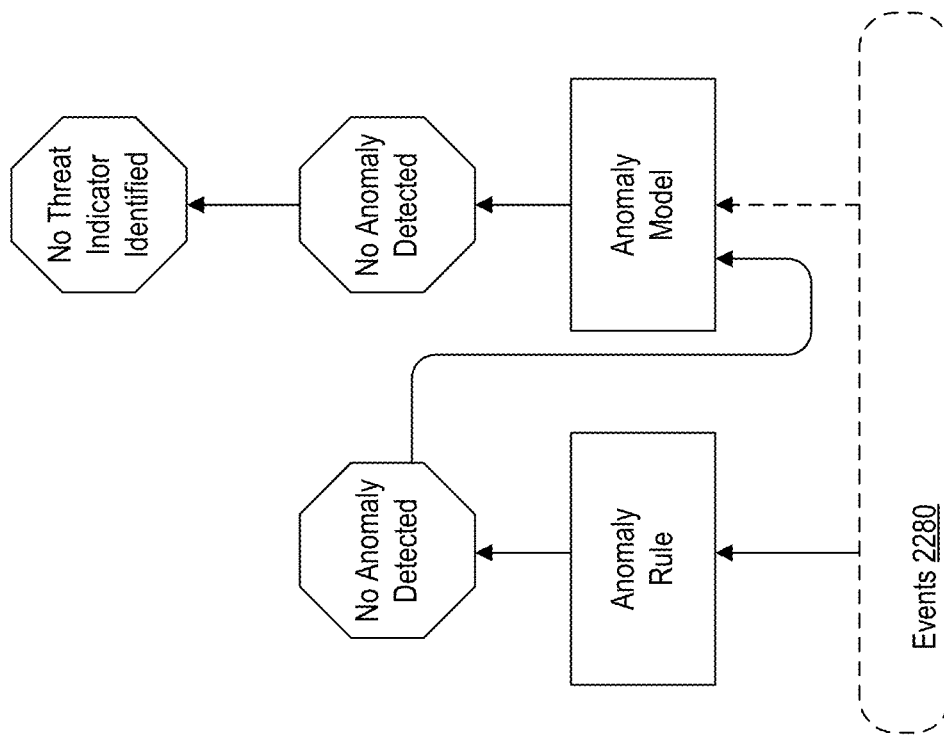
FIG. 29 illustrates nonidentification of a threat indicator according to an example use case based on combining the outputs from different anomaly detection models and anomaly detection rules.
Figure 28:
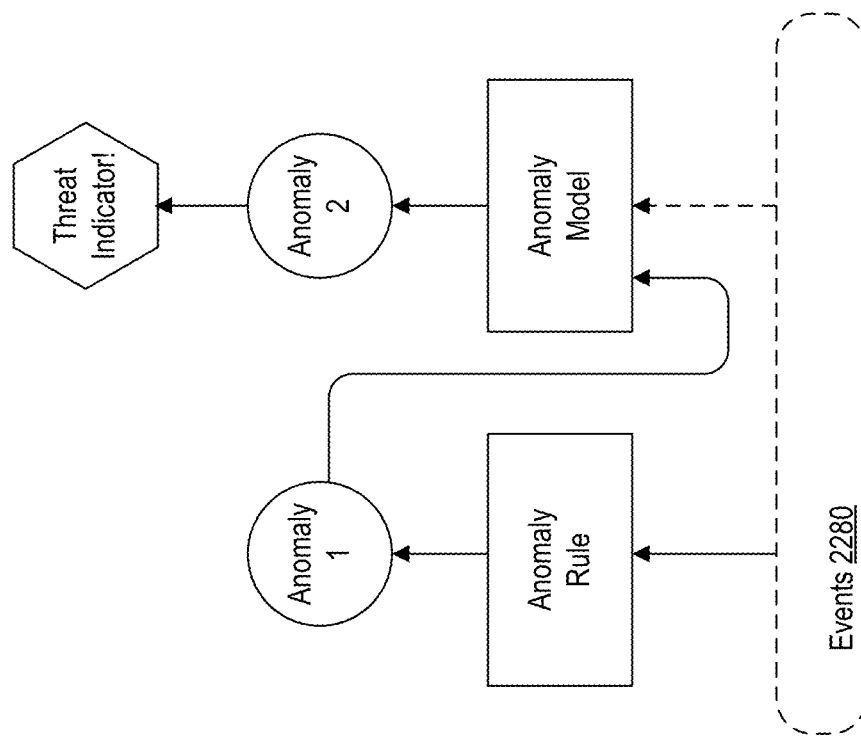
FIG. 28 illustrates identification of a threat indicator according to an example case based on combining the outputs from different anomaly detection models and anomaly detection rules.

FIGS. 28-29 illustrate an example case for identifying threat indicators based on combining the outputs (i.e. detected anomalies) from different combinations of anomaly models or rules. As shown, a threat indicator can be identified by processing the output from an user-specified anomaly detection rule with an machine-learning based anomaly detection model. For example, events 2280 can be processed according to a rule specified by a network administrator (e.g. "if a particular user in accounting accesses a computing device in engineering, output an anomaly) to detect anomaly 1. This anomaly detected using the user-specified anomaly detection rule can be fed as an input (including underlying events or other events or anomalies) in a machine-learning based anomaly detection model. For example, anomaly 1 (detected because a particular user accessed a computing device outside his department) can be fed into a machine-learning anomaly detection model that may apply user behavioral analysis (e.g. based on a particular user's behavioral baseline) to detect a second anomaly. In some embodiments, if the second anomaly is detected, a threat indicator is identified.

This process can similarly be applied in reverse. For example, a network administrator may specify a rule to output an anomaly if a particular user and any computing device in engineering are both associated with any anomalous activity within a specified time window. Here, various anomalies detected using machine-learning based models may be fed into an anomaly detection rule specified by a user. If the various anomalies satisfy the rule, a second anomaly is output. Again, a threat indicator may be identified if the second anomaly is detected.

As shown in FIG. 28, anomaly 1 is detected based on processing of events 2280 through with a user-specified anomaly detection rule. Anomaly 1 is output if the processed events 2280 satisfy the user-specified rule. Anomaly 1 is then input into a machine-learning anomaly detection model for processing. In some embodiments, the output anomaly 1 is processed along with other events 2280 through the machine-learning anomaly detection model. A second anomaly 2 is detected based on processing anomaly 1 (and, and in some embodiments, event data 2280) through the machine-learning anomaly detection model. FIG. 29 shows the same process as in FIG. 28 except that a threat indicator is not identified because anomaly 1 was not detected. Although not shown, the same process may have yielded anomaly 1, but not anomaly 2. For example, a beacon anomaly is detected, but a rarity anomaly associated with that beacon is not detected because the beacon is common to a particular environment. Accordingly a threat indicator is not identified.

In some embodiments, the use case described in FIGS. 28-29 involves a process of detecting a first type of anomaly based on processing events 2280 by a first type of machine-learning anomaly detection model or user-specified anomaly detection rule. The process continues with inputting the first type of anomaly into a second type of machine-learning anomaly detection model or user-specified anomaly detection rule. The process concludes with identifying a threat indicator if a second type of anomaly is detected based on processing the first type of anomaly by the second type of machine-learning anomaly detection model or rule.

The processes described in FIGS. 26-29 depict simple combinations of two anomalies, however, the concept can easily be applied to more complex combinations of multiple anomaly outputs.

Identifying Threats

Figure 30:
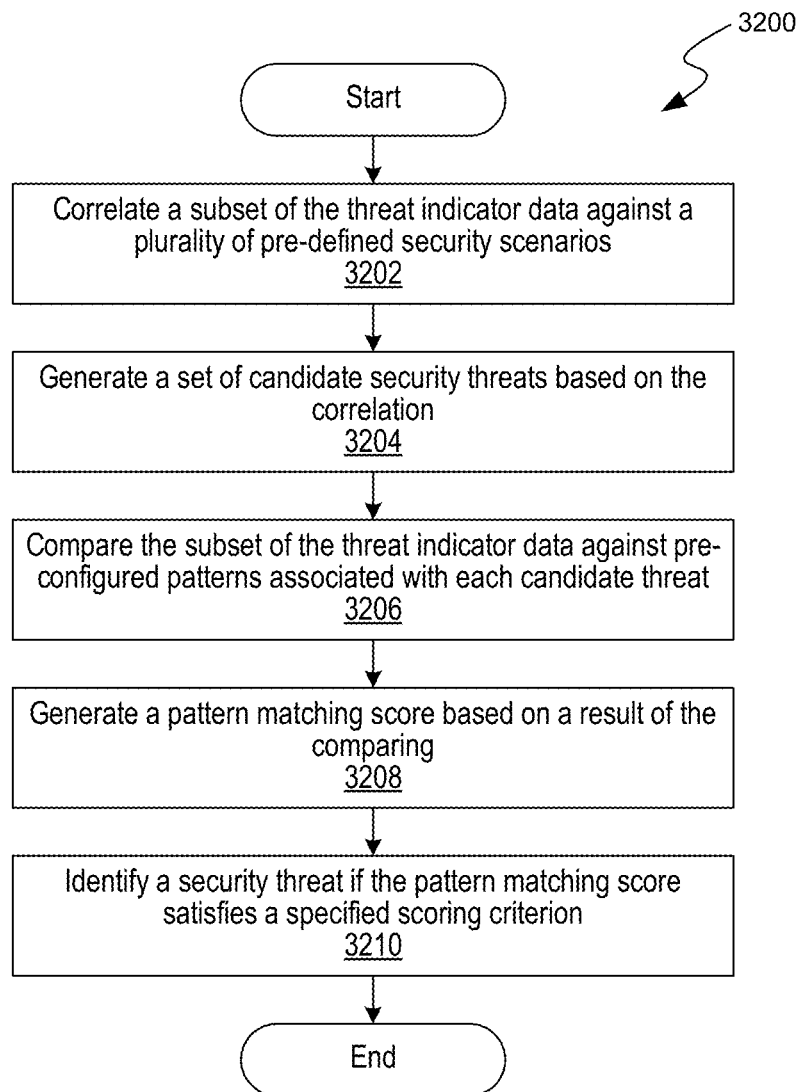
FIG. 30 is a flow diagram describing an example process for identifying threats to network security based on threat indicators.

FIG. 30 is a flow diagram depicting an example process 3200 for identifying threats to the security of an information technology environment based on threat indicators. The process of identifying threats based on correlation of anomalies is described in more detail elsewhere in this specification. The same concept applies here, except that the threat is identified based on correlating the threat indicator data 2284 including a plurality of identified threat indicators instead of the anomaly data 2404.

Process 3200 begins at step 3202 with correlating the threat indicator data 2284, or at least a subset of the threat indicator data 2284. Process 3200 continues at step 3204 with identifying a set of candidate security threats based on the correlation. Types of correlation are described elsewhere in this specification but can include network-wide correlation for malware threats, connected component correlation for kill chain type threats, per-entity analysis for kill chain type threats, and per-burst analysis for insider threats.

Process 3200 continues at step 3206 with comparing the subset of the threat indicator data against pre-configured patterns or pre-set rules associated with each candidate threat. For example, an insider threat may be associated with known patterns identified by security experts and therefore be associated with pre-set rules. Process 3200 continues at step 3208 with generating a pattern matching score based on a result of the comparing. In some embodiments, the pattern matching score is a value in a set range. For example, the resulting pattern matching score may be a value between 0 and 10 with 0 being the least likely to be a threat and 10 being the most likely to be a threat.

Process 3200 concludes at step 3210 with identifying a security threat if the pattern matching score satisfies a specified criterion. Continuing with the given example, the specified criterion may be set such that an threat is identified if the pattern matching score is 6 or above. The specified criterion need not be static, however. In some embodiments, the criterion is dynamic and changes based on situational factors. Situational factors may include volume of event data, presence or absence of pre-conditional events, user configurations, volume of detected anomalies, and involvement of mission critical systems.

Graphical User Interface (GUI) Features

A graphical user interface ("GUI") as described herein can enable a user (e.g. a network security administrator) to view information regarding activity in an information technology environment, as well as anomalous activity and associated threats detected using any of the aforementioned techniques. A GUI can also enable a user to configure displays according to the user's particular tasks and priorities and specify rules for detecting anomalous activity. The previously described security platform may include a GUI generator module that gathers the generated anomaly data, threat data, and other data, and that based on such gathered data, generates display data. For example, as previously described, a GUI as described herein may be presented via a security information and event management (SIEM) application (e.g. Splunk® App for Enterprise Security instantiated at a client device 102 with reference to FIG. 2B) that is associated with a rules-based network security system 124 (e.g. Splunk® Enterprise Security). The GUI generator module sends the generated display data to one or more physical display devices, to cause those display devices to display the GUI features described herein. The GUI module also receives user inputs and modifies the display data based on those inputs to provide an interactive display.

In the described GUI, graphs, timelines, maps, charts, lists and other visualization features are generated to illustrate trends, recent activity, and relationships between different data. The GUI can provide views that are automatically configured via default settings, or the GUI can enable a user to customize a view, for example, to filter out data points that are less critical, distracting, or unnecessary, to zoom in and out, or re-format the view (e.g., from a line chart to a bar chart). To easily navigate between different views, and to better understand the relationships between different data associated with a security-related threat or anomaly, the GUI can include links in the data to generate different views that provide additional detail about information of interest.

Because network security monitoring can involve tracking network activity by users, devices, and applications (referred to collectively as "entities") to identify and track anomalies and threats (referred to collectively as "instance of potential network compromise," or "instances"), a graphical user interface for a user in accordance with the present disclosure also organizes, tracks, and presents information concerning these entities and instances of potential network compromise. Since information pertaining to different entities and instances may be interrelated, the graphical user interface, in accordance with various embodiments of the present disclosure, provides various views for causing display of this information. The graphical user interface also includes links in these views to cross-reference the information. These capabilities facilitate a user's ability to understand the connections and relationships between different entities or instances to better understand security risks and causes of a problem.

For example, the graphical user interface provides several different ways for a user to access information pertaining to a particular device that seems suspicious. The user may search for the device directly through a "device view." Alternatively, the user may notice the device when reviewing a threat, and then click on a link for the device from within a threat view. Instead, the user might become aware of the device when reviewing information about an anomaly, and click on a link for the device from an anomaly view. As yet another alternative, the user might notice the device when navigating a "user view," and clock on the link from within the user view. Once the user reviews information about the suspicious device, the user can use a "watchlist" to "mark" the device (e.g., as suspicious). Once the device is put in the watchlist, that tracking information can stay with the device and obtained upon access device information from any view.

Figure 31:
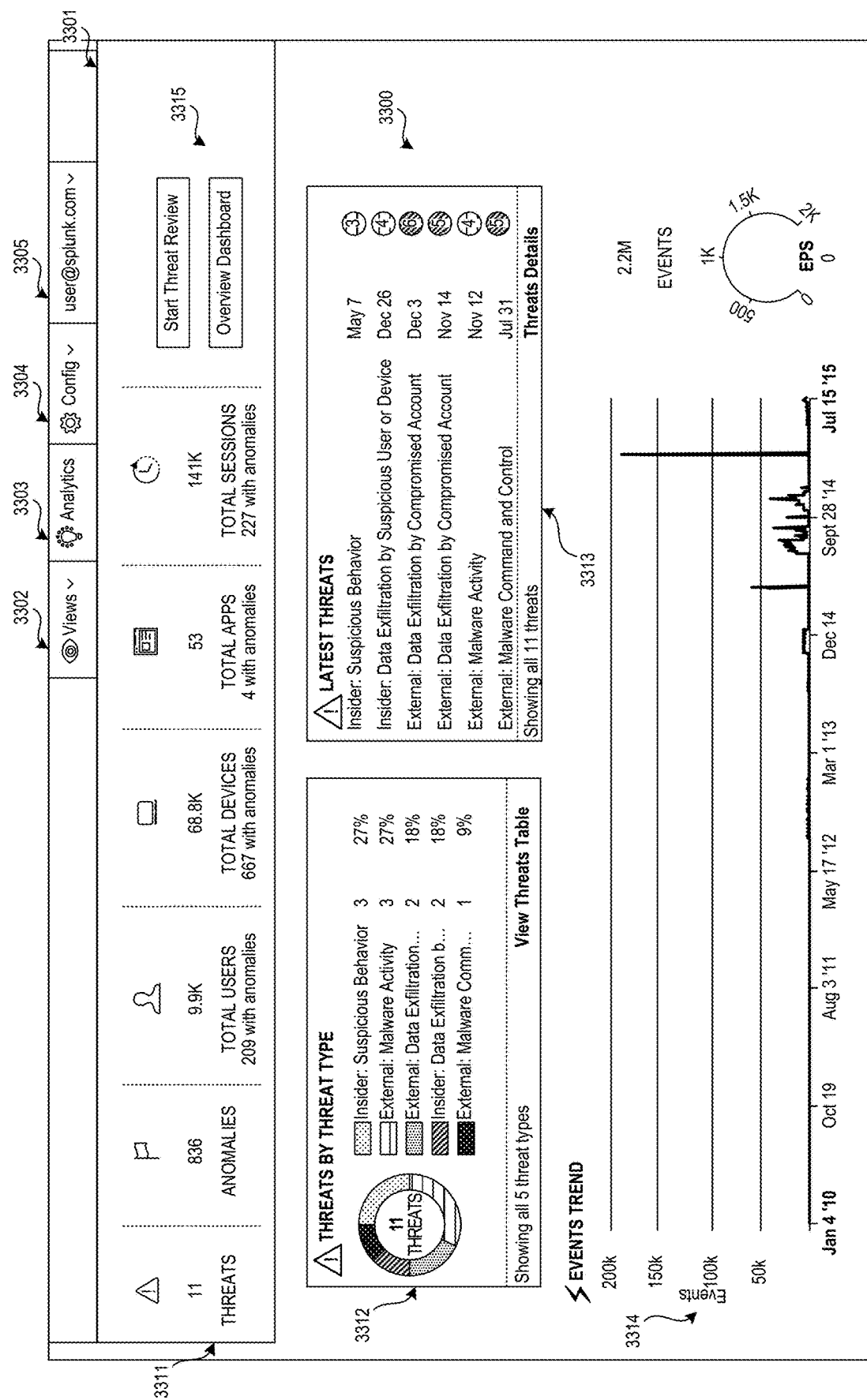
FIG. 31 is an illustrative view of an example GUI for security information and event management.

In accordance with various aspects of the present disclosure, FIG. 31 provides an example high level, "home screen" view 3300 generated by display data for display in a graphical user interface ("GUI"). This may be the first screen viewed after log-in. Toolbar 3301 also may be included in all views generated for display in the GUI. In this example, the toolbar includes a "Views" tab 3302, "Analytics" tab 3303, "Config" tab 3304, and GUI user name tab 3305 for log-in. The home screen view 3300 also may include a summary status bar 3311 indicating, for example, the number of threats, anomalies, total users, total devices, total apps, and total sessions on the network being monitored. The summary status bar can enable the GUI user to see, at a glance, the volume of information that can be reviewed and evaluated.

The home screen view 3300 can additionally include summary charts and illustrations, such as, as shown in FIG. 31, a "Threats by Threat Type" box 3312, a "Latest Threats" box 3313, and an "Events Trend" graphic 3314. The "Threats by Threat Type" box 3312 compares by number each different type of threat that has been identified. The listing in the "Latest Threats" box 3313 identifies the most recent threats by date. The "Events Trend" graphic 3314 is a timeline showing the volume of events along a timeline.

It shall be appreciates that home view 3300 shown in FIG. 31 is just an example and that various information related to anomalies, threats, and threat indicators may be presented in any arrangement suitable to convey the information to a user.

As previously described with respect to FIG. 1B, anomalies, threat indicators, and threat, etc. presented via GUI such as shown in FIG. 31 may be received from different sources. For example, if associated with a rules-based network security system (e.g. SPLUNK® ENTERPRISE SECURITY), view 3300 may include alerts on anomalies detected by processing received events using user-specified anomaly detection rules. To gain greater insight, such a GUI may be configured to integrate with a machine-learning based network security system 122 (e.g. SPLUNK® UBA). In such an embodiment, anomalies or threats detected at the machine-learning based network security system may show up via view 3300 along with the anomalies detected at the "native" rules-based network security system 124.

Figure 32:
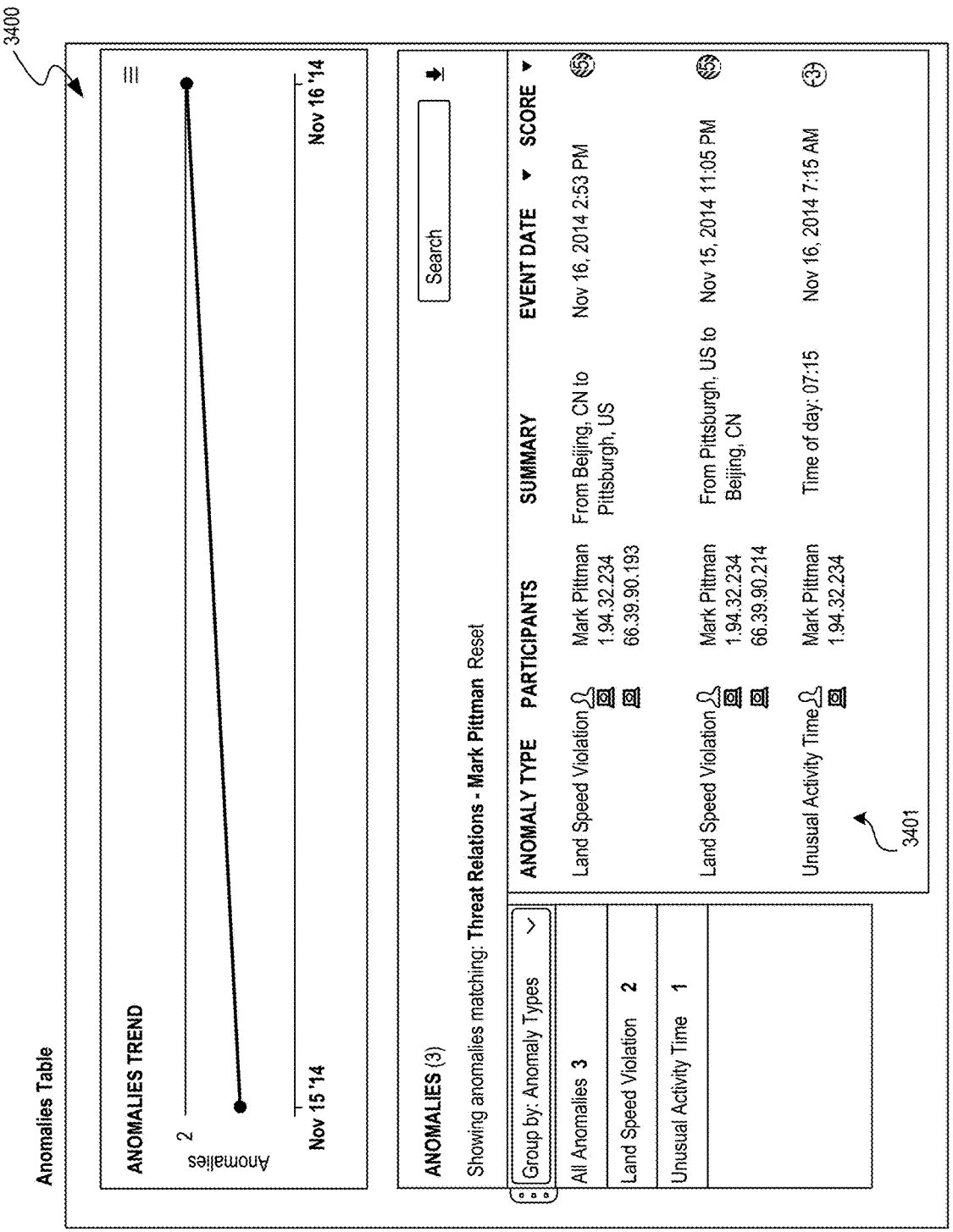
FIG. 32 is an illustrative view of the example GUI from FIG. 31 including an anomalies table.

Further, as also described with respect to FIG. 1B, data presented via view 3300 may be decorated or annotated with identity resolution data received form a machine-learning based network security system 122. For example, FIG. 32 shows an example anomalies table 3400 that may be accessible via home view 3300 shown in FIG. 31. Anomalies table 3400 may include a list 3401 of anomies grouped according to a particular user (i.e. "Mark Pittman"). Unless the underlying event includes specific user identifying information or entity relationships are pre-determined, a rules-based network security system 124 may not have the capability to resolve certain entity relationships (e.g. associating a particular user with one or more devices, accounts, applications, etc.). As previously described, by applying a process of identity resolution, a machine-learning based network security system 122 may be able to resolve such relationships. This identity resolution data can be fed to a rules-based network security system 124 and combined with natively detected anomalies to further illuminate each anomaly. For example, the anomalies shown in FIG. 32 may have been detected by processing machine data included in an event (e.g. a logged IP address) using anomaly detection rules. The resulting anomalies may be no more than series of events showing activity related to the IP addresses. However, by utilizing identity resolution data acquired from a machine-learning based network security system 122, anomaly list 3401 is annotated to associate a particular user (e.g. Mark Pittman) with each anomaly.

As described above, as rules-based network security system 124 may enable a user (e.g. network security administrator) to specify rules for detecting certain anomalies. For example, with knowledge that a certain department in an enterprise is vulnerable and handles mission critical data, a network administrator may specify a rule that two failed login attempts at any workstation in the department (determined based on received events) shall be detected as an anomaly (whether the activity is actually anomalous or not).

Figure 33:
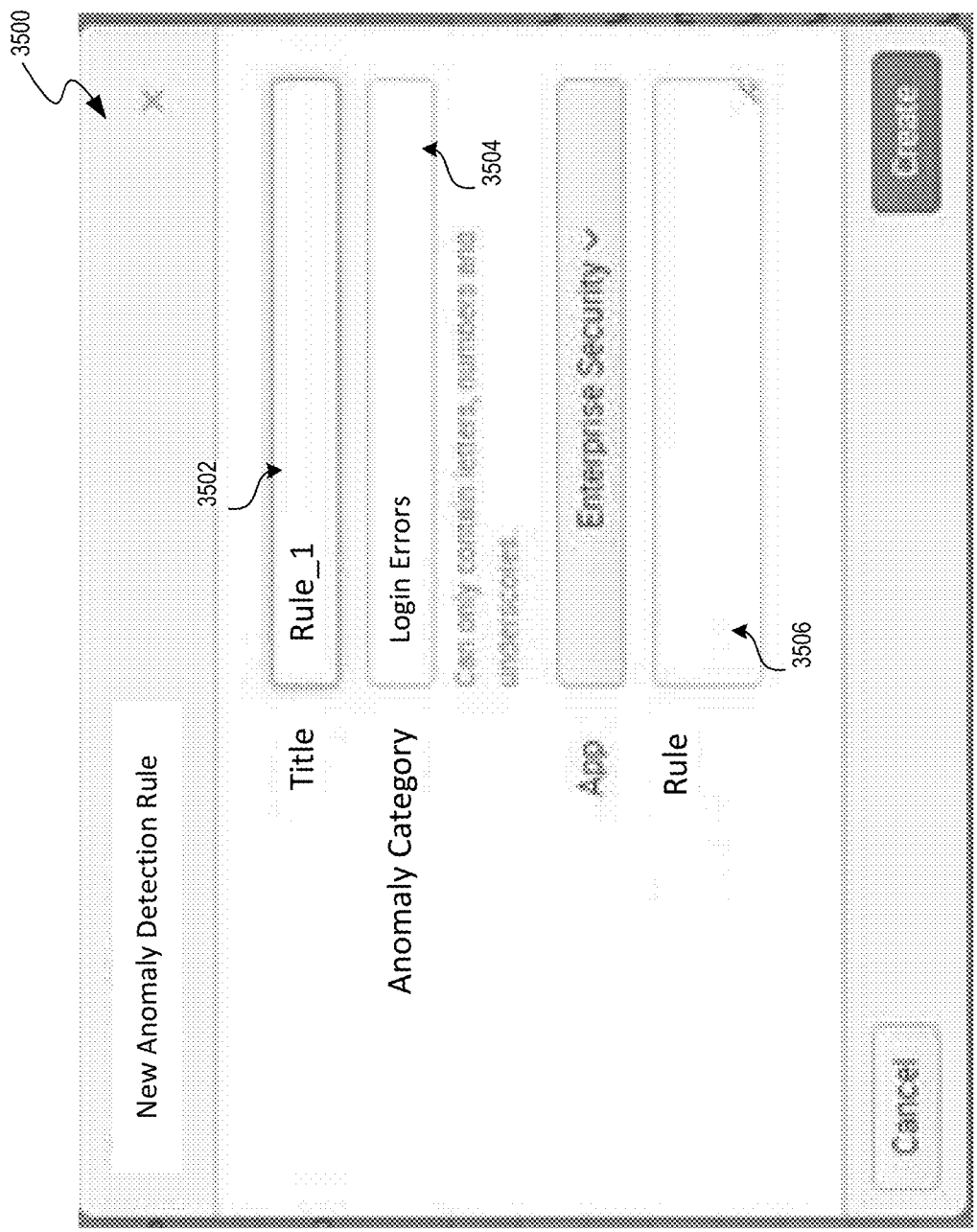
FIG. 33 is an illustrative view of the example GUI from FIG. 31 including an interactive option to specify an anomaly detection rule.

FIG. 33 shows an example interactive view 3500 through which a user can specify a rule for anomaly detection. In the example embodiment, view 3500 includes an option 3502 to input a title for the rule, an option 3504 to set a category for anomaly detected according to the rule, and an option 3506 to specify the rule. As shown in FIG. 33, the option to specify a rule can include an editable text field into which a user may input text defining the rule. For example, the rule can be defined as one or more conditional statements in any of a number of programming languages. Alternatively, in some embodiments, option 2306 may be configured to receive statements in plain language that are then interpreted and converted into one or more statements recognizable to a rules-based network security system 124. In some embodiments, option 3506 may include template rules with one or more editable parameters. For example, option 3506 may include a user-selectable template rule stating "detect anomaly if user accesses device," with "user" "device," and "accesses" being parameters that can be modified to customize the rule. In some embodiments, parameters may be set by selecting from a list of available values for each parameter. For example, option 3506 may access contact information for an enterprise organization and present the multiple contacts as selectable options (e.g. via a menu or series of menus) to set a "user" parameter for a rule.

As previously described, anomalous activity can be categorized. For example, alarms, blacklisted applications/domains/IP addresses, domain name anomalies, excessive uploads or downloads, website attacks, land speed violations, machine generated beacons, login errors, multiple outgoing connections, unusual activity time/sequence/file access/network activity, etc. As previously mentioned, when anomalies detected by a rules-based detection system are acquired by a machine-learning based network security system, an identifying tag can facilitate the proper processing of the rules-based detected anomaly with other corresponding machine-learning based anomalies of the same or similar type, to detect threat indicators and threats. Based on user input at option 3504 defining a category of the anomaly, any resulting anomaly detected using the specified rule and presented to the machine-learning based network security system can include a tag identifying that category of anomalous activity. Note, this can similarly be applied the other way in which machine-learning based anomalies presented to a rule-based network security system include a tag identifying a particular category of anomaly. In the example shown in view 3500, a user has selected "login errors" as the category of anomaly detected by the rule to be specified via option 3506.

Computer System Device Architecture

Figure 34:
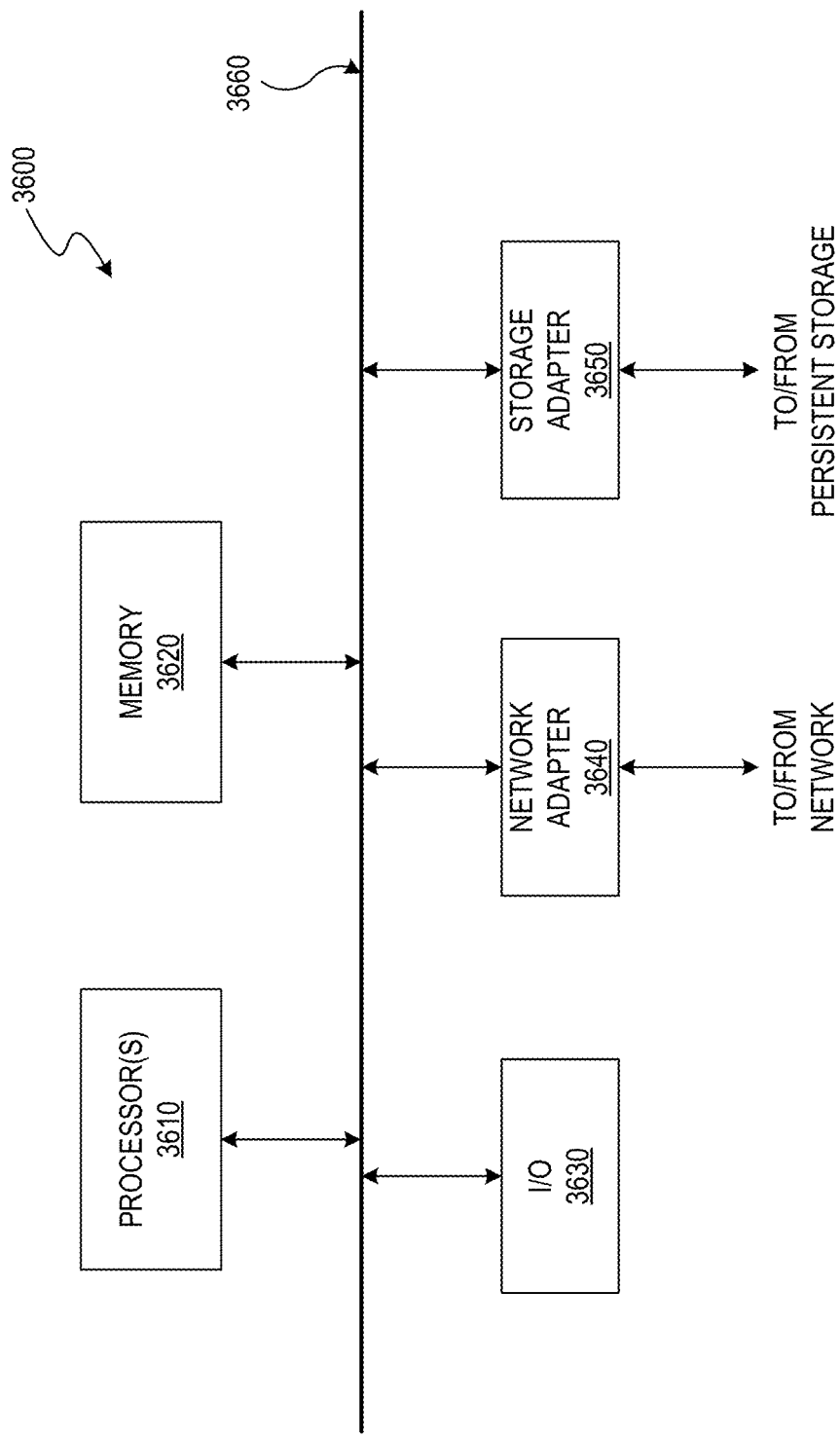
FIG. 34 is a block diagram of an example computing device that may be used to implement the techniques introduced here.

Techniques described above can be implemented using one or more conventional physical processing devices. FIG. 34 is a block diagram showing an example of such a processing device, e.g., a computer system 3600. Multiple instances of such a computer system may be used to implement the security platform in a given embodiment.

In an illustrative embodiment, computer system 3600 includes one or more processor(s) 3610, memory 3620, one or more input/output (I/O) devices 3630, a network adapter 3640, and a storage adapter 3650, all interconnected by an interconnect 3660. Memory 3620 includes storage locations that are addressable by processor(s) 3610 and adapters 3640 and 3650 for storing software program code and data structures associated with the techniques introduced here. Memory 3620 may include multiple physically distinct memory devices, which may be all of the same type or of different types (e.g., volatile memory such as SRAM or DRAM, non-volatile memory such as flash, etc.). Processor(s) 3610 and adapters 3640 and 3650 may, in turn, include processing elements or logic circuitry configured to execute the software code and manipulate the data structures. It will be apparent to those skilled in the art that other processing and memory implementations, including various machine-readable storage media, may be used for storing and executing program instructions pertaining to the techniques introduced here.

Network adapter 3640 includes one or more ports to couple computer system 3600 with one or more other devices over one or more point-to-point links, local area networks (LANs), wide area networks (WANs), the global Internet, virtual private networks (VPNs) implemented over a public network, or the like. Network adapter 3640 can include the mechanical components and electrical circuitry needed to connect storage server 3600 to a network. One or more systems can communicate with other systems over the network by exchanging packets or frames of data according to pre-defined protocols, such as TCP/IP.

Storage adapter 3650 interfaces with an operating system running on processor(s) 8510 to access information on attached storage devices. The information may be stored on any type of attached array of writable storage media, such as hard disk drives, magnetic tape, optical disk, flash memory, solid-state drives, RAM, MEMs or any other similar media adapted to store information. Storage adapter 3650 includes a plurality of ports having I/O interface circuitry that couples with disks or other storage related devices over an I/O interconnect arrangement.

Embodiments of the techniques introduced here include various steps and operations, which have been described above. A variety of these steps and operations may be performed by hardware components or may be embodied in machine-executable instructions, which may be used to cause one or more general-purpose or special-purpose processors programmed with the instructions to perform the steps. Alternatively, the steps may be performed by a combination of hardware, software, or firmware.

Embodiments of the techniques introduced here may be implemented, at least in part, by a computer program product which may include a non-transitory machine-readable medium having stored thereon instructions that may be used to program/configure a computer or other electronic device to perform some or all of the operations described above. The machine-readable medium may include, for example, magnetic hard disk drives, compact disc read-only memories (CD-ROMs), magneto-optical disks, floppy disks, ROMs, RAMs, various forms of erasable programmable read-only memories (EPROMs), magnetic or optical cards, flash memory, or other type of machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link.

What is claimed is:

1. A method comprising:
   receiving, at a threat indicator detection system, first event data indicative of a first activity on a computer network and second event data indicative of a second activity on the computer network;
   applying a first machine learning anomaly detection model to the first event data, by a real-time analysis engine operated by the threat indicator detection system in real time, to detect first anomaly data;
   applying a second machine learning anomaly detection model to the first anomaly data and the second event data, by a batch analysis engine operated by the threat indicator detection system in a batch mode, to detect second anomaly data;
   detecting third anomaly data using an anomaly detection rule; and
   processing, by the threat indicator detection system using a threat indicator model, the first anomaly data, the second anomaly data, and the third anomaly data to identify a threat indicator associated with a potential security threat to the computer network.

2. The method of claim 1, wherein the first event data includes a timestamped portion of raw machine data.

3. The method of claim 1, wherein the first event data and the second event data are received from a plurality of heterogeneous data sources in the computer network, and wherein the method further comprises:
   preprocessing the first event data and the second event data before the first event data and the second event data are provided to the real-time analysis engine and the batch analysis engine.

4. The method of claim 1, further comprising:
   preprocessing the first event data and the second event data before the first event data and the second event data are provided to the real-time analysis engine and the batch analysis engine; and
   passing, by a message broker, the preprocessed first event data to the first machine learning anomaly detection model and the preprocessed second event data to the second machine learning anomaly detection model.

5. The method of claim 1, wherein the threat indicator model includes:
   model processing logic defining a process for assigning a threat indicator score to the first anomaly data, the second anomaly data, and the third anomaly data; and
   a model state defining a set of parameters for applying the model processing logic;
   wherein identifying the threat indicator includes:
   assigning a threat indicator score based on the processing of the first anomaly data with the second anomaly data and the third anomaly data using the threat indicator model;
   wherein the threat indicator is identified when the threat indicator score satisfies a specified scoring criterion.

6. The method of claim 1, wherein using the threat indicator model to identify the threat indicator comprises:
   using the first anomaly data, the second anomaly data, and the third anomaly data to determine a measure of anomalies associated with a particular entity on the computer network over a time period, the particular entity including any of a user, a device, or an application;
   wherein the threat indicator is identified when the measure of anomalies associated with the particular entity satisfies a specified criterion.

7. The method of claim 1, wherein using the threat indicator model to identify the threat indicator comprises:
   using the first anomaly data, the second anomaly data, and the third anomaly data to determine a number of entities on the computer network associated with a particular category of anomaly over a time period;
   wherein the threat indicator is identified when the number of entities associated with the particular category of anomaly satisfies a specified criterion.

8. The method of claim 1, wherein applying a second machine learning anomaly detection model further comprises:
   applying the second machine learning anomaly detection model to the first anomaly data, he second event data, historical data, and third-party data to detect the second anomaly data.

9. The method of claim 1, further comprising:
   causing display, via a graphical user interface of a network security system, of information associated with any of the first anomaly data, the second anomaly data, the third anomaly data, or the threat indicator.

10. The method of claim 1, further comprising:
    outputting the threat indicator to an administrator associated with the computer network.

11. A threat indicator detection system comprising:
    a real-time path including a real-time analysis engine configured to receive first event data indicative of first activity on a computer network, the real-time analysis engine configured to detect, in real time, first anomaly data by applying a first machine learning anomaly detection model to the first event data;
    a non-volatile storage system to store the first anomaly data;
    a batch path including a batch analysis engine configured to operate concurrently in parallel with the real-time analysis engine, the batch analysis engine further configured to retrieve, from the non-volatile storage system, the first anomaly data and second event data indicative of second activity on the computer network, the batch analysis engine further configured to detect, in a batch mode, second anomaly data by applying a second machine learning anomaly detection model to the second event data and the first anomaly data;
    a rules engine to detect third anomaly data using an anomaly detection rule; and
    a threat detection engine configured to process the first anomaly data, the second anomaly data, and the third anomaly data using a threat indicator model to identify a threat indicator associated with a potential security threat to the computer network.

12. The threat indicator detection system of claim 11, wherein the first event data includes a timestamped portion of raw machine data.

13. The threat indicator detection system of claim 11, further comprising:
a data intake and preparation engine configured to receive the first event data and the second event data from a plurality of heterogeneous data sources in the computer network, and to perform preprocessing of the first event data and the second event data before the first event data and the second event data are provided to the real-time analysis engine and the batch analysis engine, respectively.

14. The threat indicator detection system of claim 11, further comprising:
a data intake and preparation engine configured to preprocess the first event data and the second event data before the first event data and the second event data are provided to the real-time analysis engine and the batch analysis engine, respectively; and
a message broker to receive the preprocessed first event data and second event data from the data intake and preparation engine and to pass the preprocessed first event data to the real-time analysis engine and to pass the preprocessed second event data to the batch analysis engine.

15. The threat indicator detection system of claim 11, wherein the threat indicator model includes:
model processing logic defining a process for assigning a threat indicator score to the first anomaly data, the second anomaly data, and the third anomaly data; and
a model state defining a set of parameters for applying the model processing logic;
wherein identifying the threat indicator includes:
assigning a threat indicator score based on the processing of the first anomaly data with the second anomaly data and the third anomaly data using the threat indicator model;
wherein the threat indicator is identified when the threat indicator score satisfies a specified scoring criterion.

16. The threat indicator detection system of claim 11, wherein the threat detection engine is configured to identify the threat indicator by:
using the first anomaly data, the second anomaly data, and the third anomaly data to determine a measure of anomalies associated with a particular entity on the computer network over a time period, the particular entity including any of a user, a device, or an application;
wherein the threat indicator is identified when the measure of anomalies associated with the particular entity satisfies a specified criterion.

17. The threat indicator detection system of claim 11, wherein the threat detection engine is configured to identify the threat indicator by:
using the first anomaly data, the second anomaly data, and the third anomaly data to determine a number of entities on the computer network associated with a particular category of anomaly over a time period;
wherein the threat indicator is identified when the number of entities associated with the particular category of anomaly satisfies a specified criterion.

18. The threat indicator detection system of claim 11, wherein applying a second machine learning anomaly detection model further comprises:
applying the second machine learning anomaly detection model to the first anomaly data, the second event data, historical data, and third-party data to detect the second anomaly data.

19. The threat indicator detection system of claim 11, wherein the threat detection engine is further configured to:
cause display, via a graphical user interface of a network security system, of information associated with any of the first anomaly data, the second anomaly data, the third anomaly data, or the threat indicator.

20. A non-transitory computer-readable storage medium storing instructions, execution of which by a processor causing the processor to:
receive first event data indicative of a first activity on a computer network and second event data indicative of a second activity on the computer network;
apply a first machine learning anomaly detection model to the first event data, by a real-time analysis engine operated in real time, to detect first anomaly data;
apply a second machine learning anomaly detection model to the first anomaly data and the second event data, by a batch analysis engine operated by the threat detection system in a batch mode, to detect second anomaly data;
detect third anomaly data using an anomaly detection rule; and
process, using a threat indicator model, the first anomaly data, the second anomaly data, and the third anomaly data to identify a threat indicator associated with a potential security threat to the computer network.

* * * * *